US010931866B2

(12) United States Patent
Laroia et al.

(10) Patent No.: US 10,931,866 B2
(45) Date of Patent: Feb. 23, 2021

(54) METHODS AND APPARATUS FOR RECEIVING AND STORING IN A CAMERA A USER CONTROLLABLE SETTING THAT IS USED TO CONTROL COMPOSITE IMAGE GENERATION PERFORMED AFTER IMAGE CAPTURE

(71) Applicant: Light Labs Inc., Palo Alto, CA (US)

(72) Inventors: Rajiv Laroia, Far Hills, NJ (US); Fan Sai Kuok, Burlingame, CA (US); Jannie Lai, Berekely, CA (US); Jared Torres Calinisan, Brentwood, CA (US); Feng Li, Fremont, CA (US)

(73) Assignee: Light Labs Inc., Redwood City, CA (US)

( * ) Notice: Subject to any disclaimer, the term of this patent is extended or adjusted under 35 U.S.C. 154(b) by 0 days.

(21) Appl. No.: 15/296,892

(22) Filed: Oct. 18, 2016

(65) Prior Publication Data

US 2018/0109722 A1 Apr. 19, 2018

Related U.S. Application Data

(63) Continuation-in-part of application No. 14/147,581, filed on Jan. 5, 2014, now Pat. No. 9,671,595.

(51) Int. Cl.
*H04N 5/232* (2006.01)
*H04N 5/225* (2006.01)
(Continued)

(52) U.S. Cl.
CPC ....... *H04N 5/23216* (2013.01); *H04N 5/2254* (2013.01); *H04N 5/2258* (2013.01);
(Continued)

(58) Field of Classification Search
CPC .......... H04N 5/23216; H04N 5/23229; H04N 5/907; H04N 5/23293; H04N 5/2254
(Continued)

(56) References Cited

U.S. PATENT DOCUMENTS 4,544,241 A 10/1985 LaBudde et al.
5,153,569 A 10/1992 Kawamura et al.
(Continued)

FOREIGN PATENT DOCUMENTS

KR 1020110022279 3/2011
WO 2009145401 A1 12/2009
(Continued)

OTHER PUBLICATIONS

Notification of Transmittal of the International Search Report and the Written Opinion of the International Searching Authority, or the Declaration with the International Search Report and the Written Opinion from International application No. PCT/US 2017/056666, dated Feb. 7, 2018, pp. 1-7.

*Primary Examiner* — Lin Ye
*Assistant Examiner* — Chan T Nguyen
(74) *Attorney, Agent, or Firm* — Straub & Straub; Michael P. Straub; Stephen T. Straub

(57) ABSTRACT

A camera device including multiple optical chains receives user input indicating one or more user selectable control option setting(s), e.g., a user selected depth of field control option setting and an aspect ratio control option setting. The indicated control option settings are stored in memory in the camera device. Multiple optical chains of the camera device capture an image during an image capture time interval. A set of captured images are stored in a file along with metadata including the user indicated control option settings. A composite image is generated from a set of captured images in accordance with the stored indicated control
(Continued)

option settings, e.g., generating a composite image with a user selected depth of field and/or a user selected aspect ratio. In some embodiments, at least some of the user selected control option settings are not used during image capture operations but are used in subsequent image processing.

4 Claims, 49 Drawing Sheets

(51) Int. Cl.
*H04N 9/82* (2006.01)
*H04N 5/77* (2006.01)
(52) U.S. Cl.
CPC ..... *H04N 5/23229* (2013.01); *H04N 5/23293* (2013.01); *H04N 5/232935* (2018.08); *H04N 5/772* (2013.01); *H04N 9/8205* (2013.01)
(58) Field of Classification Search
USPC .................................................. 348/333.11
See application file for complete search history.

(56) References Cited

U.S. PATENT DOCUMENTS

| | | | |
|---|---|---|---|
| 5,583,602 A | 12/1996 | Yamamoto | |
| 6,011,661 A | 1/2000 | Weng | |
| 6,028,600 A | 2/2000 | Rosin et al. | |
| 7,801,428 B2 | 9/2010 | Nagaishi et al. | |
| 8,417,058 B2 | 4/2013 | Tardif | |
| 8,553,106 B2 | 10/2013 | Scarff | |
| 8,619,082 B1 | 12/2013 | Cuirea et al. | |
| 8,665,341 B2 | 3/2014 | Georgiev et al. | |
| 8,762,895 B2 | 6/2014 | Mehta et al. | |
| 8,896,655 B2 | 11/2014 | Mauchly et al. | |
| 9,041,826 B2 | 5/2015 | Jung et al. | |
| 9,104,705 B2 | 8/2015 | Fujinaga | |
| 9,135,732 B2 | 9/2015 | Winn et al. | |
| 9,197,816 B2 | 11/2015 | Laroia | |
| 9,225,889 B1 | 12/2015 | Korkin | |
| 9,270,876 B2 | 2/2016 | Laroia | |
| 9,282,228 B2 | 3/2016 | Laroia | |
| 9,325,906 B2 | 4/2016 | Laroia | |
| 9,374,514 B2 | 6/2016 | Laroia | |
| 9,423,588 B2 | 8/2016 | Laroia | |
| 9,426,365 B2 | 8/2016 | Laroia et al. | |
| 9,451,171 B2 | 9/2016 | Laroia | |
| 9,462,170 B2 | 10/2016 | Laroia et al. | |
| 9,467,627 B2 | 10/2016 | Laroia | |
| 9,497,380 B1* | 11/2016 | Jannard .................. H04N 5/247 |
| 9,544,501 B2 | 1/2017 | Laroia | |
| 9,544,503 B2 | 1/2017 | Shroff | |
| 9,547,160 B2 | 1/2017 | Laroia | |
| 9,549,127 B2 | 1/2017 | Laroia | |
| 9,551,854 B2 | 1/2017 | Laroia | |
| 9,554,031 B2 | 1/2017 | Laroia et al. | |
| 9,557,519 B2 | 1/2017 | Laroia | |
| 9,557,520 B2 | 1/2017 | Laroia | |
| 9,563,033 B2 | 2/2017 | Laroia | |
| 9,568,713 B2 | 2/2017 | Laroia | |
| 9,578,252 B2 | 2/2017 | Laroia | |
| 9,671,595 B2 | 6/2017 | Laroia | |
| 9,686,471 B2 | 6/2017 | Laroia et al. | |
| 9,690,079 B2 | 6/2017 | Laroia | |
| 9,736,365 B2 | 8/2017 | Laroia | |
| 9,749,511 B2 | 8/2017 | Laroia | |
| 9,749,549 B2 | 8/2017 | Shroff | |
| D802,646 S | 11/2017 | Laroia et al. | |
| 9,824,427 B2 | 11/2017 | Pulli et al. | |
| 2003/0018427 A1 | 1/2003 | Yokota et al. | |
| 2004/0027695 A1 | 2/2004 | Lin | |
| 2004/0100479 A1 | 5/2004 | Nakano et al. | |
| 2005/0088546 A1 | 4/2005 | Wang | |
| 2005/0200012 A1 | 9/2005 | Kinsman | |
| 2006/0187311 A1 | 8/2006 | Labaziewicz et al. | |
| 2006/0281453 A1 | 12/2006 | Jaiswal et al. | |
| 2007/0065012 A1 | 3/2007 | Yamakado et al. | |
| 2008/0088710 A1* | 4/2008 | Iwamoto ............... H04N 1/32128 348/220.1 |
| 2008/0240698 A1 | 10/2008 | Bartilson et al. | |
| 2008/0247745 A1 | 10/2008 | Nilsson | |
| 2009/0136223 A1 | 5/2009 | Motomura et al. | |
| 2009/0290042 A1 | 11/2009 | Shiohara | |
| 2010/0013906 A1 | 1/2010 | Border et al. | |
| 2010/0034531 A1 | 2/2010 | Go | |
| 2010/0079635 A1 | 4/2010 | Yano et al. | |
| 2010/0085351 A1* | 4/2010 | Deb .................... G06T 15/00 345/419 |
| 2010/0091089 A1 | 4/2010 | Cromwell et al. | |
| 2010/0265346 A1* | 10/2010 | Iizuka .................. H04N 5/2356 348/218.1 |
| 2011/0123115 A1 | 5/2011 | Lee et al. | |
| 2011/0193984 A1 | 8/2011 | Kitaya et al. | |
| 2011/0221920 A1 | 9/2011 | Gwak | |
| 2012/0027462 A1 | 2/2012 | Nozawa | |
| 2012/0062691 A1 | 3/2012 | Fowler et al. | |
| 2013/0002928 A1* | 1/2013 | Imai .................... H04N 5/23222 348/333.11 |
| 2013/0020470 A1 | 1/2013 | Luo et al. | |
| 2013/0021491 A1 | 1/2013 | Lee et al. | |
| 2013/0088614 A1 | 4/2013 | Lee | |
| 2013/0093947 A1 | 4/2013 | Lee et al. | |
| 2013/0258044 A1 | 10/2013 | Betts-Lacroix | |
| 2014/0049677 A1 | 2/2014 | Kawaguchi | |
| 2014/0063018 A1 | 3/2014 | Takeshita | |
| 2014/0192214 A1* | 7/2014 | Laroia .................... G06T 11/60 348/218.1 |
| 2014/0226041 A1 | 8/2014 | Eguchi et al. | |
| 2014/0240579 A1 | 8/2014 | Park et al. | |
| 2014/0267243 A1 | 9/2014 | Venkataraman et al. | |
| 2014/0267844 A1 | 9/2014 | Iwata et al. | |
| 2014/0293079 A1 | 10/2014 | Milanfar et al. | |
| 2015/0029595 A1 | 1/2015 | Swihart et al. | |
| 2015/0035824 A1 | 2/2015 | Takahashi et al. | |
| 2015/0043808 A1 | 2/2015 | Takahashi et al. | |
| 2015/0049233 A1 | 2/2015 | Choi | |
| 2015/0116547 A1 | 4/2015 | Laroia | |
| 2015/0154449 A1 | 6/2015 | Ito et al. | |
| 2015/0222792 A1* | 8/2015 | Ogikubo ................ H04N 5/243 348/242 |
| 2015/0241713 A1 | 8/2015 | Laroia et al. | |
| 2015/0244927 A1 | 8/2015 | Laroia et al. | |
| 2015/0244949 A1 | 8/2015 | Laroia et al. | |
| 2015/0296149 A1 | 10/2015 | Laroia | |
| 2015/0326793 A1 | 11/2015 | Makinen et al. | |
| 2015/0365587 A1* | 12/2015 | Ha .................... H04N 5/23216 715/721 |
| 2015/0373257 A1* | 12/2015 | Shirakawa ......... H04N 5/23216 348/333.12 |
| 2016/0004144 A1 | 1/2016 | Laroia et al. | |
| 2016/0014314 A1 | 1/2016 | Laroia et al. | |
| 2016/0091861 A1 | 3/2016 | Liu et al. | |
| 2016/0112637 A1 | 4/2016 | Laroia et al. | |
| 2016/0112650 A1 | 4/2016 | Laroia et al. | |
| 2016/0142610 A1 | 5/2016 | Rivard et al. | |
| 2016/0182777 A1 | 6/2016 | Laroia et al. | |
| 2016/0306168 A1 | 10/2016 | Singh et al. | |
| 2016/0309095 A1 | 10/2016 | Laroia et al. | |
| 2016/0309110 A1 | 10/2016 | Laroia et al. | |
| 2016/0309133 A1 | 10/2016 | Laroia et al. | |
| 2016/0316117 A1 | 10/2016 | Singh et al. | |
| 2016/0360109 A1 | 12/2016 | Laroia et al. | |
| 2016/0381301 A1 | 12/2016 | Shroff | |
| 2017/0031138 A1 | 2/2017 | Laroia | |
| 2017/0041528 A1 | 2/2017 | Lai et al. | |
| 2017/0054919 A1 | 2/2017 | Laroia | |
| 2017/0059857 A1 | 3/2017 | Laroia et al. | |
| 2017/0070683 A1 | 3/2017 | Laroia | |
| 2017/0099439 A1 | 4/2017 | Pulli et al. | |
| 2017/0123189 A1 | 5/2017 | Laroia | |
| 2017/0126976 A1 | 5/2017 | Laroia | |

(56) References Cited

U.S. PATENT DOCUMENTS

| | | | |
|---|---|---|---|
| 2017/0180615 | A1 | 6/2017 | Lautenbach |
| 2017/0180637 | A1 | 6/2017 | Lautenbach et al. |
| 2017/0201699 | A1 | 7/2017 | Laroia |
| 2017/0208230 | A1 | 7/2017 | Laroia |
| 2017/0208257 | A1 | 7/2017 | Laroia |
| 2017/0223286 | A1 | 8/2017 | Laroia et al. |
| 2017/0280135 | A1 | 9/2017 | Shroff et al. |

FOREIGN PATENT DOCUMENTS

| | | |
|---|---|---|
| WO | 2012089895 A1 | 7/2012 |
| WO | 2016007799 A1 | 1/2016 |

* cited by examiner

PREVIEW IMAGE

| FIGURE 30A |
|---|
| FIGURE 30B |
| FIGURE 30C |

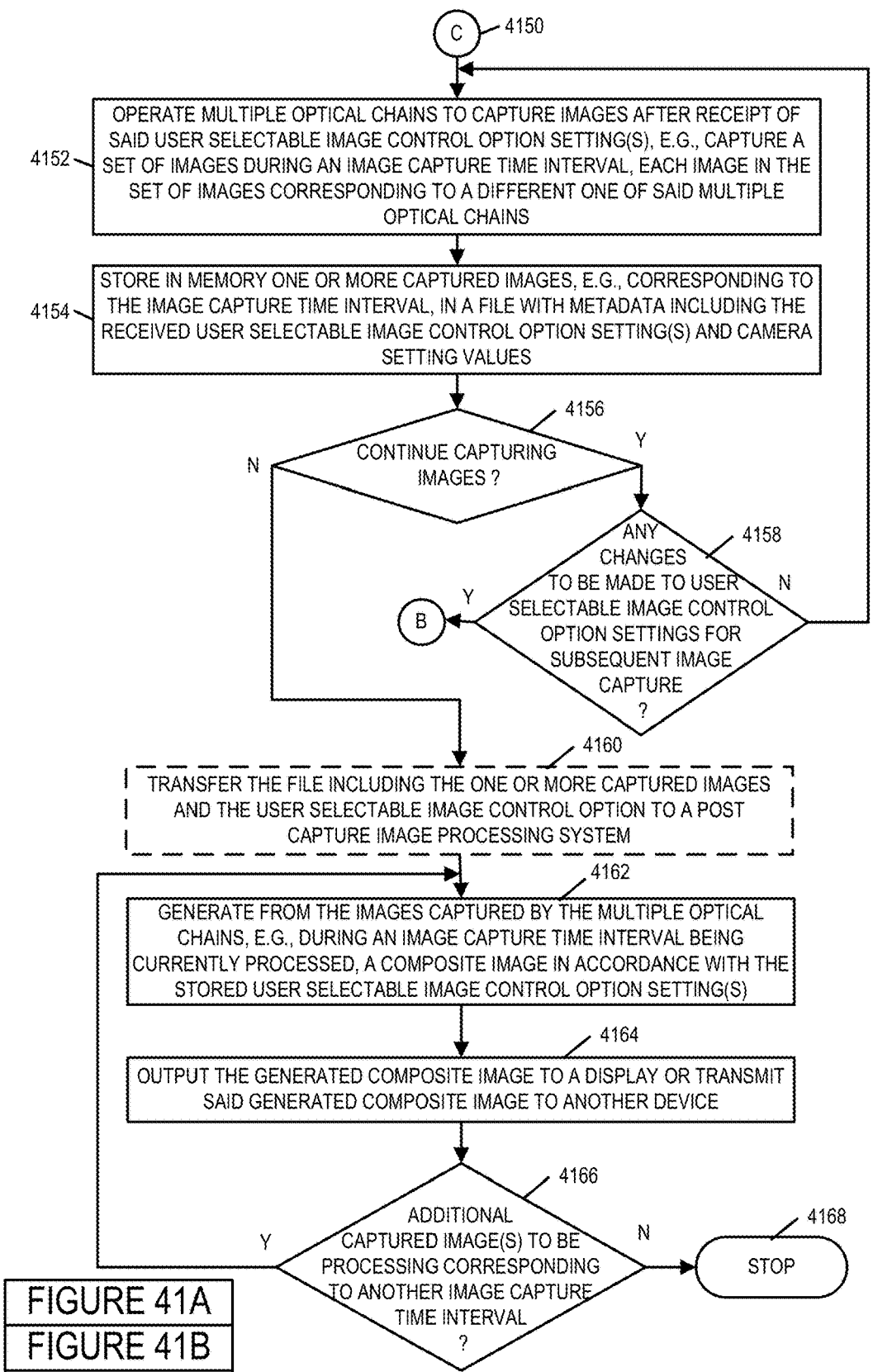

| FRAME NUMBER 4802 | DOF SETTING 4804 | ASPECT RATIO SETTING 4806 | F SETTING 4808 | ISO SETTING 4810 | FLASH STATUS 4812 | EXP. DUR. 4813 | DATE TAG 4814 | TIME TAG 4816 | CAPTURED IMAGE (OC 1) 4818 | CAPTURED IMAGE (OC 2) 4820 | CAPTURED IMAGE (OC 3) 4822 | CAPTURED IMAGE (OC 4) 4824 | CAPTURED IMAGE (OC 5) 4826 | CAPTURED IMAGE (OC 6) 4828 | CAPTURED IMAGE (OC 7) 4830 |
|---|---|---|---|---|---|---|---|---|---|---|---|---|---|---|---|
| FRAME NUMBER =1 | DOF SETTING =7 | ASPECT RATIO SETTING = 16:9 | F SETTING = F/5.6 | ISO SETTING = 400 | FLASH STATUS = OFF | EXP. DUR. 5 | DATE TAG (FRAME 1) | TIME TAG (FRAME 1) | CAPTURED IMAGE (OC 1) (FRAME 1) | CAPTURED IMAGE (OC 2) (FRAME 1) | CAPTURED IMAGE (OC 3) (FRAME 1) | CAPTURED IMAGE (OC 4) (FRAME 1) | CAPTURED IMAGE (OC 5) (FRAME 1) | CAPTURED IMAGE (OC 6) (FRAME 1) | CAPTURED IMAGE (OC 7) (FRAME 1) |
| FRAME NUMBER =2 | DOF SETTING =7 | ASPECT RATIO SETTING = 16:9 | F SETTING = F/5.6 | ISO SETTING = 400 | FLASH STATUS = OFF | EXP. DUR. 5 | DATE TAG (FRAME 2) | TIME TAG (FRAME 2) | CAPTURED IMAGE (OC 1) (FRAME 2) | CAPTURED IMAGE (OC 2) (FRAME 2) | CAPTURED IMAGE (OC 3) (FRAME 2) | CAPTURED IMAGE (OC 4) (FRAME 2) | CAPTURED IMAGE (OC 5) (FRAME 2) | CAPTURED IMAGE (OC 6) (FRAME 2) | CAPTURED IMAGE (OC 7) (FRAME 2) |
| FRAME NUMBER =3 | DOF SETTING =7 | ASPECT RATIO SETTING = 16:9 | F SETTING = F/5.6 | ISO SETTING = 400 | FLASH STATUS = OFF | EXP. DUR. 5 | DATE TAG (FRAME 3) | TIME TAG (FRAME 3) | CAPTURED IMAGE (OC 1) (FRAME 3) | CAPTURED IMAGE (OC 2) (FRAME 3) | CAPTURED IMAGE (OC 3) (FRAME 3) | CAPTURED IMAGE (OC 4) (FRAME 3) | CAPTURED IMAGE (OC 5) (FRAME 3) | CAPTURED IMAGE (OC 6) (FRAME 3) | CAPTURED IMAGE (OC 7) (FRAME 3) |
| FRAME NUMBER =4 | DOF SETTING =3 | ASPECT RATIO SETTING = 16:9 | F SETTING = F/5.6 | ISO SETTING = 400 | FLASH STATUS = OFF | EXP. DUR. 5 | DATE TAG (FRAME 4) | TIME TAG (FRAME 4) | CAPTURED IMAGE (OC 1) (FRAME 4) | CAPTURED IMAGE (OC 2) (FRAME 4) | CAPTURED IMAGE (OC 3) (FRAME 4) | CAPTURED IMAGE (OC 4) (FRAME 4) | CAPTURED IMAGE (OC 5) (FRAME 4) | CAPTURED IMAGE (OC 6) (FRAME 4) | CAPTURED IMAGE (OC 7) (FRAME 4) |
| FRAME NUMBER =5 | DOF SETTING =3 | ASPECT RATIO SETTING = 16:9 | F SETTING = F/5.6 | ISO SETTING = 400 | FLASH STATUS = OFF | EXP. DUR. 5 | DATE TAG (FRAME 5) | TIME TAG (FRAME 5) | CAPTURED IMAGE (OC 1) (FRAME 5) | CAPTURED IMAGE (OC 2) (FRAME 5) | CAPTURED IMAGE (OC 3) (FRAME 5) | CAPTURED IMAGE (OC 4) (FRAME 5) | CAPTURED IMAGE (OC 5) (FRAME 5) | CAPTURED IMAGE (OC 6) (FRAME 5) | CAPTURED IMAGE (OC 7) (FRAME 5) |
| FRAME NUMBER =6 | DOF SETTING =6 | ASPECT RATIO SETTING = 16:9 | F SETTING = F/5.6 | ISO SETTING = 400 | FLASH STATUS = OFF | EXP. DUR. 5 | DATE TAG (FRAME 6) | TIME TAG (FRAME 6) | CAPTURED IMAGE (OC 1) (FRAME 6) | CAPTURED IMAGE (OC 2) (FRAME 6) | CAPTURED IMAGE (OC 3) (FRAME 6) | CAPTURED IMAGE (OC 4) (FRAME 6) | CAPTURED IMAGE (OC 5) (FRAME 6) | CAPTURED IMAGE (OC 6) (FRAME 6) | CAPTURED IMAGE (OC 7) (FRAME 6) |
| FRAME NUMBER =7 | DOF SETTING =6 | ASPECT RATIO SETTING = 1:1 | F SETTING = F/8 | ISO SETTING = 800 | FLASH STATUS = ON | EXP. DUR. 2 | DATE TAG (FRAME 7) | TIME TAG (FRAME 7) | CAPTURED IMAGE (OC 1) (FRAME 7) | CAPTURED IMAGE (OC 2) (FRAME 7) | CAPTURED IMAGE (OC 3) (FRAME 7) | CAPTURED IMAGE (OC 4) (FRAME 7) | CAPTURED IMAGE (OC 5) (FRAME 7) | CAPTURED IMAGE (OC 6) (FRAME 7) | CAPTURED IMAGE (OC 7) (FRAME 7) |
| FRAME NUMBER =8 | DOF SETTING =6 | ASPECT RATIO SETTING = 1:1 | F SETTING = F/8 | ISO SETTING = 800 | FLASH STATUS = OFF | EXP. DUR. 6 | DATE TAG (FRAME 8) | TIME TAG (FRAME 8) | CAPTURED IMAGE (OC 1) (FRAME 8) | CAPTURED IMAGE (OC 2) (FRAME 8) | CAPTURED IMAGE (OC 3) (FRAME 8) | CAPTURED IMAGE (OC 4) (FRAME 8) | CAPTURED IMAGE (OC 5) (FRAME 8) | CAPTURED IMAGE (OC 6) (FRAME 8) | CAPTURED IMAGE (OC 7) (FRAME 8) |

4700' 4702' GENERATED STORED FILE, E.G., TO BE PROCESSED TO GENERATE POST CAPTURE COMPOSITE IMAGES IN ACCORDANCE WITH THE IMAGE CAPTURE USER SELECTED IMAGE CONTROL OPTION(S) 4704'

METHODS AND APPARATUS FOR RECEIVING AND STORING IN A CAMERA A USER CONTROLLABLE SETTING THAT IS USED TO CONTROL COMPOSITE IMAGE GENERATION PERFORMED AFTER IMAGE CAPTURE

FIELD

The present application relates to camera devices and, more particularly, methods and apparatus for receiving, storing and/or using user selectable image control option settings and/or user selectable camera control option settings.

BACKGROUND

At the time of image capture a photographer normally considers the scene and selects a portion of interest to be captured. The photographer may also select on or more camera settings which normally control the camera and image capture process. For example, in a conventional camera an aperture may alter a physical aperture used to capture an image.

Cameras which include multiple optical chains, e.g., camera modules, are now becoming available. As with more conventional cameras, a user may take the time to select and scene area of interest and set one or more camera settings which can affect image capture. In such cameras, the preview image may be and sometimes is captured by a single camera module.

Images captured by a digital camera including multiple optical chains may be combined as part of a post capture processing operation to generate a composite image. Various manual editing options available to an operator of a post capture image processing system allow the operator to view the effects of different settings on the composite image. However, this post capture editing process may be done by a different individual than the photographer who took the picture and may lack insights into the importance of particular aspects of the scene or the emotional significance of certain portions of the scene, e.g., a wedding, since the person doing the post capture editing might not have been present at the event and may be unaware of items that were indicated by the participant to be particularly significant to the photographer.

Thus since the person controlling the post-capture processing may be a different person from the photographer, and he or she may lack the unique perspective on what the photographer considered to be settings used during post capture image processing which the photographer thought would produce the best composite images. For example, a particular desired depth of field setting or a particular desired aspect ratio setting, for the effect that the photographer was trying to achieve. In addition, even if a photographer is the same person controlling the post capture image processing, there may be a large time gap between when the images are captured and when the post-capture composite images are generated and/or the photographer may have taken a very large number of images, so that the photographer does not remember his/her original intended settings and/or desired effect to be achieved for each composite image to be generated.

Furthermore, the post capture processing system may lack information about the actual camera settings which were used to capture the original images since the images may include only pixel values and not information about the camera setting used to capture the images represented by the pixel values.

Based on the above discussion, it would be beneficial if methods and apparatus were available to allow a user of a camera apparatus, e.g., the photographer, to input and/or store one or more image control option settings prior to capturing images or at the time of image capture so that the photographer's original intended preferences would be readily available for use during post image capture processing even if the settings and/or preference information do not affect the image capture operation.

SUMMARY

In various embodiments a camera user enters one or more image capture settings. Some of the settings, such as exposure time, may control image capture while other setting may be used as recommendations or photographer preference information which does not control image capture but how images are processed to generate a composite image after the initial image capture operation. For example, while aspect ratio, depth of field (DOE) and/or aperture settings may not affect image capture user settings maybe input and stored prior to or at the time of image capture. Such settings can and sometimes are used to control post capture image processing to generate a composite image with an affect that simulates what the user would expect if the specified setting were implemented in a conventional camera as part of the image capture operation. In addition, information about the actual camera settings which did affect image capture can be and sometimes are stored with the captured images along with the user setting recommendations. Such camera setting information which might not be available in conventional systems can be and sometimes is used to control post capture image processing. For example exposure setting and/or knowledge that a flash was used during image capture can be and sometimes is taken into consideration when implementing image post processing.

Since photographer preferences for various settings which can be used to control post image capture image processing can be received and stored prior to or at the time of taking a photograph when the user is most familiar with the scene and the image to be captured, considerable time can be saved since the user need not enter such information at the time of post capture image processing.

Depth of field (DOF) and aspect ratio settings may be considered user preference settings since these settings in some embodiments do not affect image capture, and the output based on the setting is achieved via post image capture processing in the camera or in a separate processing system, e.g., personal computer or online computer system.

A user desired depth of field setting can be entered in a variety of ways. In some embodiments a DOF setting is entered using a slider including a position indicator, e.g., a large white dot, which can be slid along a predetermined path or using another input option for controlling a depth of field setting. In other embodiments the user can indicate a range of depths which are used to indicate a DOF setting by touching objects at different depths in a preview image to indicate that all user selected objects which were touched should be in focus.

In some embodiments the depth of field setting affects the range of distances at which an image being generated from multiple captured images is to be in focus. In one slider embodiment, the depth of field slider includes a series of small dots with the dots going from bright to dark on one side of the position indicator with dot brightness being used to indicate the current setting and/or the direction in which the slider was most recently moved and/or is being moved. The user selected depth of field setting is stored in metadata and does not affect actual image capture or control of images. Based on user input post-capture processing is implemented to achieve the user indicated desired depth of field. Thus images are captured, the user indicated desired depth of field information, which is in essence preference information provided at or before image capture time regarding the DOF, is stored in a file with one or more of the captured images and used to control post capture image processing. The images are processed, and then the user is displayed the resulting image. The processing may be performed by the processor in the camera, but in some embodiments the processing is performed by a computer system, e.g., using cloud based or PC based software, with the resulting image then being stored, transmitted and/or displayed, e.g., on the display of the camera device or another device.

A user desired aspect ratio setting can be input or selected by a user of a camera prior to image capture. The input user desired aspect ratio setting is stored in metadata to be utilized in post image capture processing operations, e.g., performing a cropping operation, in accordance with the user desired aspect ratio on a composite image generated from a plurality of captured images corresponding to different optical chains in the camera device. In various embodiments, the user desired aspect ratio is not utilized in actual image capture operations, but is utilized in post image capture processing operation, e.g., by the camera or by a computer system external to the camera.

In some embodiments, additional user selectable image control option setting(s), e.g., an F-number setting, and/or user selectable camera control setting(s), e.g., a flash status settings, an ISO setting, an exposure duration setting, etc., are received prior to image capture and stored in metadata along with captured images to be available to be used in post-capture image processing.

In some embodiments the user settings which are intended to control post image capture operations rather than image capture are stored in a file along with the image or images captured by the camera device. The user preference information, e.g., DOF, Aspect Ratio, etc, maybe stored as meta data along with camera settings, such as exposure settings, which affected the actual image capture process. The setting and preference information can be and sometimes is included in a file with captured image data, e.g., pixel values but also maybe and sometimes are stored separately with an indication as to the image or images to which the setting and/or post capture processing preference information applies. Since such information is collected at the time of image capture or immediately before image capture and stored to facilitate post image capture processing, the captured images can be combined based on the entered information without having to seek such input from a user again during the post capture image processing operation. However, since the captured images are preserved, such settings can be altered should a user choose to do so after image capture allowing for a great deal of flexibility with regard to post image capture image processing.

An exemplary method, in accordance with some embodiments, comprises: receiving, at a camera including multiple optical chains, user input indicating a user selectable image control option setting; storing the received user selectable image control option setting in a memory of said camera; operating multiple optical chains to capture images after receipt of the user selectable image control option setting; and generating from the images captured by the multiple optical chains a composite image in accordance with the stored user selectable image control option setting. In some embodiments, the user selectable control image option setting is one of: a depth of field setting, an aspect ratio setting, and an f-setting.

An exemplary camera apparatus, in accordance with some embodiments, comprises: a plurality of optical chains; memory; a processor; and a user input device configured to receive user input indicating a user selectable image control option setting. In some such embodiments, the processor is configured to: store the received user selectable image control option setting in said memory of said camera apparatus; operate said plurality of optical chains to capture images after receipt of the user selectable image control option setting; and generate from the images captured by the plurality of optical chains a composite image in accordance with the stored user selectable image control option setting.

Numerous additional features, benefits and embodiments are described in the detailed description which follows.

BRIEF DESCRIPTION OF THE FIGURES

FIG. 6 shows an exemplary user interface screen displayed to the user upon switching the camera device on in a normal mode of operation, in accordance with one embodiment.

FIG. 41C is a third part of a flowchart of an exemplary method in accordance with an exemplary embodiment.

FIG. 41 comprises the combination of FIG. 41A, FIG. 41B and FIG. 41C.

FIG. 48 is a drawing of an exemplary generated stored file including user selected information, e.g., user selected image control options settings and camera settings, and captured images in accordance with an exemplary embodiment.

DETAILED DESCRIPTION

Figure 1:
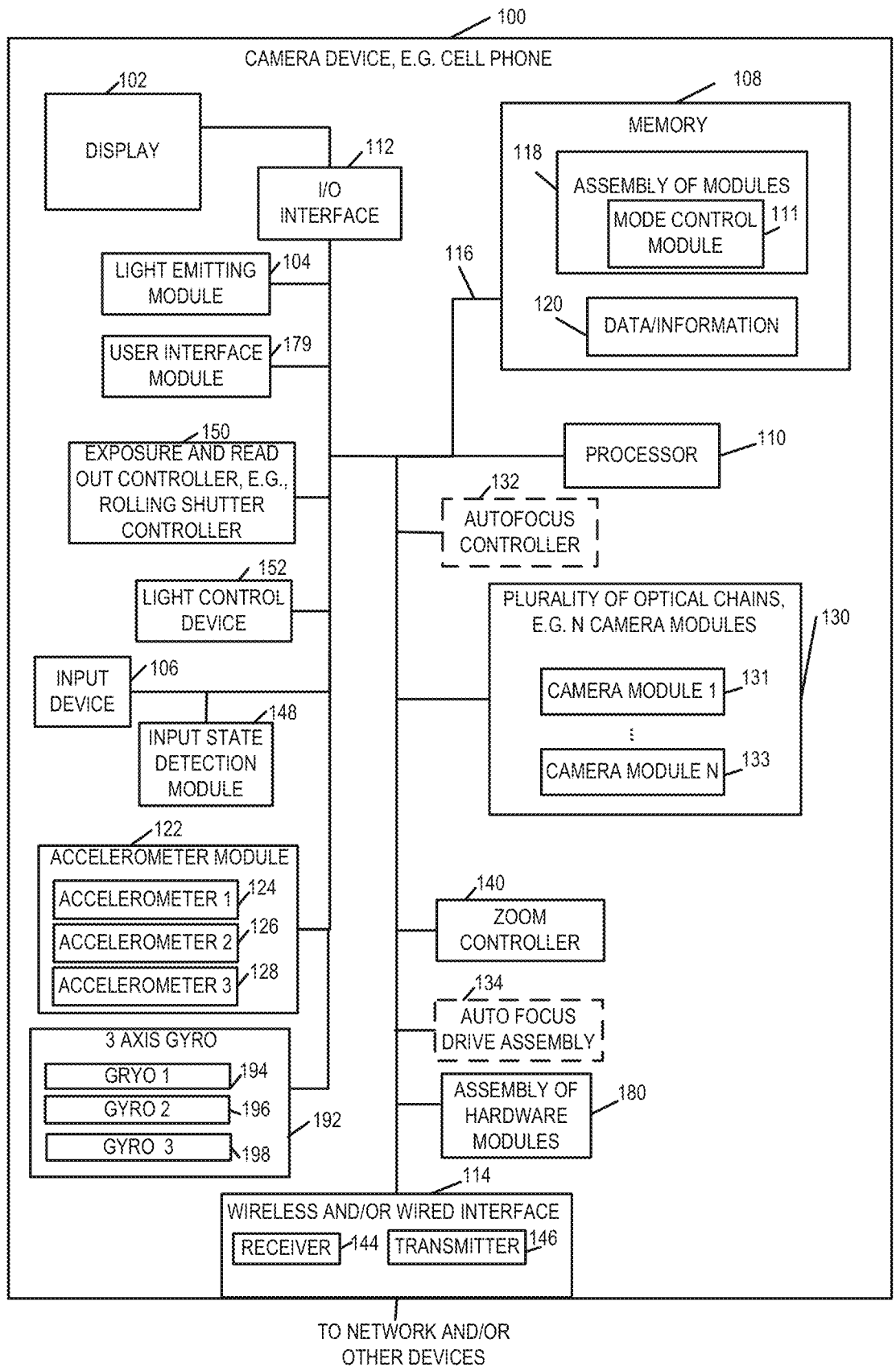
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a processor 110, a hardware assembly of modules 180, a wireless and/or wired interface 114, e.g., a cellular interface, a Wi-Fi interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis.

Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module, e.g., zoom controller 140, to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or undepressed state. In some embodiments there is a status register in the camera device 100 that includes a bit indicating the state of the zoom control button detected by the state detection module 148, e.g., whether it is in the depressed state indicating that zoom is enabled or whether it is undepressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

In addition to being coupled to the I/O interface 112, the bus 116 is coupled to the memory 108, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of various camera module sets and/or arrangements. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm or 150 mm equivalent focal length to a full frame DSLR camera are included in an individual camera device in some embodiments. The various focal lengths are exemplary and a wide variety of camera modules with different focal lengths may be used. Thus, in some embodiments the camera modules with the largest focal lengths have a 150 mm focal length where the 150 mm focal length is a 35 mm film equivalent focal length. Accordingly, while 140 mm camera modules are mentioned in some locations in this application in some embodiments 150 mm modules are used instead of 140 mm focal length modules. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The camera device 100 also includes a user interface module 179 which maybe and sometimes is implemented in hardware, e.g., as a circuit such as an ASIC, while in other embodiments the user interface 179 is implemented in software which, when executed by the processor 110 causes the processor 110 to control the camera device to implement one or more of the user interface control methods and features described herein.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. As discussed below, the acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus drive assembly 134 is, in some embodiments, implemented as a lens drive. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input. The processor 110 controls operation of the camera device 100 to control the elements of the camera device 100 to implement the steps of the methods described herein. The processor may be a dedicated processor that is preconfigured to implement the methods of the present invention. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture, image generation and/or image data processing methods of the present invention. Individual steps and/or lines of code in the modules of 118 when executed by the processor 110 control the processor 110 to perform steps of the method of the invention, e.g., generating depth map, determining maximum expected frequencies and/or filtering image portions, in accordance with the invention. When executed by processor 110, the assembly of modules 118 cause at least some data to be processed by the processor 110 in accordance with the method of the present invention, e.g., filtering image portions in accordance with the invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation. In some embodiments, the operations performed by the processor when executing the instructions from one or more assembly of modules is instead performed by a hardware module which performs the same functionality and is included in the hardware assembly of modules 180.

The resulting data and information (e.g., captured images of a scene, combined or composite images of a scene, filtered images etc.) are stored in data/information block 120 for future use, additional processing, and/or output, e.g., to display device 102 for display or to another device for transmission, processing and/or display. In some embodiments the data/information block 120 further includes optical chain information, e.g., optical characteristics, corresponding to the plurality of optical chains 130 in the device 100. If one or more parameters/settings in the optical characteristics of a camera module changes then the corresponding optical chain information stored in the data/information 120 is updated. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
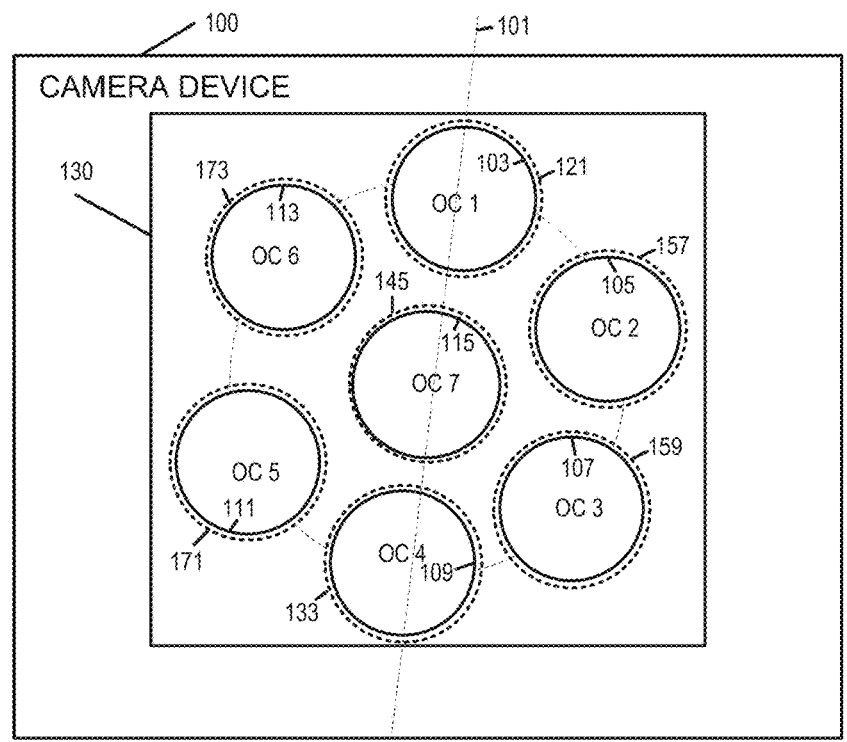
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer opening shown in FIG. 2 are shown as having circular apertures which are the same size, as will be discussed below different size openings may be used for different optical chains, e.g., depending on the focal length with optical chains having larger focal lengths normally including outer openings with larger apertures than optical chains with small focal lengths.

Figure 3:
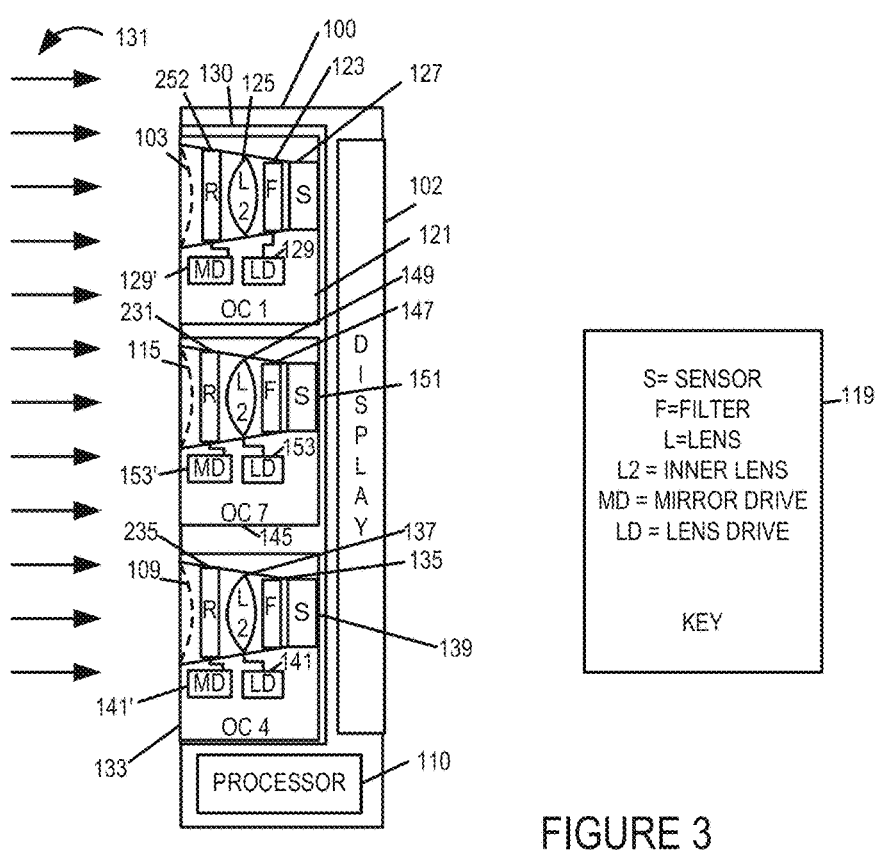
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer opening 103, a light redirection element 252, e.g., a mirror, an inner lens L2 125, a filter 123 and a sensor 127. In some embodiments the OC 1 121 further includes lens drive (LD) 129 for controlling the position of lens L2 125 for zooming and/or auto focus operation purposes and a mirror drive (MD) 129' for controlling the positioning of the light reflection element 252 as desired to deflect light. The outer opening 103 serves as an aperture of the camera module OC 121, e.g., for entry of light into OC 121. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive 129 can alter the relative position of a lens to the sensor 127, e.g., to change the distance between the sensor 127 and the lens 125 as part of a zooming and/or focus operation. The MD includes a motor or other drive mechanism which can control the relative angle of reflection element 252 allowing for alteration of angle of redirection of incident light.

OC 7 145 includes an outer opening 115, a light redirection element 231, an inner lens L2 149, a filter 147, and a sensor 151. OC 7 145 further includes LD 153 for controlling the position of lens L2 149 and a and a mirror drive (MD) 153' for controlling the positioning of the light reflection element 231. The LD 153 includes a motor or other drive mechanism which can move the lens, barrel, cylinder, sensor or other optical chain element to which it is connected.

OC 4 133 includes an outer opening 109, a light redirection element 235, an inner lens L2 137, a filter 135 and a sensor 139. OC 4 133 includes LD 141 for controlling the position of lens L2 137 and MD 141' for controlling the positioning of the light reflection element 235. The LD 153, 141 and MD 153', 141' include a motor or other drive mechanism and operates in the same or similar manner as the other drives of the other optical chains discussed above. In some embodiments each of the filters 123, 147 and 135 is an infrared (IR) filter. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. FIG. 5 shows optical chains, e.g., camera modules, which include light redirection devices. Such modules can be used alone or in combination with other modules such as the ones shown in FIGS. 3 and 4 or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. In some embodiments one or more light redirection elements, e.g., mirrors, such as elements 252, 231, 235 shown in FIG. 3, are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the outer openings 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost opening of each optical chain appearing as a circle represented using a solid line (OC 1 opening 103, OC 2 opening 105, OC 3 opening 107, OC 4 opening 109, OC 5 opening 111, OC 6 opening 113, OC 7 opening 115). In the FIG. 2 example, the plurality of optical chains 130 include seven optical chains, OC 1 121, OC 2 157, OC 3 159, OC 4 133, OC 5 171, OC 6 173, OC 7 145, which include openings 103, 105, 107, 109, 111, 113, 115), respectively, represented by the solid circles shown in FIG. 2. While the outer opening may be a circular opening in some embodiments, in some other embodiments the entry point for the light into the optical chains has a plastic element covering the opening. The outer openings of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses occupy.

While seven optical chains are shown in FIG. 2, it should be appreciated that other numbers of optical chains are possible. For example, in some embodiments, seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark portions of a scene area can be sensed by the sensor corresponding to the longer exposure time while the light portions of a scene area can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As shown in FIG. 3, each of the optical chains OC 1 121, OC 7 145, OC 4 133 may, and in some embodiments do, include an outer opening, a light redirection element such as a mirror or prism, a filter F, and a lens L2 which proceed a sensor S which captures and measures the intensity of light which passes through the outer opening serving as the aperture, the lens L2 and the filter F to reach the sensor S. The filter may be a color filter or one of a variety of other types of light filters or may be omitted depending on the particular optical chain embodiment or configuration. In some embodiments the filter is an IR filter.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4:
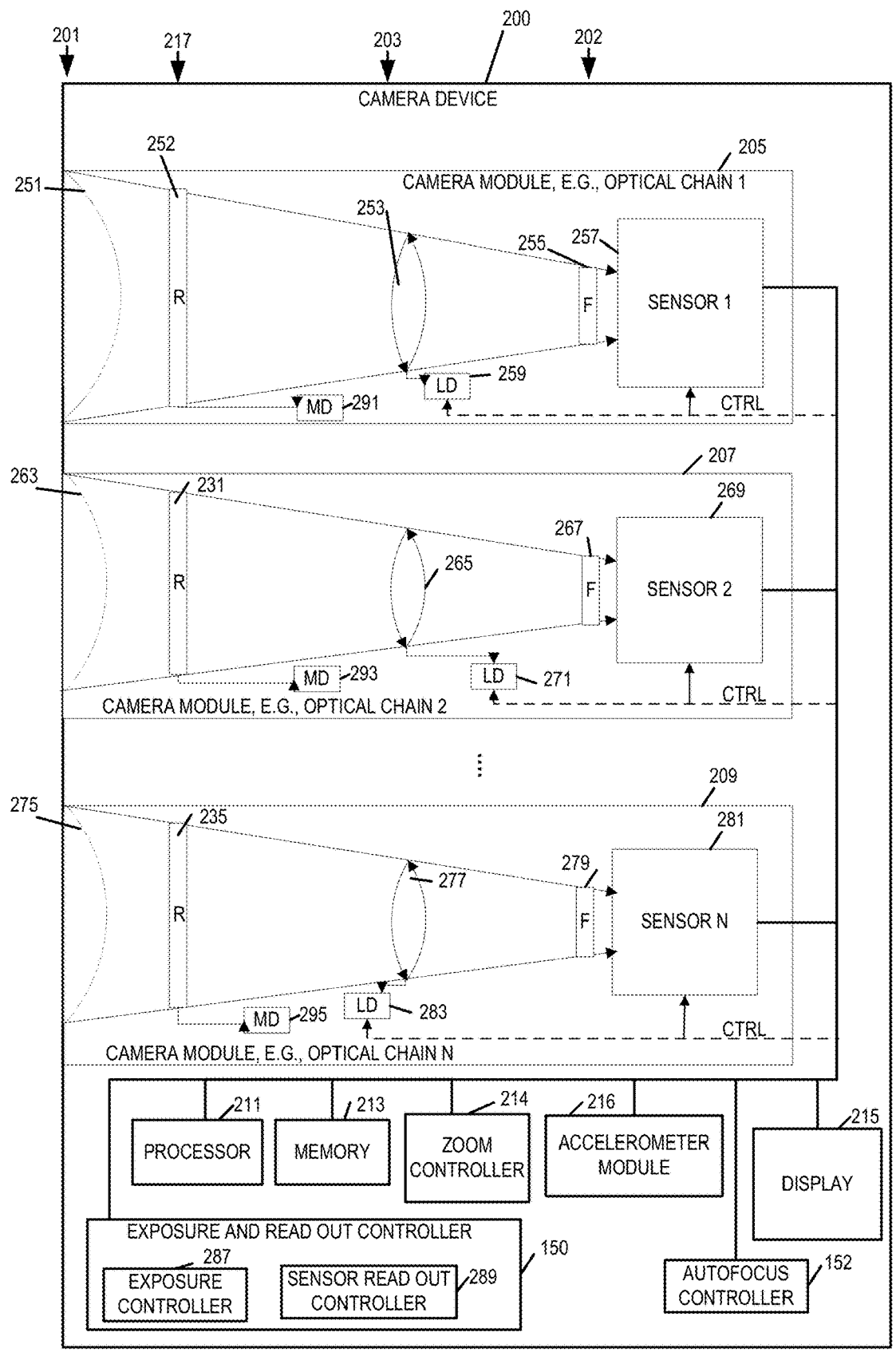
FIG. 4 illustrates a camera device implemented in accordance with another embodiment.
Figure 5:
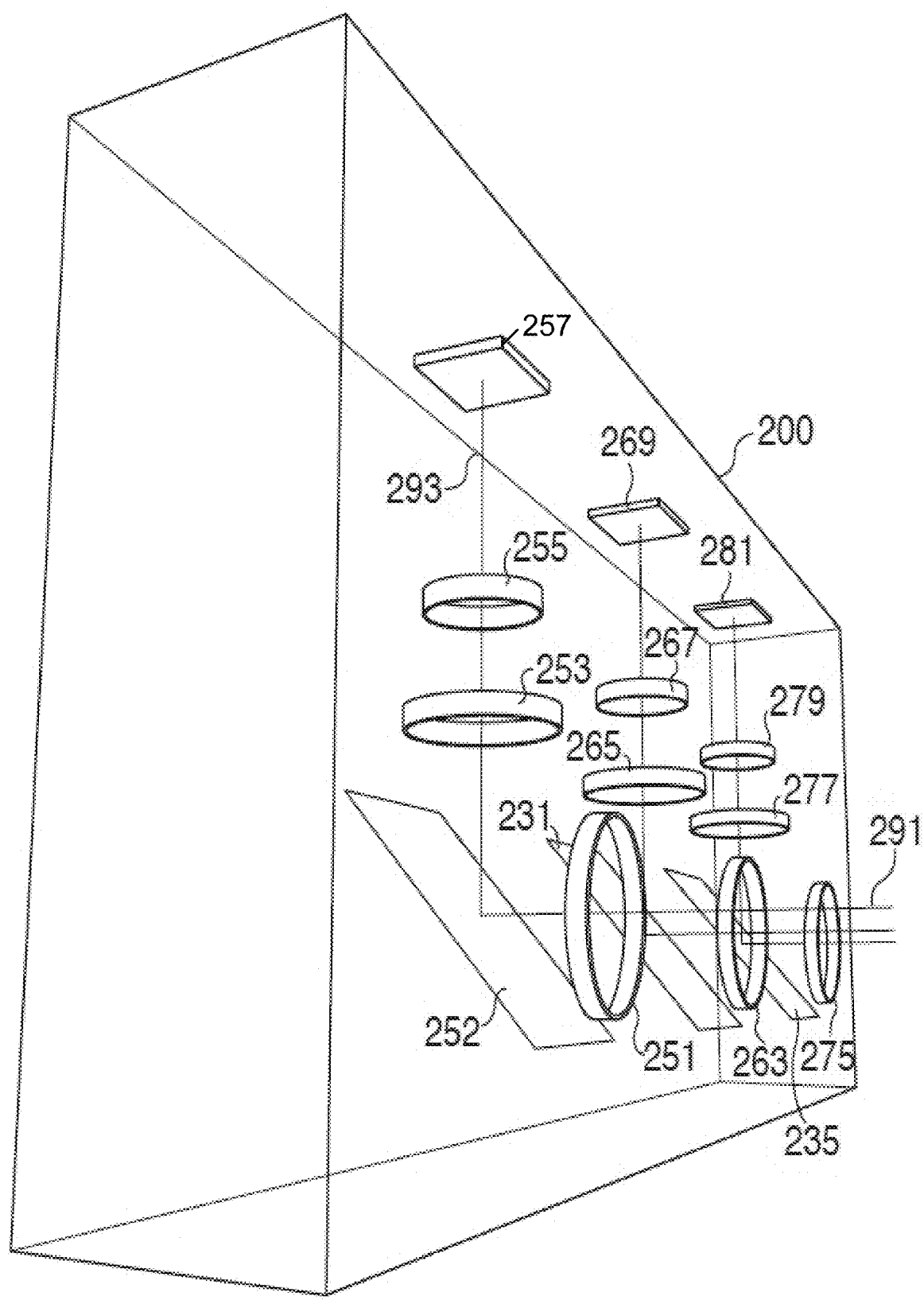
FIG. 5 illustrates the optical chains of the camera device shown in FIG. 4, as implemented in one particular exemplary embodiment, in greater detail.

FIG. 4 illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC X 209, a processor 211, memory 213 and a display 215, coupled together. OC 1 205 includes outer opening 251, a light redirection element R 252, a hinge (or mirror) drive MD 291, an inner lens L2 253, a filter 255, sensor 1 257, and LD 259. The MD 291 can be used to move a position of a hinge to which the light redirection device (R) 252, e.g., mirror, is mounted and thus move the mirror to change the scene area to which the module 205 is directed without moving the optical chain 205. Moving (e.g., rotating about a hinge) the mirror 252 to change the scene area to which the module 205 is directed is especially useful in an embodiment where the outer opening 251 is a plane piece of glass or a plastic piece with no optical power as is the case in some embodiments.

The optical chains shown in FIG. 4 can be arranged in various positions within the camera 200. The elements in FIG. 5 which are the same as those shown in FIG. 4 are identified using the same references numbers and will not be described again. FIG. 5 shows the configuration of the optical chains in an arrangement where light enters via the front or face of the camera 200 and is redirected to sensors 257, 269, 281, of the first through third camera modules respectively, mounted on the inside top portion of the camera housing which forms the outer portion of camera 200.

As can be seen in the FIG. 5 embodiment, light entering in the horizontal dimension is redirected upward in the vertical. For example, light entering through outer opening 251 of the first optical chain 205 is redirected upward by mirror 252 so that it passes though the inner lens 253 and the filter 255 as it travels towards sensor 257. An optical chain such as the first optical chain 205, that has a light redirection element, such as the element 252, can be divided, for purposes of discussion, into two parts, Part A and Part B. Part A consists of all those elements in the optical chain that are in the light path before the light redirection element 252 and Part B consists of all the optical elements (including the image sensor) that are in the light path after the light redirection element. The optical axis of the optical chain 205 as seen from outside the camera is the optical axis 291 of Part A. Light traveling into the optical chain 205 along the optical axis 291 will be redirected upward along the optical axis 293 of Part B of the first optical chain.

In one particular exemplary embodiment of the optical chain 205, Part A contains no optical elements with any optical power, e.g., Part A contains plane glass or filters but no lenses. In this case the optical axis of the optical chain as seen from outside the camera is simply along a light path that gets redirected along the optical axis 293 of Part B by the light redirection element. In some embodiments one or more lenses 253 are included in Part B of the optical chain which have an optical power. Thus, it should be appreciated that in at least some embodiments the outer opening 251 may be implemented as a flat glass plate or relatively flat plastic or glass element which does not protrude from the surface of the camera 200. This reduces the risk of scratches and also reduces the possibly that an outer portion which is covering or forming the opening will get caught when inserting or removing it from a pocket or case as might be the case if the opening is covered by a curved lens protruding from the camera.

It should be appreciated that the optical axis of the second and third camera modules are similar to that of the first optical module 205 and that the components of the optical chains may also be grouped into two parts, Part A which corresponds to components proceeding the mirror of the optical chain and Part B which corresponds to components subsequent the mirror of the optical chain. From the perspective of the optical path of an optical chain, the optical path like the components may be grouped as Part A and Part B with the mirror providing the transition point between Part A of an optical path and Part B of the optical path.

In some but not all embodiments, processor 211 of camera device 200 of FIG. 4 is the same as or similar to processor 110 of device 100 of FIG. 1, memory 213 of device 200 of FIG. 4 is the same as or similar to the memory 108 of device 100 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4 is the same as or similar to the display 102 of device 100 of FIG. 1.

OC 2 207 includes outer opening 263, light redirection device 231, mirror drive 293, inner lens 265, filter 267, sensor 2 269, and LD 271. OC N 209 includes outer opening 275, light redirection device 235, mirror drive 295, inner lens 277, filter 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 152 is included to control the lens drives 259, 271 and 283 in some embodiments.

In the FIG. 4 embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4, the structural relationship between the mirror and various lenses and filters which precede the sensor in each optical chain can be seen more clearly than in some of the other figures. While four elements, e.g. an opening, lens (see columns 201 and 203), a light redirection device R (see col. 217), and the filter (corresponding to column 202) are shown in FIG. 4 before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

FIG. 6-29 illustrate various exemplary user interface screens that may be displayed to a user of the camera device shown in FIG. 1 via which the user may control the camera operations in accordance with the invention.

Figure 6:
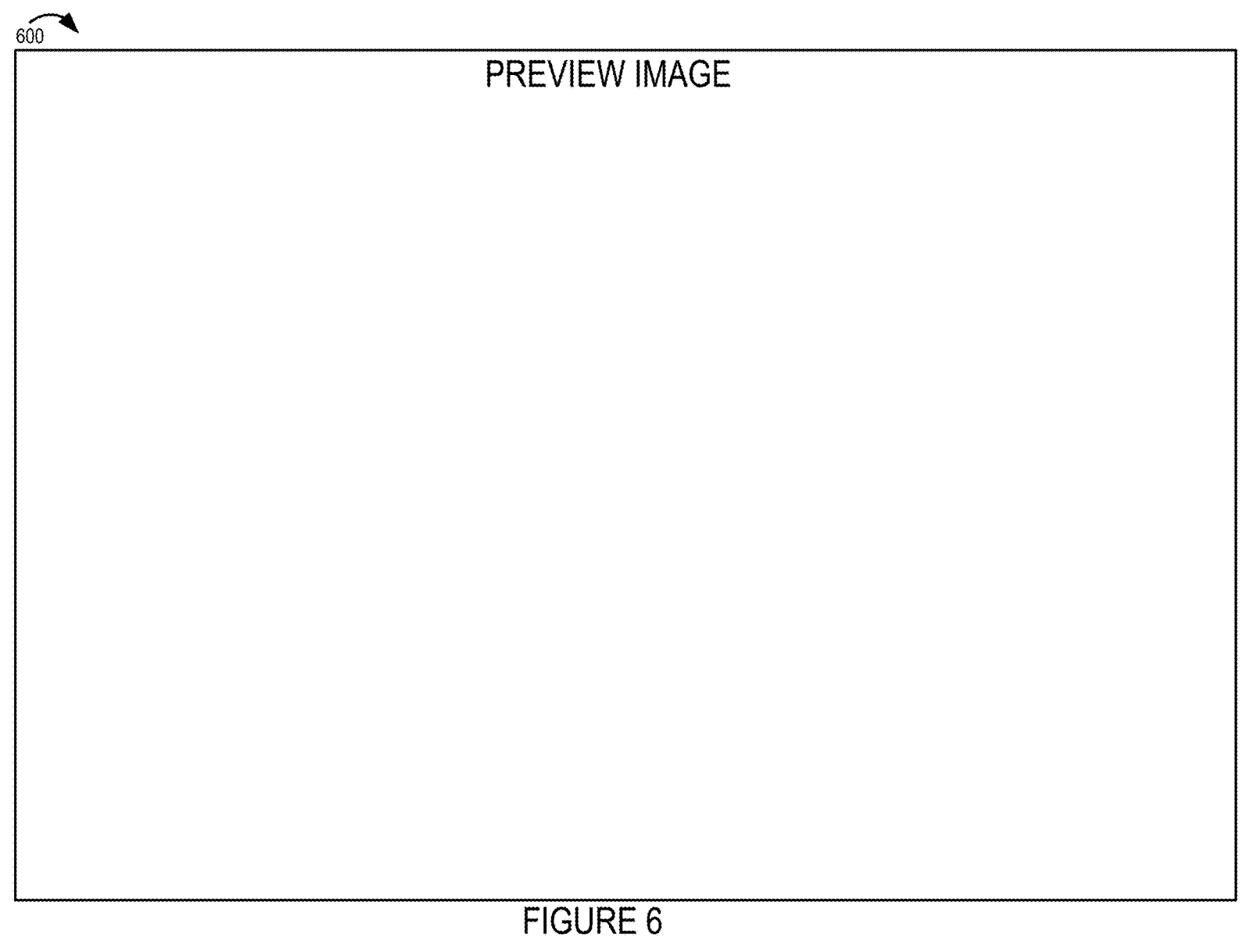

FIG. 6 shows an exemplary user interface screen 600 displayed to the user upon switching the camera device on in a normal mode of operation, in accordance with one embodiment. In some embodiments the default mode of operation of the camera is the normal mode in which while a preview image of environments/objects scanned by the camera are displayed but control options for controlling camera settings are not displayed. As can be seen in FIG. 6, the user interface screen 600 simply displays a preview image (not illustrated graphically but indicated by the word "Preview Image") while not displaying other options and/or control features.

Figure 7:
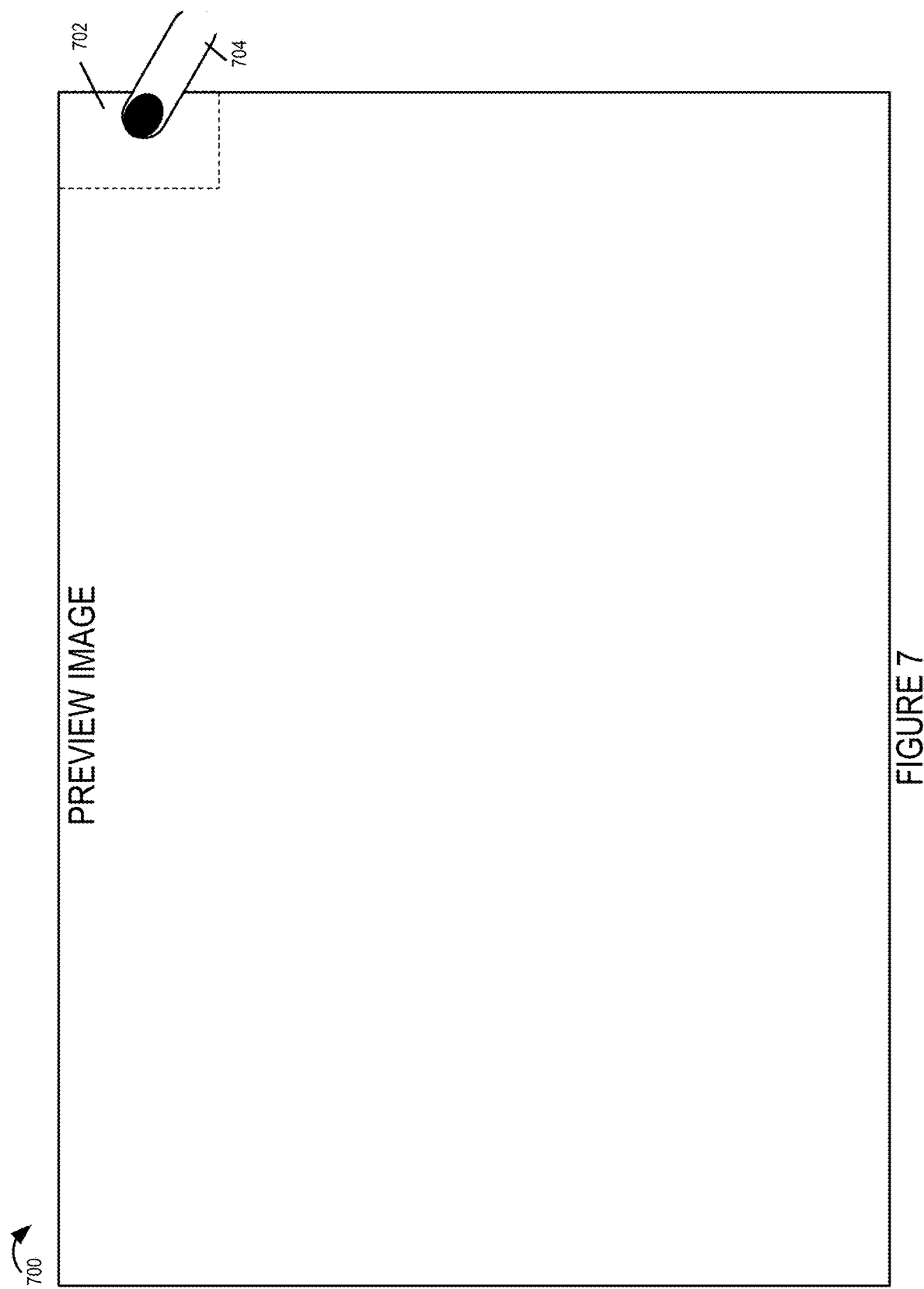
FIG. 7 shows an exemplary user interface screen with a user's finger tapping or being swiped on an area of the display screen.

FIG. 7 shows an exemplary user interface screen 700 with a user's finger 706 tapping or being swiped on an area 702 of the display screen. In accordance with one aspect of some embodiments when the camera is in normal mode and the user touches, e.g., taps and/or swipes, the area 702 of the display screen, the device switches to a control mode and one or more control options are subsequently presented as will be discussed in more detail later. While in FIG. 7 example the area 702 is shown as a small portion on the top right corner of the display screen it should be understood that this is merely exemplary. The area 702 may be bigger, smaller or may correspond to a different portion of the display screen, e.g., bottom right, top left, bottom left etc. Furthermore the user input for controlling switching from normal mode to control mode may be provided in other predetermined manners too, for example, by swiping the fingers in a particular fashion, by tapping the screen a predetermined number of times and/or in a number of other manners and the camera is able to detect such user inputs.

Figure 8:
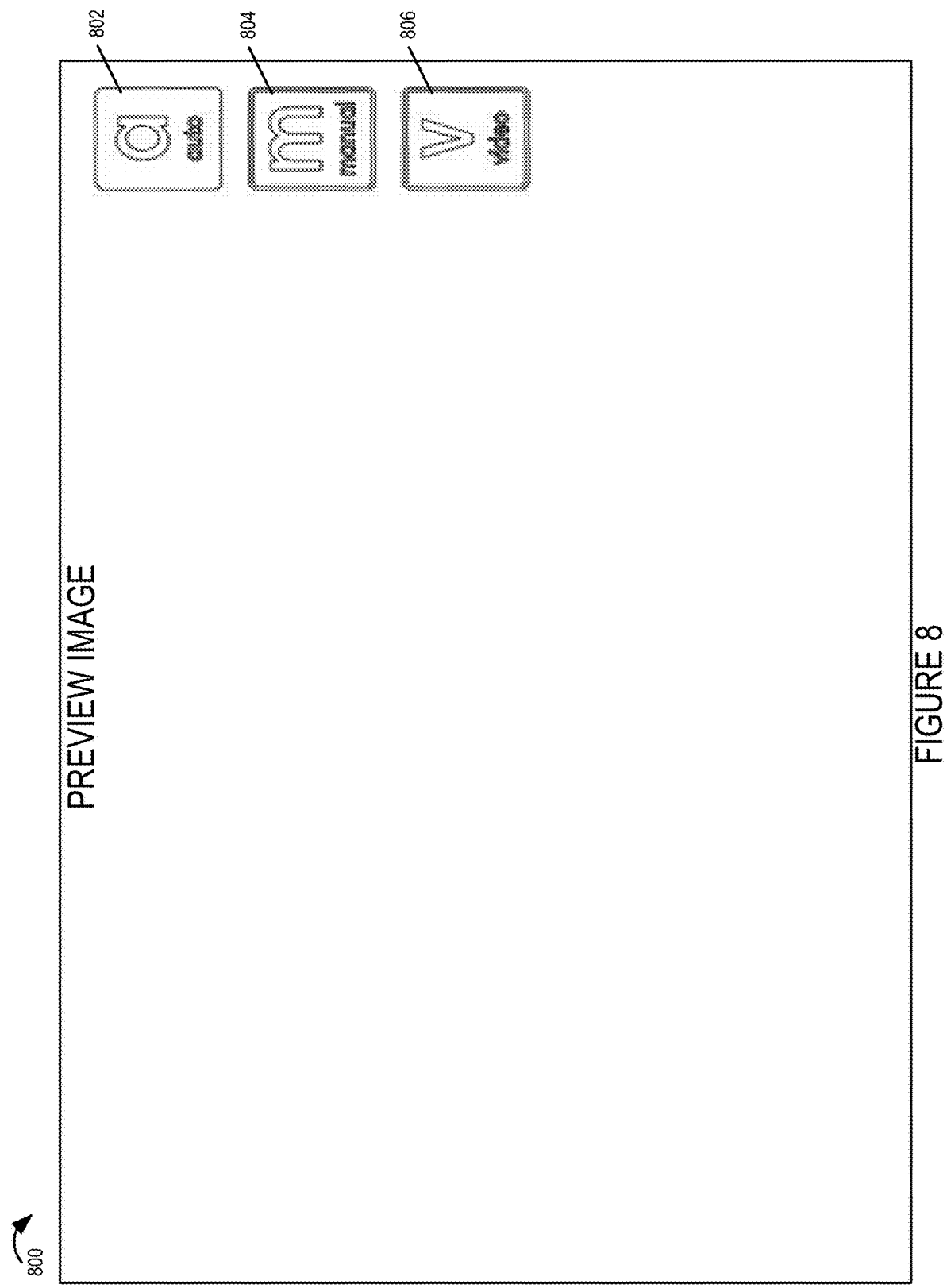
FIG. 8 shows an exemplary user interface screen displayed to the user upon the camera detecting user input, e.g., finger tap, on the display screen over the area shown in FIG. 7.

FIG. 8 shows an exemplary user interface screen 800 displayed to the user upon the camera detecting user input, e.g., finger tap, on the display screen over the area 702 shown in FIG. 7. The user interface screen 800 shows the control options displayed to the user on the screen subsequent to the camera detecting user input indicating a desire to view control options and/or desire to switch to a control mode of operation. In some embodiments various icons corresponding to control options are displayed from top to bottom arranged vertically on the right side of the display screen 800. However a variety of other different arrangements are possible. The displayed control options include an option to select an auto control mode represented by auto icon 802, an option to select a manual control mode represented by manual icon 804 and an option to select video mode represented by video icon 806. The user may tap any of these icons to select the corresponding option. It should be appreciated that while various options are displayed the display screen continues to show the preview image in the background.

Figure 9:
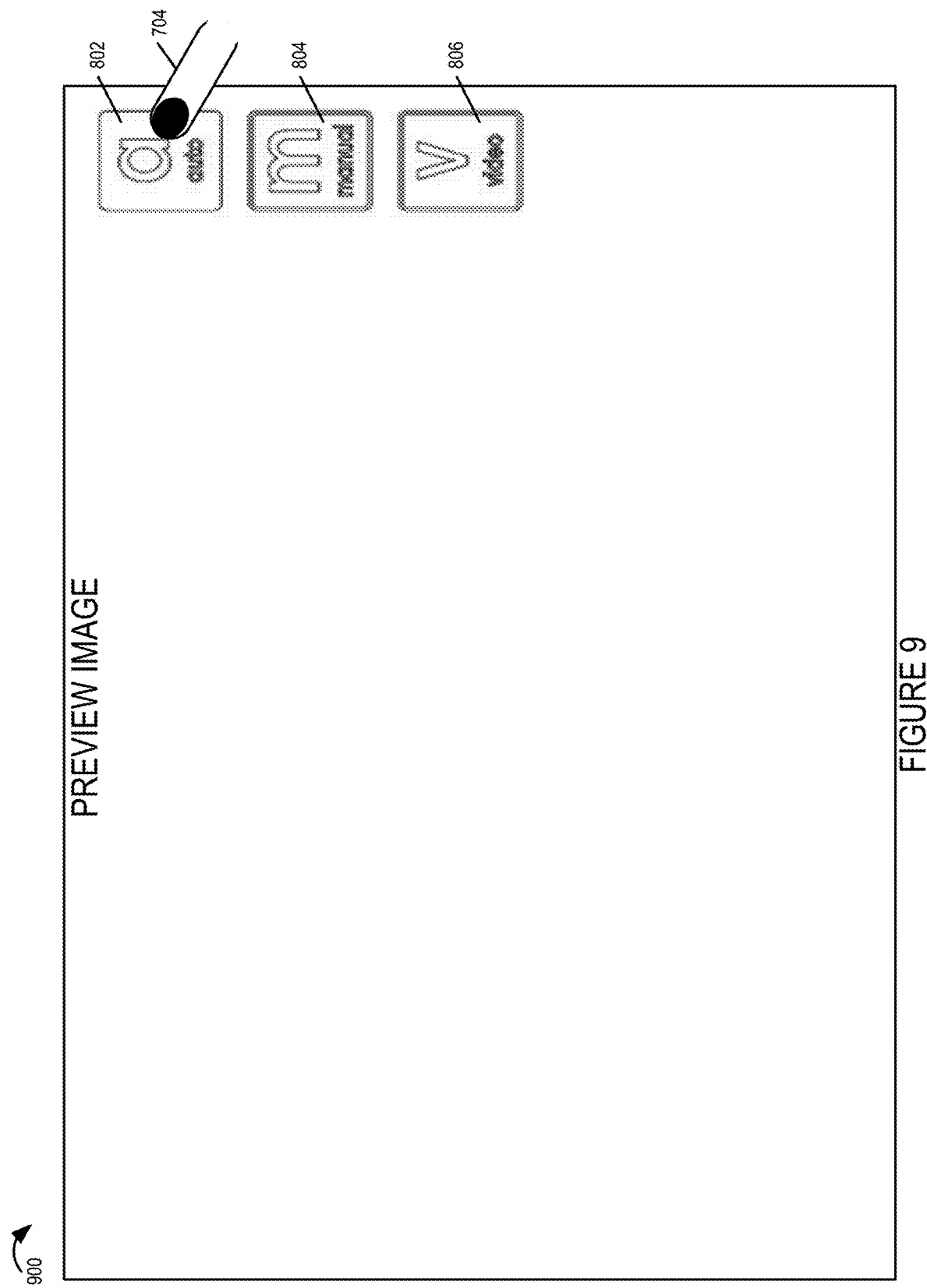
FIG. 9 illustrates a drawing showing a display screen with the same control options as shown in FIG. 8 but with a user's finger being additionally shown tapping/pressing the auto mode icon on the display screen.

FIG. 9 illustrates a drawing 900 showing a display screen with the same control options as shown in FIG. 8 but with a user's finger 704 being additionally shown tapping/pressing the auto mode icon 802 on the display screen.

Figure 10:
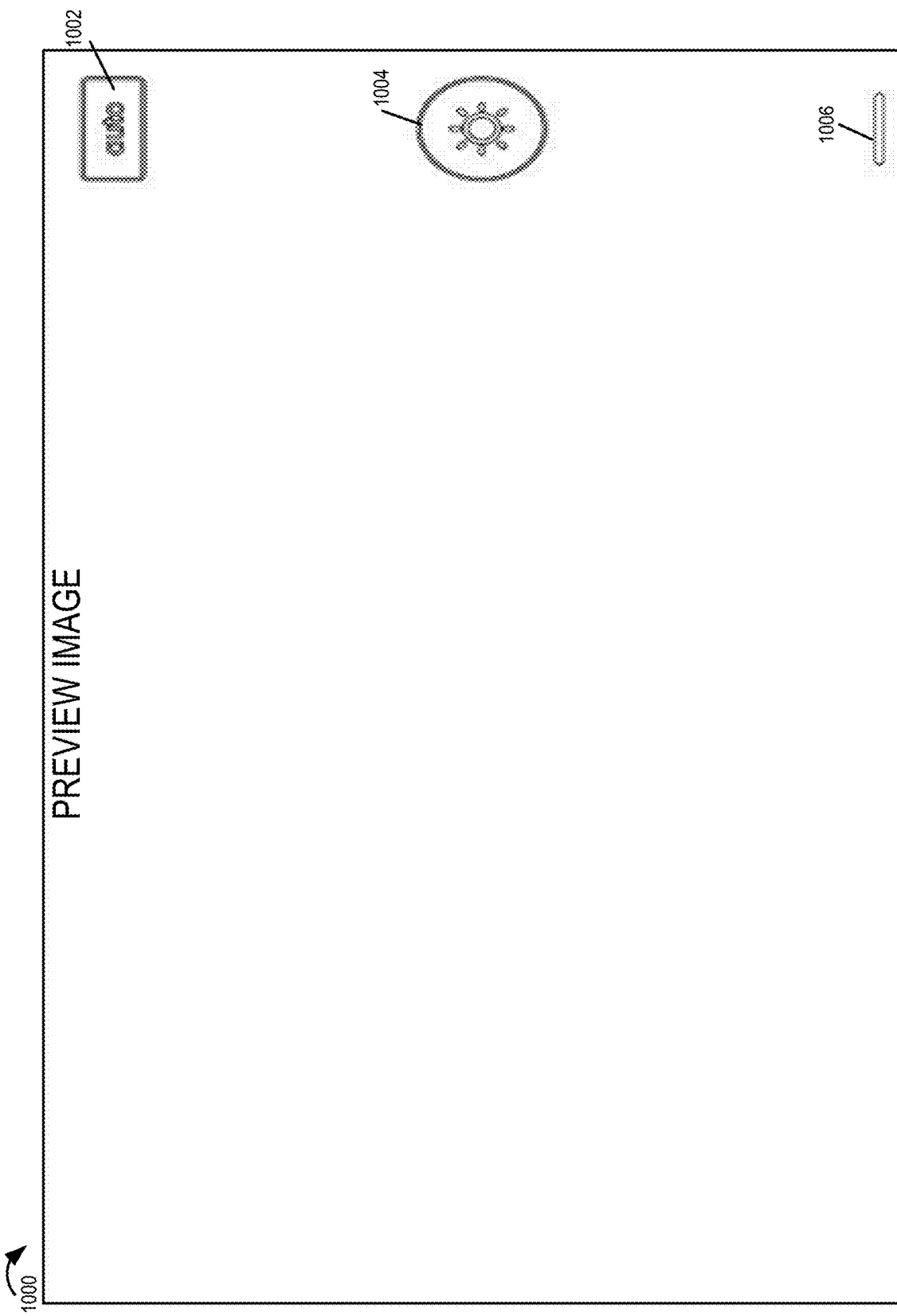
FIG. 10 illustrates a user interface screen displayed subsequent to the selection of the auto control mode option by the user shown in FIG. 9.

FIG. 10 illustrates a user interface screen 1000 displayed subsequent to the selection of the auto control mode option by the user shown in FIG. 9. Subsequent to the selection of auto control mode option, an auto mode indicator 1002, an exposure control option 1004 and an additional options bar 1006 is displayed on the screen as shown in FIG. 10. The auto mode indicator 1002 is an indicator displayed to indicate/notify the user that the camera is in auto control mode. In accordance with one aspect of some embodiments in auto control mode various camera controls such as shutter speed, brightness, ISO, exposure etc., are automatically controlled and limited options are available to the user for modification. For example while many other options are automatically controlled in the auto control mode, still in some embodiments exposure control option 1004 is provided to the user with limited selectable exposure settings for the user to select if desired. The additional options bar 1006 is available to allow the user to view more available options beyond the ones displayed on the user interface screen 1000 of FIG. 10.

Figure 11:
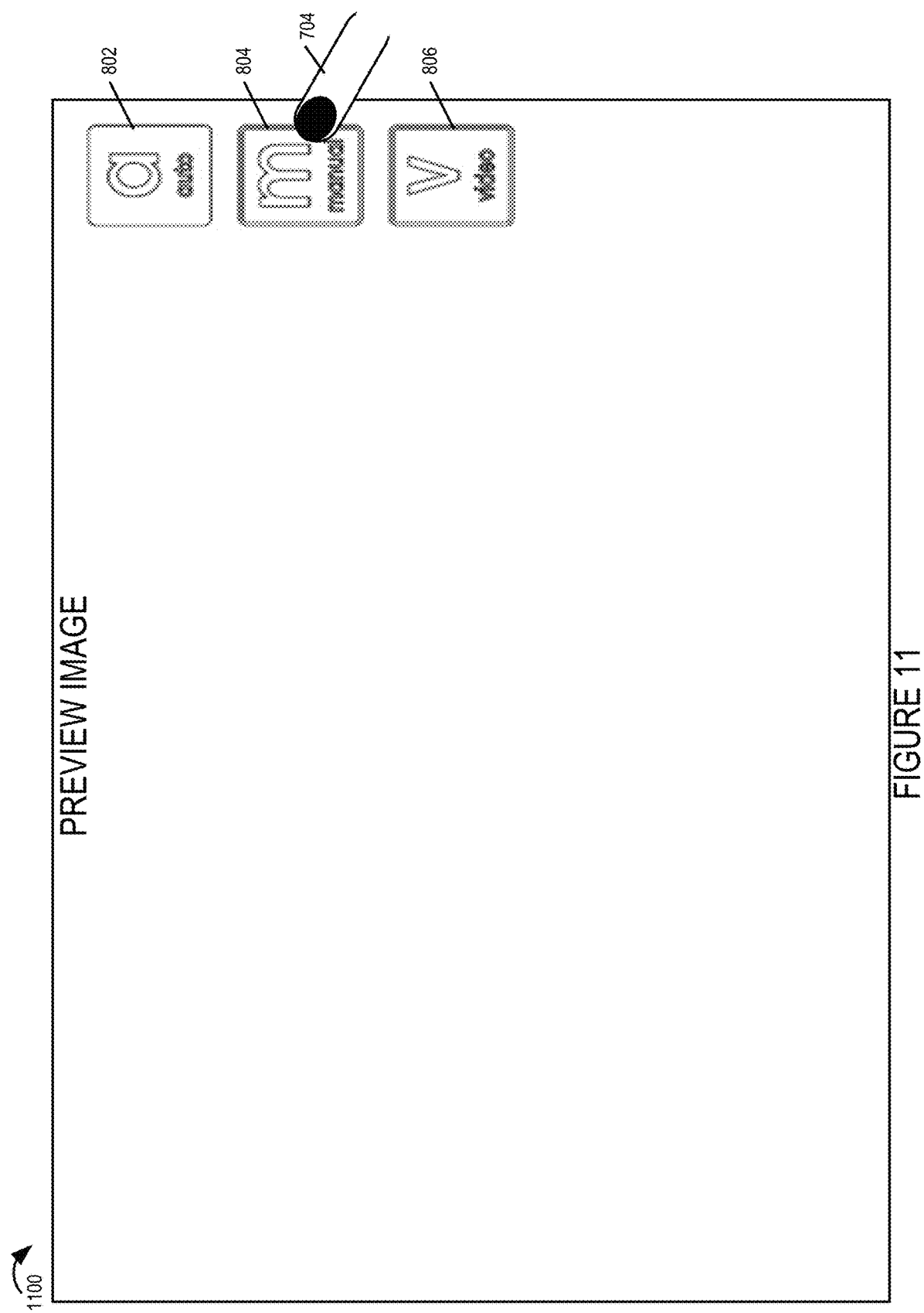
FIG. 11 illustrates a drawing showing a user interface screen with the same control options as shown in FIG. 8 but with a user's finger being additionally shown tapping/pressing the manual mode icon on the display screen.

FIG. 11 illustrates a drawing 1100 showing a user interface screen 1100 with the same control options as shown in FIG. 8 but with a user's finger 704 being additionally shown tapping/pressing the manual mode icon 804 on the display screen.

Figure 12:
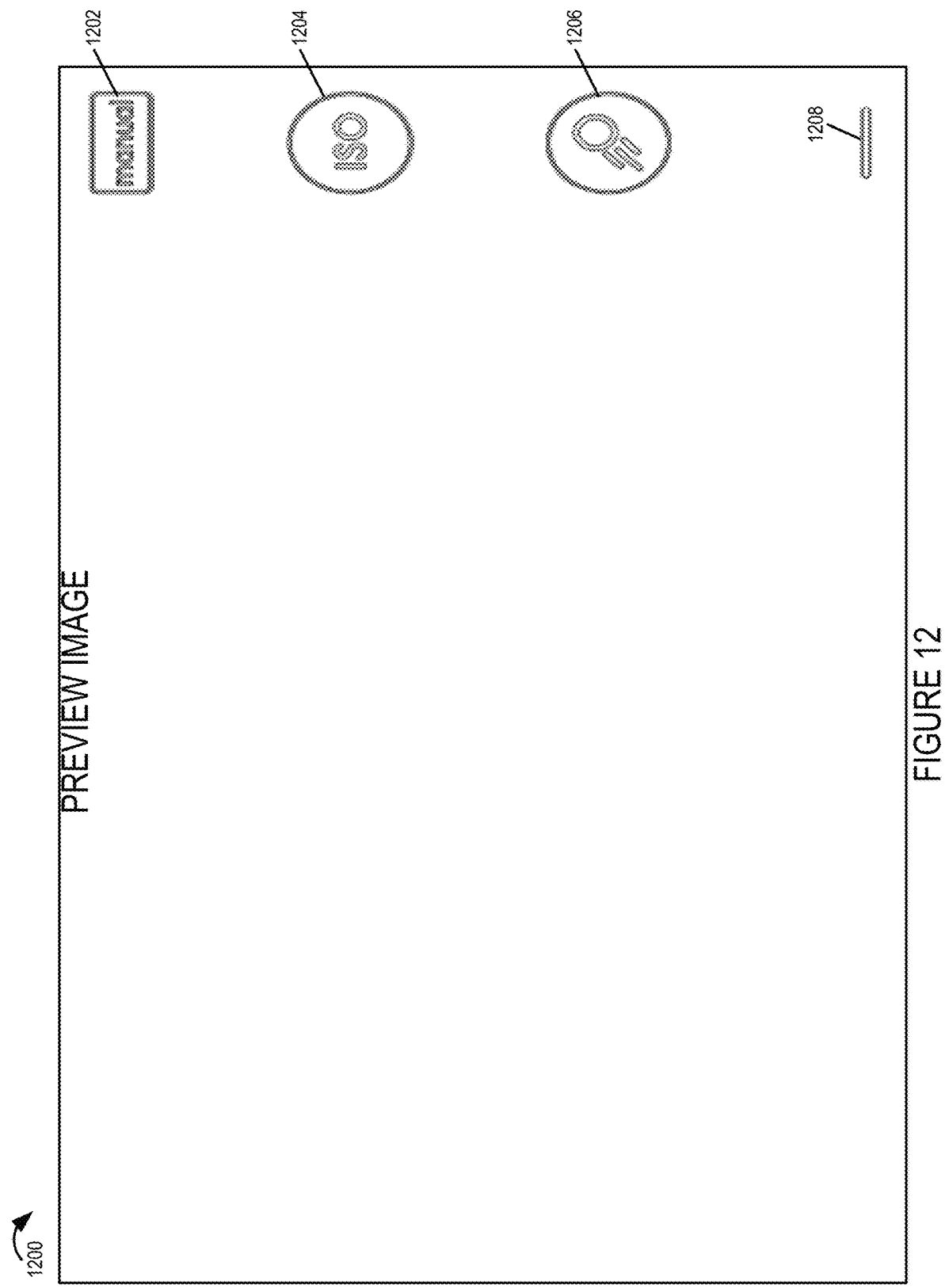
FIG. 12 illustrates a user interface screen displayed subsequent to the selection of the manual control mode option by the user shown in FIG. 10.

FIG. 12 illustrates a user interface screen 1200 displayed subsequent to the selection of the manual control mode option by the user shown in FIG. 10. Subsequent to the selection of manual control mode option, a manual mode indicator 1202, an ISO control option 1204, a shutter speed control option 1206 and an additional options bar 1208 is displayed on the screen as shown in FIG. 12. The manual mode indicator 1002 is an indicator displayed to indicate/notify the user that the camera is in manual control mode. In accordance with one aspect of some embodiments in the manual control mode various camera controls are available to the user and can be set/configured by the user as desired. Among the available control options in the manual mode is an ISO control option represented by the ISO icon 1204, a shutter speed control option represented by the icon 1206. The ISO control option 1204 allows the user to control the sensitivity of the image sensor by increasing or decreasing a selectable ISO value. The shutter speed control option 1206 allows the user to control the shutter speed by increasing or decreasing a selectable shutter speed value. The additional options bar 1208 is available to allow the user to view more available options beyond the ones displayed on the user interface screen 1200 of FIG. 12.

Figure 13:
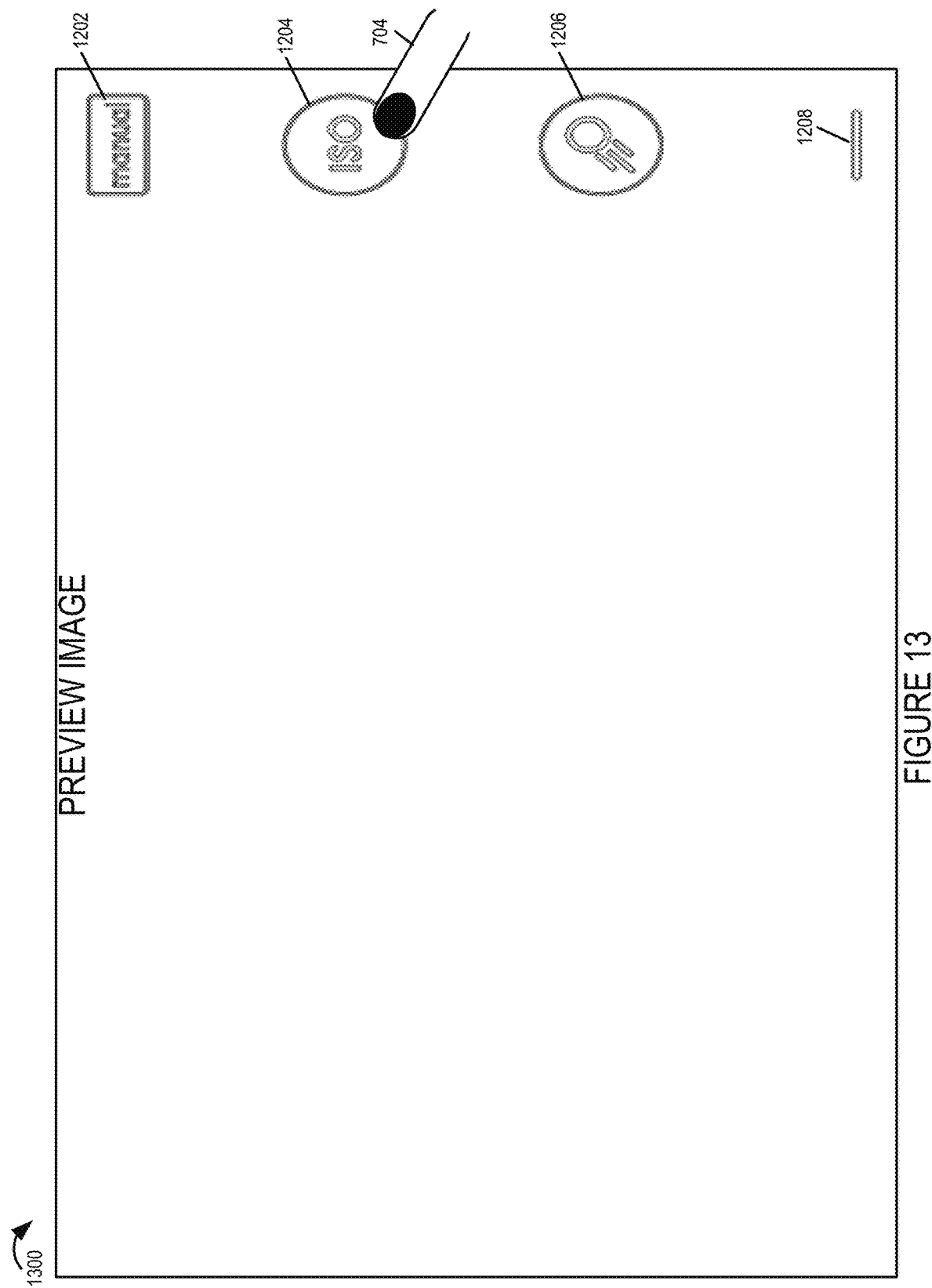
FIG. 13 illustrates a drawing showing a user interface screen with the same control options as shown in FIG. 12 but with the user's finger being additionally shown tapping/pressing the ISO control icon on the display screen to select the ISO control option.

FIG. 13 illustrates a drawing showing a user interface screen 1300 with the same control options as shown in FIG. 12 but with the user's finger 704 being additionally shown tapping/pressing the ISO control icon 1204 on the display screen to select the ISO control option.

Figure 14:
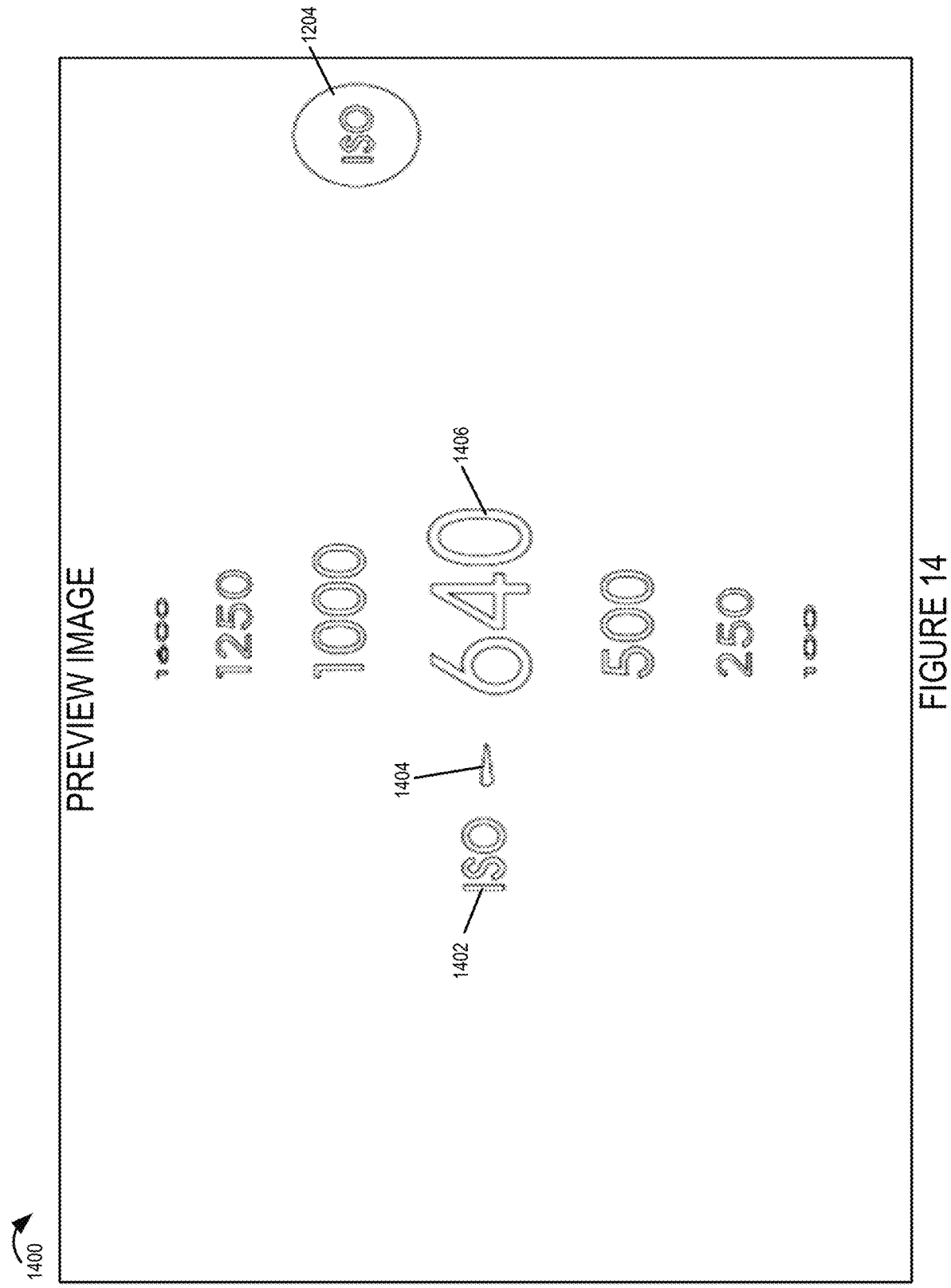
FIG. 14 illustrates a user interface screen displayed subsequent to the selection of the ISO control option in FIG. 13.

FIG. 14 illustrates a user interface screen 1400 displayed subsequent to the selection of the ISO control option in FIG. 13. Subsequent to the selection of the ISO control option a set of user selectable control values, e.g., ISO control values in FIG. 14, are displayed to the user on the display screen 1400 as shown in FIG. 14. As illustrated in the figure, in some embodiments the user selectable control values are displayed as if arranged on the surface of a rotating wheel with a currently selected value being closest to the user, e.g., in the center and displayed in larger font, and other selectable values above and below the currently selected value being shown using a smaller size as if further away from the user. In the illustrated example of FIG. 14 it can be seen that the currently selected value 1406 (e.g., ISO value of 640 in the example) that will appear to be closest to the user is in the center and appears more prominent than other displayed values. The user may swipe his finger on the screen in upward or downward direction to change the ISO value with a new currently selected ISO value moving to the position in the center adjacent the current selection pointer 1404, e.g., as part of a simulated wheel rotation, and the previously selected ISO value moving away from the center position. In some embodiments a vibration, also sometimes referred to as a haptic, is generated each time a new value moves to the center of the screen as part of the simulated wheel rotation. An ISO indicator 1402 can also been seen on the display screen indicating that control values being displayed correspond to ISO control settings. Furthermore the ISO control option icon 1204 is also displayed on the right side. If the user taps the ISO control option icon 1204 the display screen shown in FIG. 14 switches back to the main control options display screen 1200 of FIG. 12.

Figure 15:
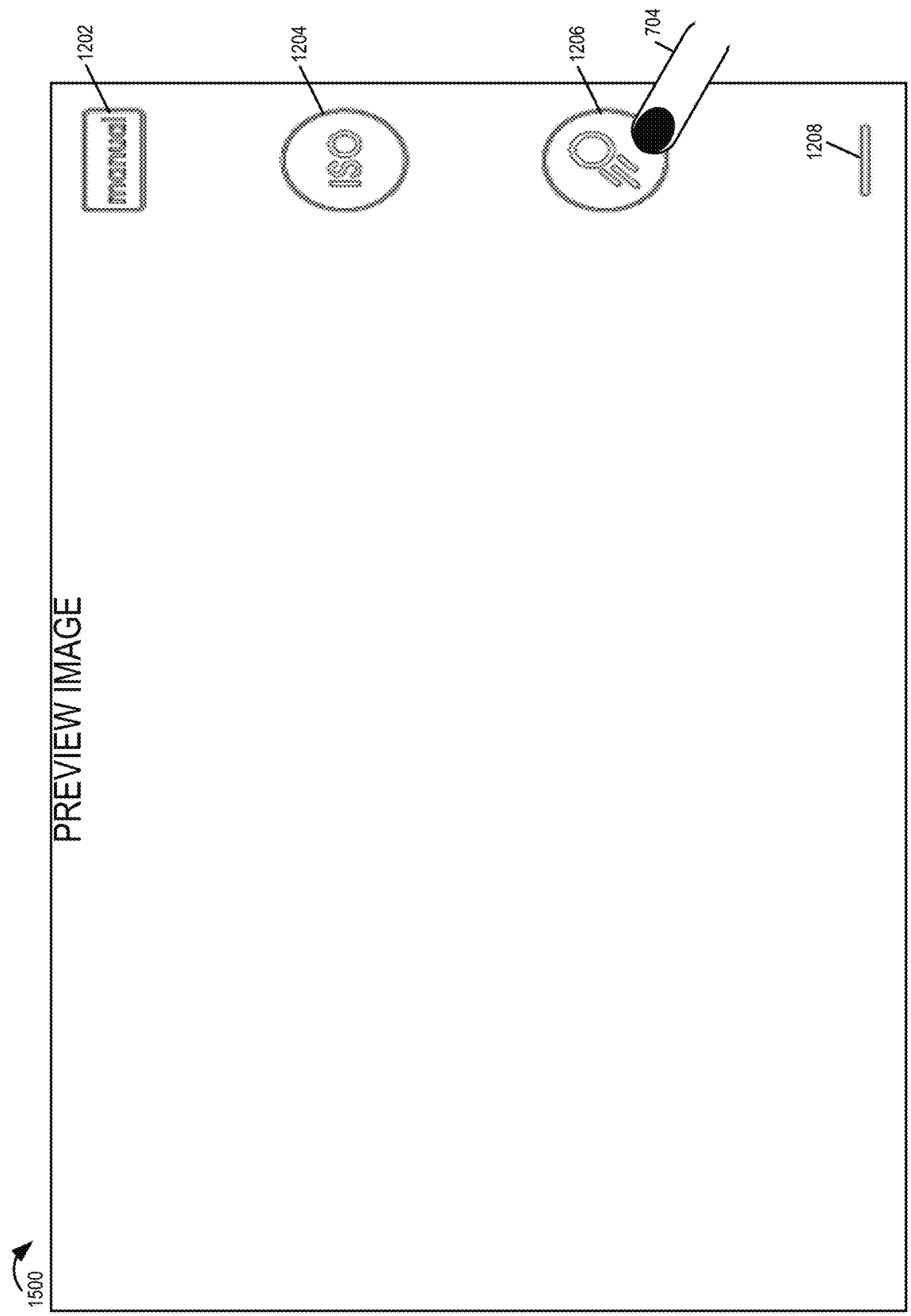
FIG. 15 illustrates a drawing showing a user interface screen with the same control options as shown in FIG. 12 but with the user's finger being additionally shown tapping/pressing the shutter speed control icon on the display screen to select shutter speed control option.

FIG. 15 illustrates a drawing showing a user interface screen 1500 with the same control options as shown in FIG. 12 but with the user's finger 704 being additionally shown tapping/pressing the shutter speed control icon 1206 on the display screen to select shutter speed control option.

Figure 16:
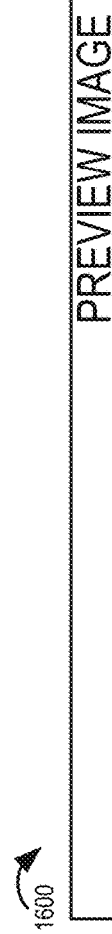
FIG. 16 illustrates a user interface screen displayed subsequent to the selection of the shutter speed control option in FIG. 15.

FIG. 16 illustrates a user interface screen 1600 displayed subsequent to the selection of the shutter speed control option in FIG. 15. Subsequent to the selection of the shutter speed control option a set of user selectable control values, e.g., shutter speed control values in FIG. 16 example, are displayed to the user on the display screen 1600 as shown in FIG. 16. As illustrated in the figure, the user selectable shutter speed control values are displayed as if arranged on the surface of a rotating wheel with a currently selected value being closest to the user, e.g., in the center and displayed in larger font, and other selectable values above and below the currently selected value being shown using a smaller size as if further away from the user. In the illustrated example of FIG. 16 it can be seen that the currently selected shutter speed value 1606 is $\frac{1}{125}$. In some embodiment a vibration (haptic) occurs each time a value moves to the center of the screen as part of the simulated wheel rotation. The user may swipe his finger on the screen in upward or downward direction to change the shutter speed with a new currently selected shutter speed value moving to the position in the center adjacent the current selection pointer 1604 and the previously selected shutter speed value moving away from the center position. A shutter speed indicator 1602 can also been seen on the display screen indicating that control values being displayed correspond to the shutter speed control settings. Furthermore the shutter speed control option icon 1206 is also displayed on the right side portion of the display. In some embodiments if the user taps the shutter speed control option icon 1206 the display screen shown in FIG. 16 switches back to the main control options display screen 1200 of FIG. 12.

Figure 17:
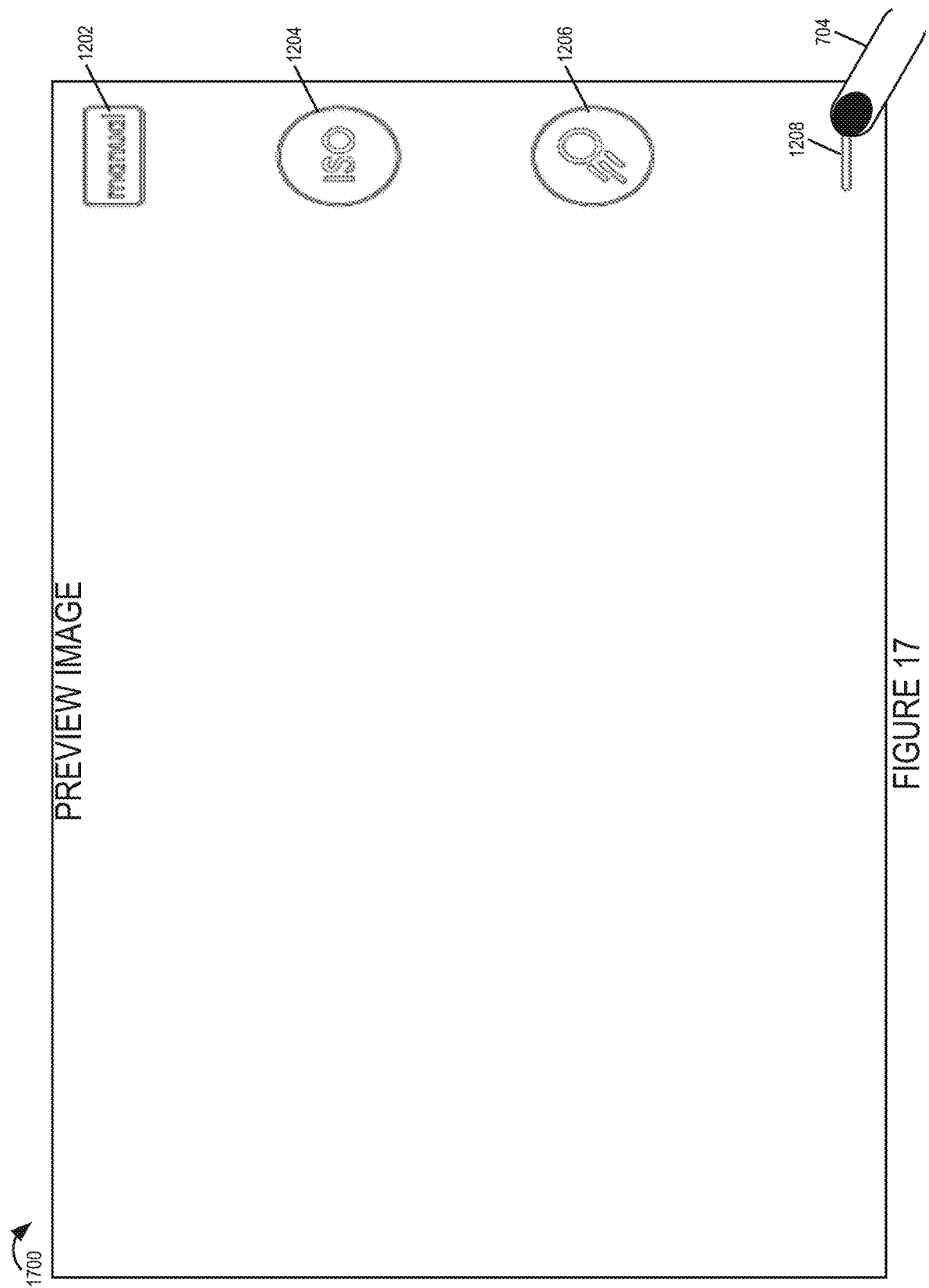
FIG. 17 illustrates a drawing showing a user interface screen with the same control options as shown in FIG. 12 but with the user's finger being additionally shown tapping/pressing the additional options icon on the display screen to view additional available control options.

FIG. 17 illustrates a drawing showing a user interface screen 1700 with the same control options as shown in FIG. 12 but with the user's finger 704 being additionally shown tapping/pressing the additional options icon 1208 on the display screen to view additional available control options. Upon selecting, e.g., tapping/pressing, the additional options icon 1208 additional available control options, if any, are displayed.

Figure 18:
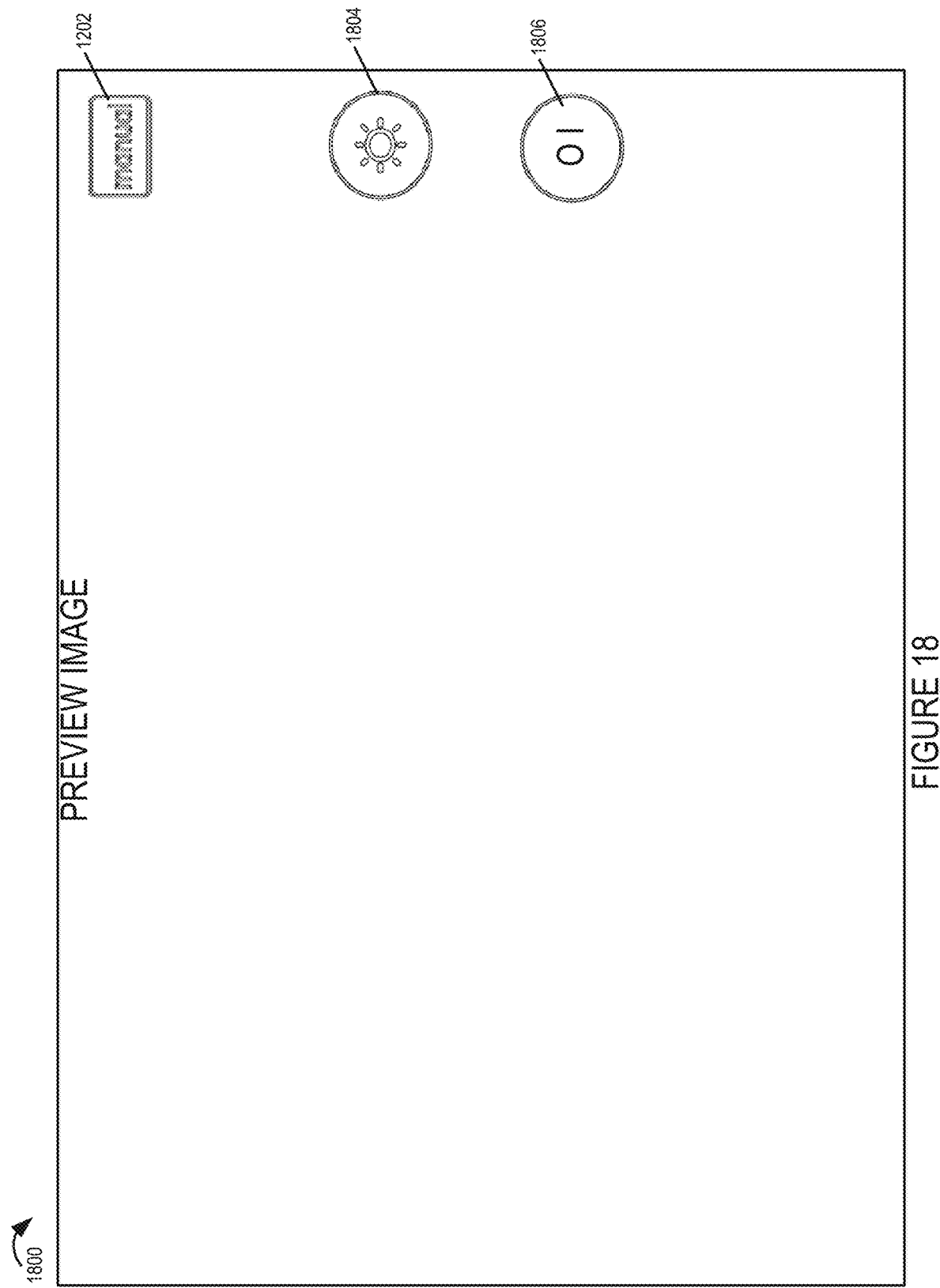
FIG. 18 illustrates a user interface screen displayed subsequent to user selection of the additional options icon shown in FIG. 17.

FIG. 18 illustrates a user interface screen 1800 displayed subsequent to user selection of the additional options icon 1208 shown in FIG. 17. Subsequent to the selection of the additional options 1208 one or more remaining available control options are displayed on the display screen 1800 as shown in FIG. 16. As illustrated in the figure, in additional to the manual mode indicator 1202 an exposure control icon 1804 indicating exposure control option and a OI (orientation indicator) icon 1806 to open an orientation indicator tool, are displayed. The exposure control option can be explored by selecting the exposure control icon 1804 and allows the user to select and/or modify exposure settings of the camera. The orientation indicator tool can be explored by selecting the OI icon 1806 and provides the user with feedback about the orientation of the camera device.

Figure 19:
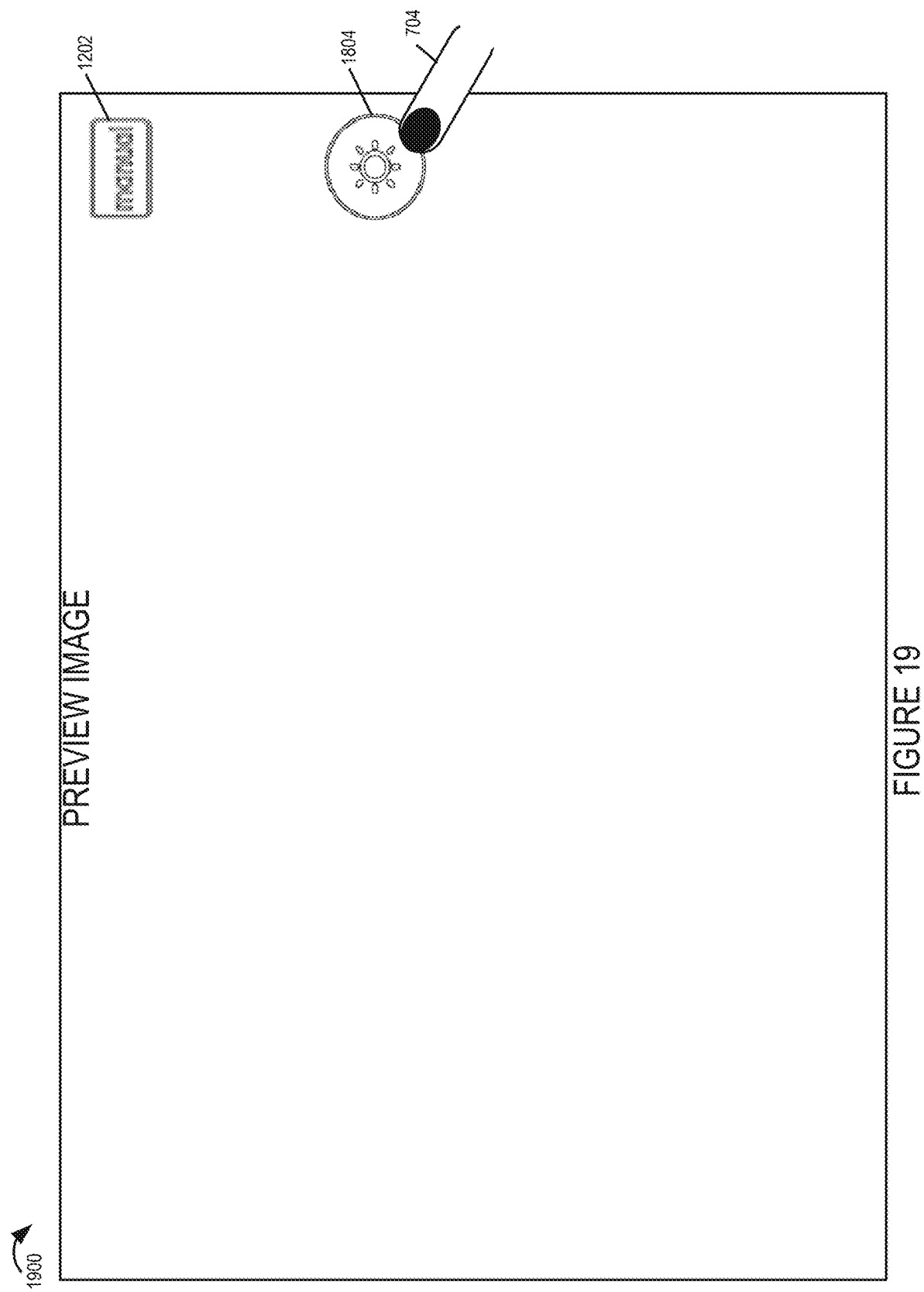
FIG. 19 illustrates a drawing showing user's selection of the exposure control option on the user interface screen.

FIG. 19 illustrates a drawing showing user's selection of the exposure control option on the user interface screen 1900. The drawing shows the user's finger 704 tapping/pressing the exposure control icon 1804 on the display screen 1900 to view user selectable exposure control values.

Figure 20:
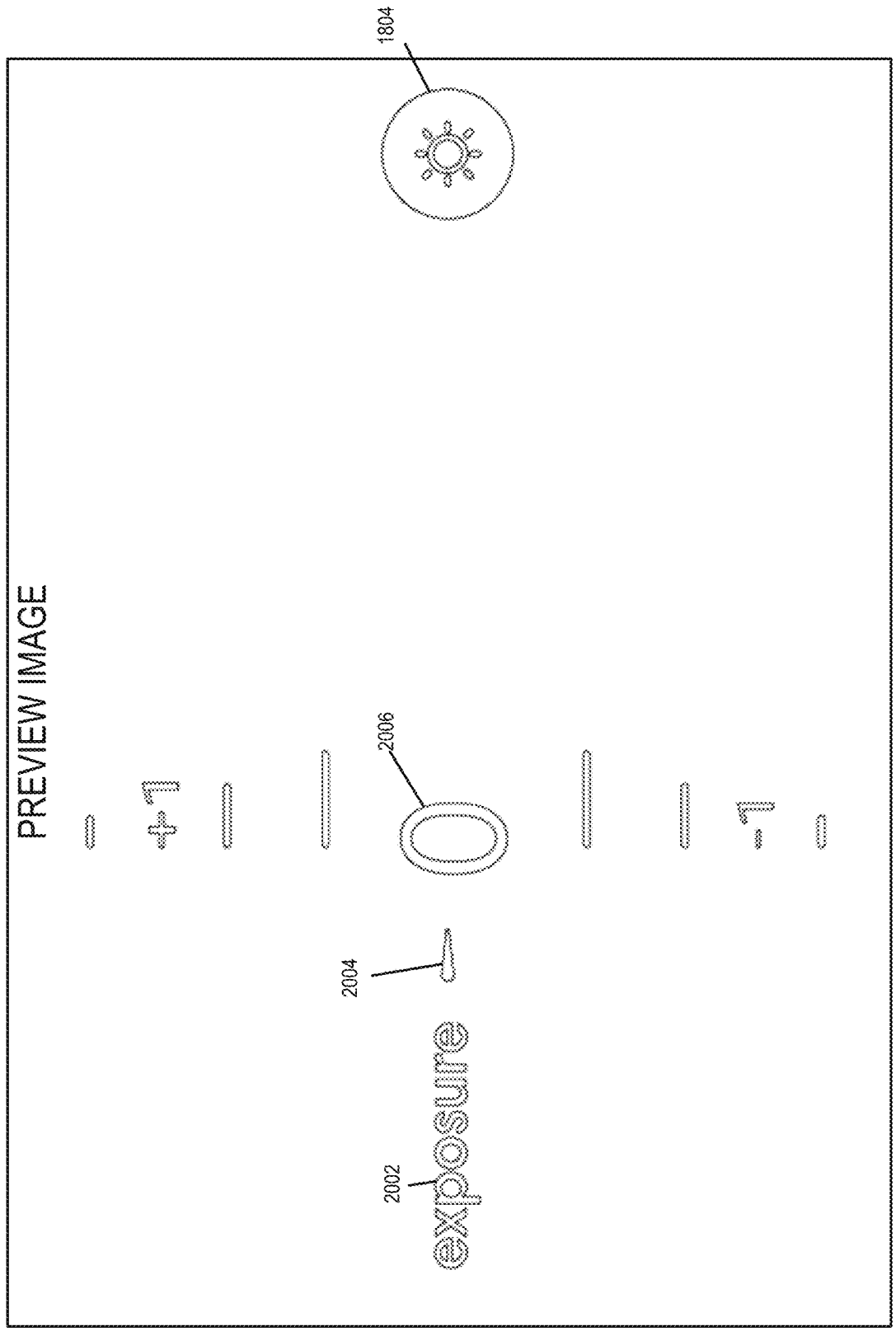
FIG. 20 illustrates a user interface screen displayed subsequent to the selection of the exposure control option shown in FIG. 19.

FIG. 20 illustrates a user interface screen 2000 displayed subsequent to the selection of the exposure control option 1804 shown in FIG. 19. Subsequent to the selection of the exposure control option a set of user selectable control values, e.g., exposure control values in FIG. 20 example, are displayed to the user on the display screen 2000 as shown. Similar to what has been discussed with regard to FIGS. 14 and 16, in some embodiments the user selectable control values are displayed as if arranged on the surface of a rotating wheel with a currently selected value being closest to the user, e.g., in the center and displayed in larger font, and other selectable values above and below the currently selected value being shown using a smaller size as if further away from the user. In the illustrated example of FIG. 20 it can be seen that the currently selected exposure control value 2006 (e.g., exposure value of "0" in the example) that will appear to be closest to the user is in the center and appears more prominent than other displayed exposure values. The user may swipe his finger on the display screen in upward or downward direction to change a currently selected exposure control value with a new currently selected exposure value moving to the position in the center adjacent the current selection pointer 2004 and the previously selected exposure value moving away from the center position. An exposure control indicator 2002 can also been seen on the display screen indicating that control values being displayed correspond to exposure settings. Furthermore the exposure control option icon 1804 is also displayed on the right side. In some embodiments if the user taps the exposure control option icon 1804 the display screen shown in FIG. 20 switches back to the main control options display screen 1200 of FIG. 12.

Figure 21:
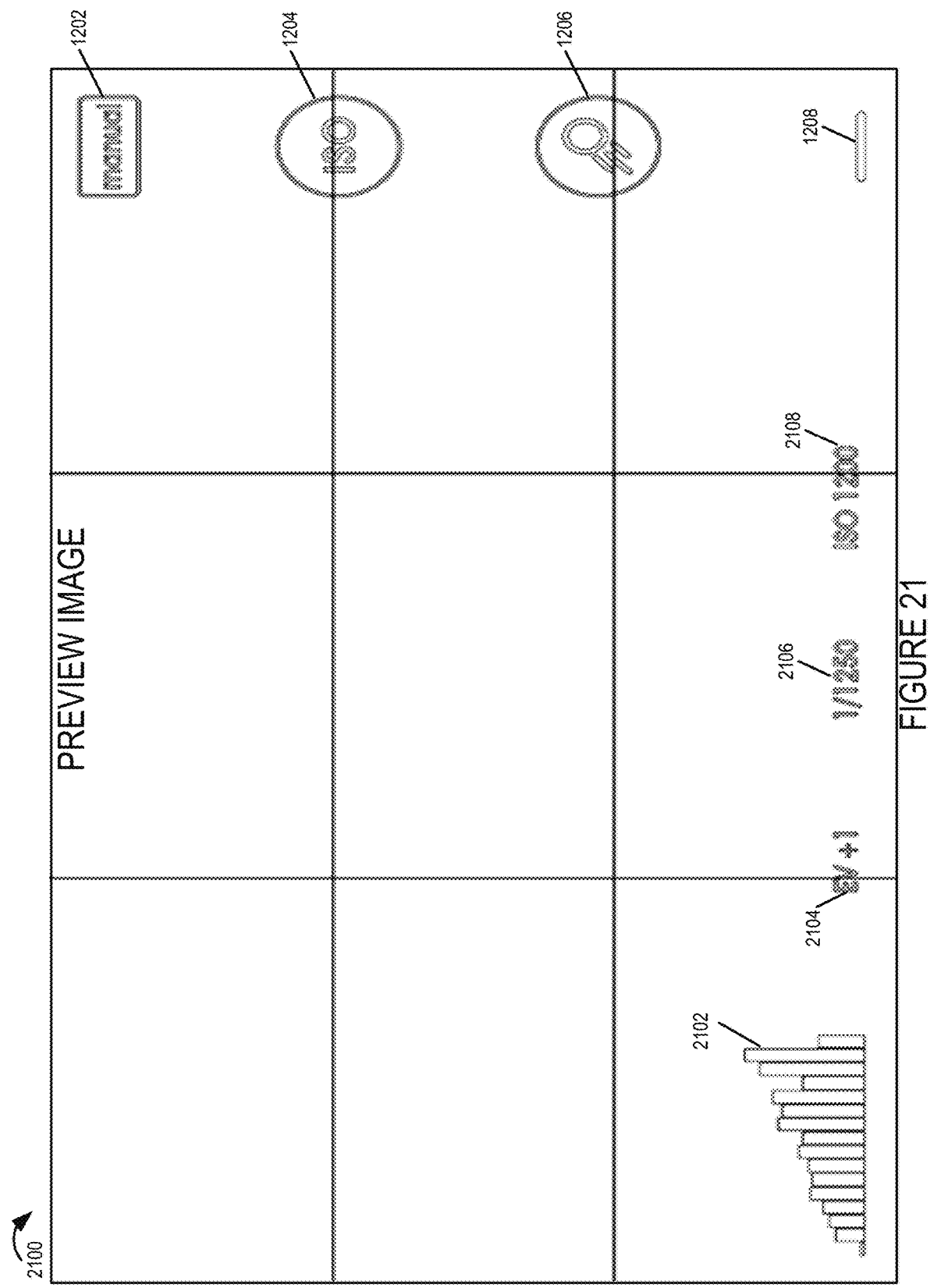
FIG. 21 illustrates a user interface screen displayed subsequent to the selection of the manual control mode option by the user shown in FIG. 10 as an alternative to the user interface screen of FIG. 12.

FIG. 21 illustrates a user interface screen 2100 displayed subsequent to the selection of the manual control mode option by the user shown in FIG. 10 as an alternative to the user interface screen 1200 of FIG. 12. The user interface screen 2100 includes an orientation grid which allows the user to see the preview image superimposed with a 3×3 grid. Such a grid helps a user artistically compose an image where the user seeks to maintain a certain proportionately with respect to the captured image allowing the user , for example, to appreciate how the image will appear if divided into thirds along the horizontal an vertical axis. This facilitates the user's ability to maintain symmetry when composing an image. In addition to the grid, additional informational data that professional photographers may find useful is shown and is displayed over the preview image in the FIG. 21 example. In addition to the control options which are the same or similar to those shown and discussed with regard to FIG. 12, the user interface screen 2100 further includes a histogram 2102, e.g., of luminance values based on the content of the image, and current metadata 2104, 2106, 2108 corresponding to camera control setting related information with the information corresponding to such things as an exposure setting 2104, shutter speed 2106 and ISO value 2108 respectively. The displayed histogram 2102 allows for providing a visual alert to the user regarding the level of exposure affecting different portions of an image shown as the preview image. By looking at the histogram 2102 the user can understand if parts of an image are being overexposed and/or underexposed and thus take corrective actions accordingly.

Figure 22:
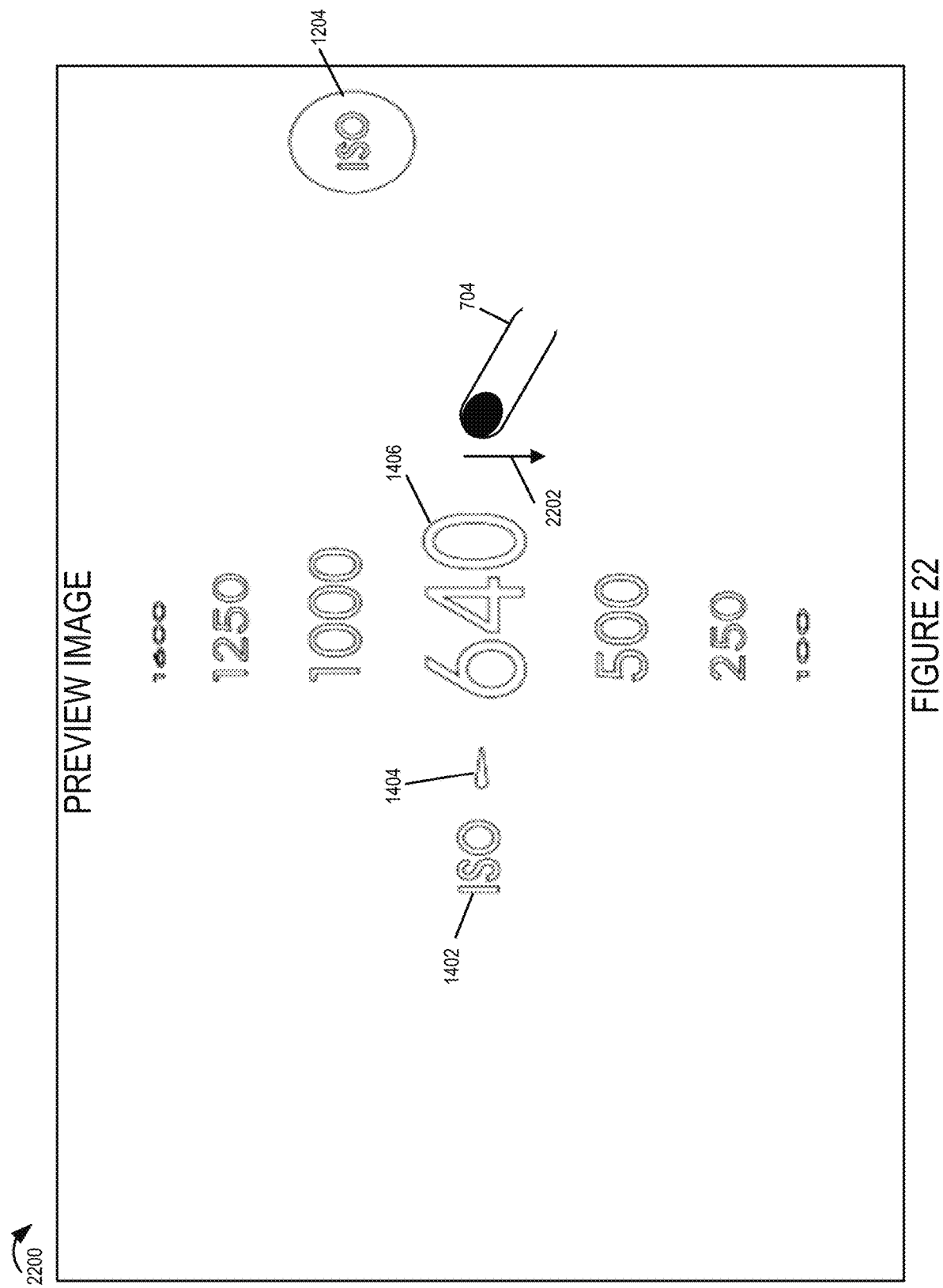
FIG. 22 illustrates a user interface screen displayed subsequent to the selection of the ISO control option in FIG. 13.

FIG. 22 illustrates a user interface screen 2200 displayed subsequent to the selection of the ISO control option in FIG. 13. As shown a set of user selectable ISO control values are displayed to the user on the display screen. Consider that the user wants to change the currently selected ISO value 1406. In order to change the currently selected ISO value the user may swipe his finger on the screen in upward or downward direction. In the example of FIG. 22 it is illustrated that the currently selected ISO value 1406 is "640" and the user swipes his/her finger 704 in the downward direction as indicated by arrow 2202. The finger swipe in the downward direction causes the ISO values, which are arranged as if on the surface of a rotating wheel, to move in the anticlockwise direction and wrap around the simulated wheel with a new currently selected value moving to the position in the center closer to the user. Alternative to the swipe method illustrated in the figure, actual up/down buttons can be pressed to move the list of user selectable ISO setting values up or down with the ISO value in the center being the currently selected setting value at a given time. While the currently selected control value is shown in the center in various figures it could be positioned at another predetermined location on the screen depending on the embodiment.

Figure 23:
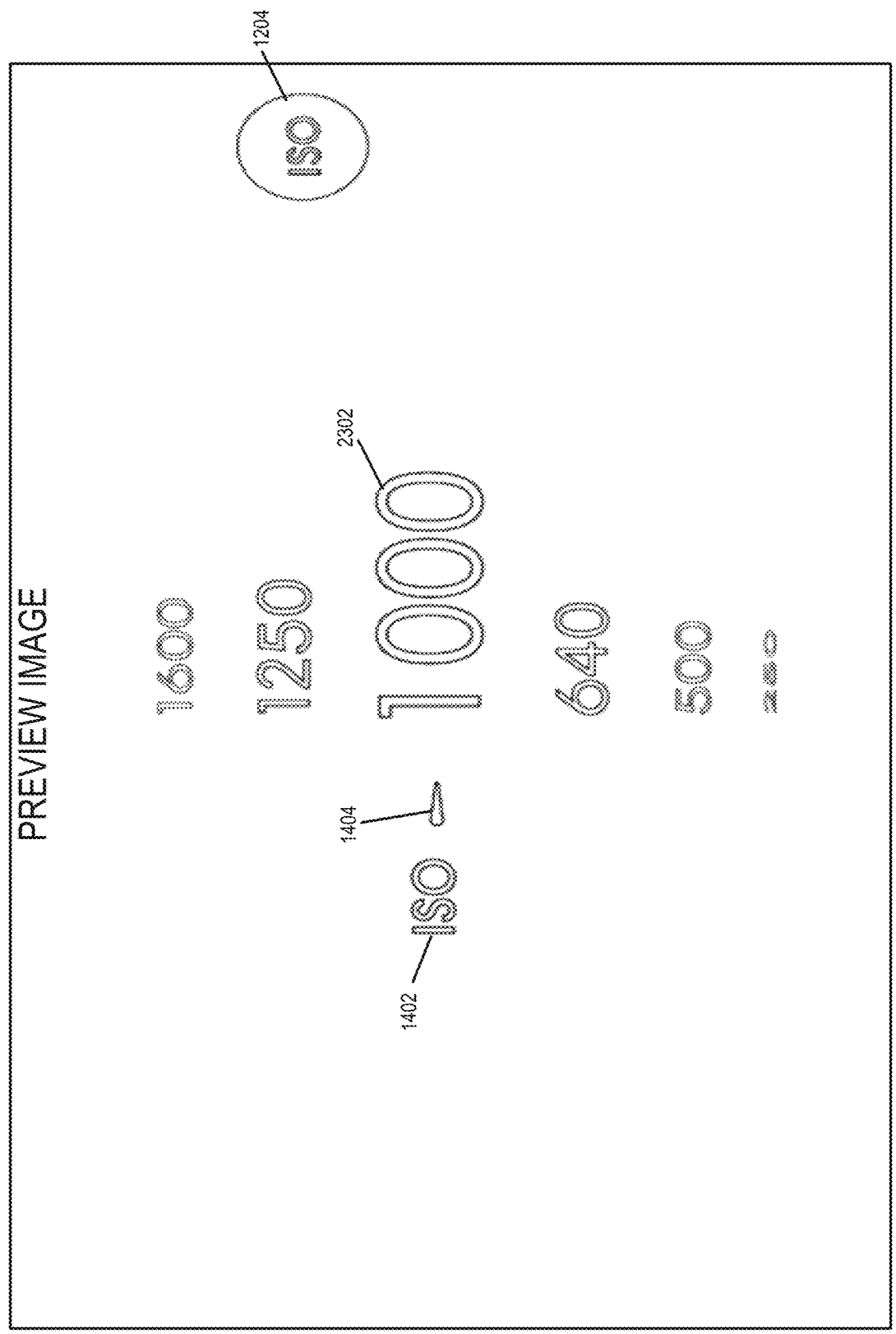
FIG. 23 illustrates a subsequent user interface screen displayed subsequent to the user's finger swipe in the downward direction on the display screen of FIG. 22.

FIG. 23 illustrates a subsequent user interface screen 2300 displayed subsequent to the user's finger swipe in the downward direction on the display screen 2200 of FIG. 22. As can be appreciated from the figure, a new currently selected ISO value 2302, e.g., ISO value of "1000", moves to the center while the previously selected ISO value "640" moves down and away from the center position as shown. As can be appreciated from the figure the new ISO setting of "1000" which is the current ISO setting is shown larger and more prominently than other ISO setting values including the previous setting of "640". The camera, while being a digital camera, will simulate the effect of the currently selected ISO setting value, e.g., in terms of sensitivity to light, when capturing images.

Figure 24:
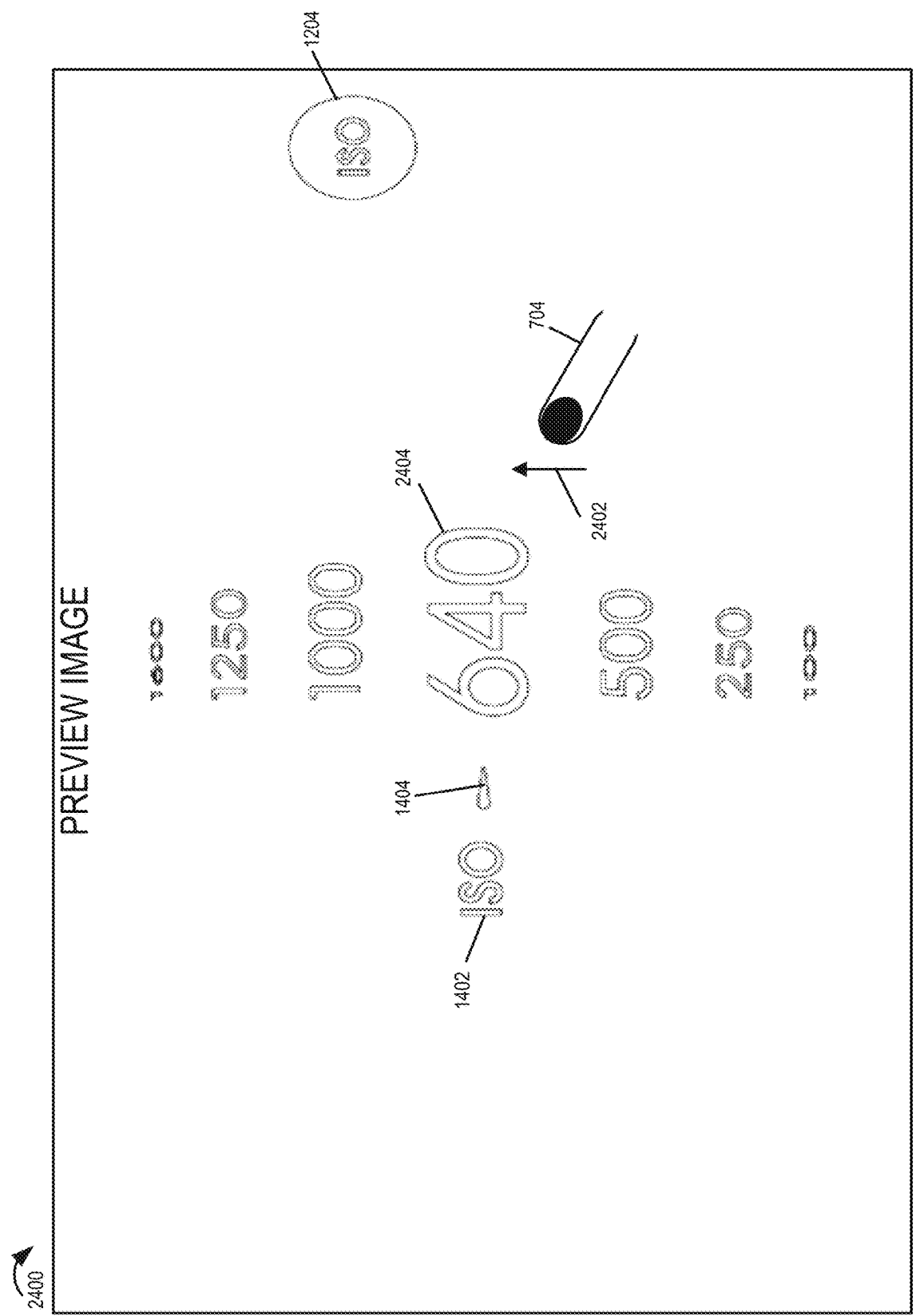
FIG. 24 illustrates a user interface screen displayed subsequent to the selection of the ISO control option in FIG. 13 wherein the user swipes his/her finger in the upward direction as indicated by the arrow in order to change the currently selected ISO value of "640".

FIG. 24 illustrates a user interface screen 2400 displayed subsequent to the selection of the ISO control option in FIG. 13 wherein the user swipes his/her finger 704 in the upward direction as indicated by arrow 2402 in order to change the currently selected ISO value 2404 of "640". The finger swipe in the upward direction causes the ISO values, which are arranged as if on the surface of a rotating wheel, to move in the clockwise direction and wrap around the simulated wheel with a new currently selected value moving to the position in the center closer to the user.

Figure 25:
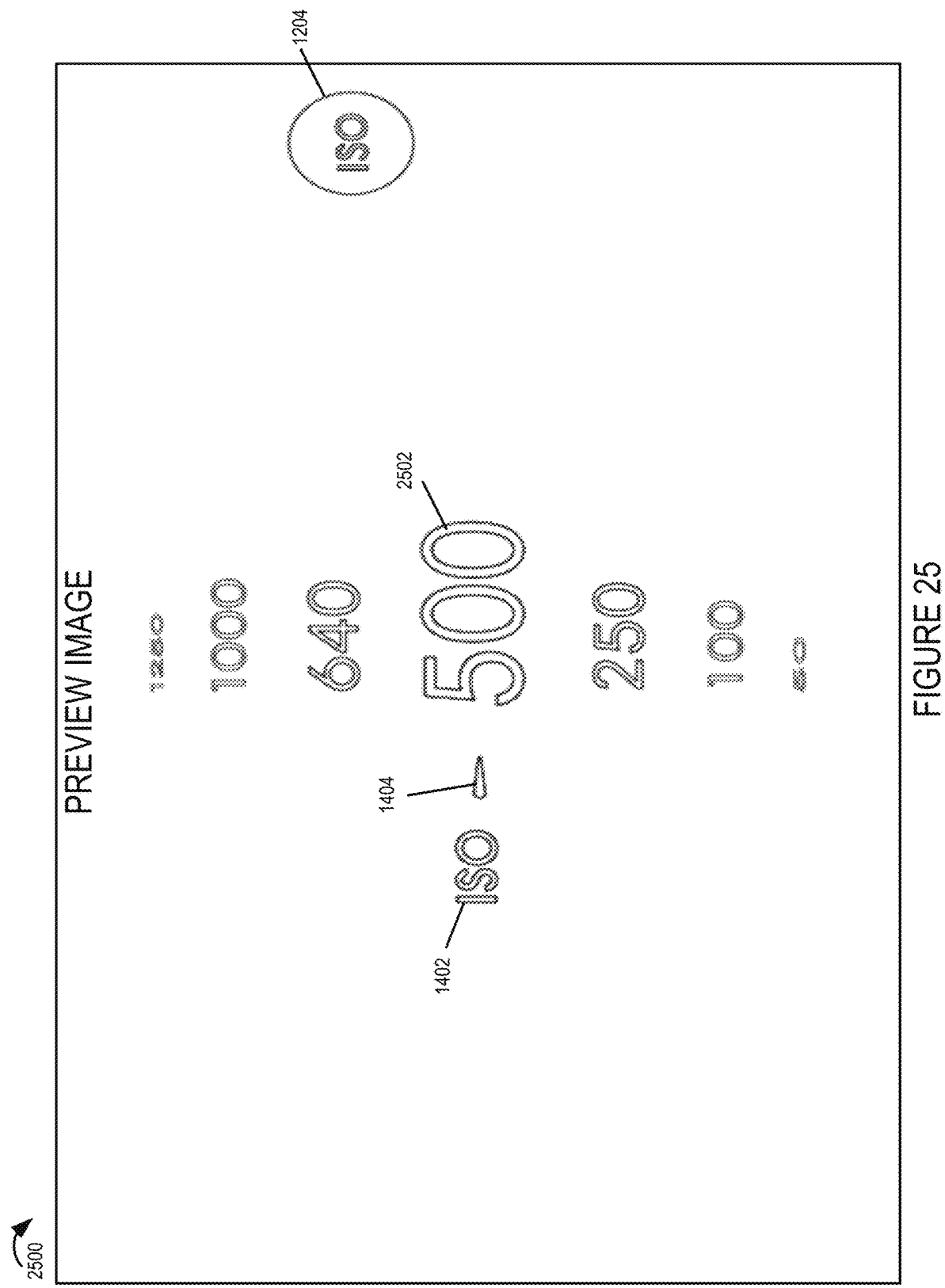
FIG. 25 illustrates a user interface screen displayed subsequent to the user's finger swipe in the upward direction on the display screen of FIG. 24.

FIG. 25 illustrates a user interface screen 2500 displayed subsequent to the user's finger swipe in the upward direction on the display screen 2400 of FIG. 24. As can be appreciated from the figure, a new currently selected ISO value 2502, e.g., ISO value of "500", moves to the center while the previously selected ISO value "640" moves up and away from the center position as shown.

Figure 26:
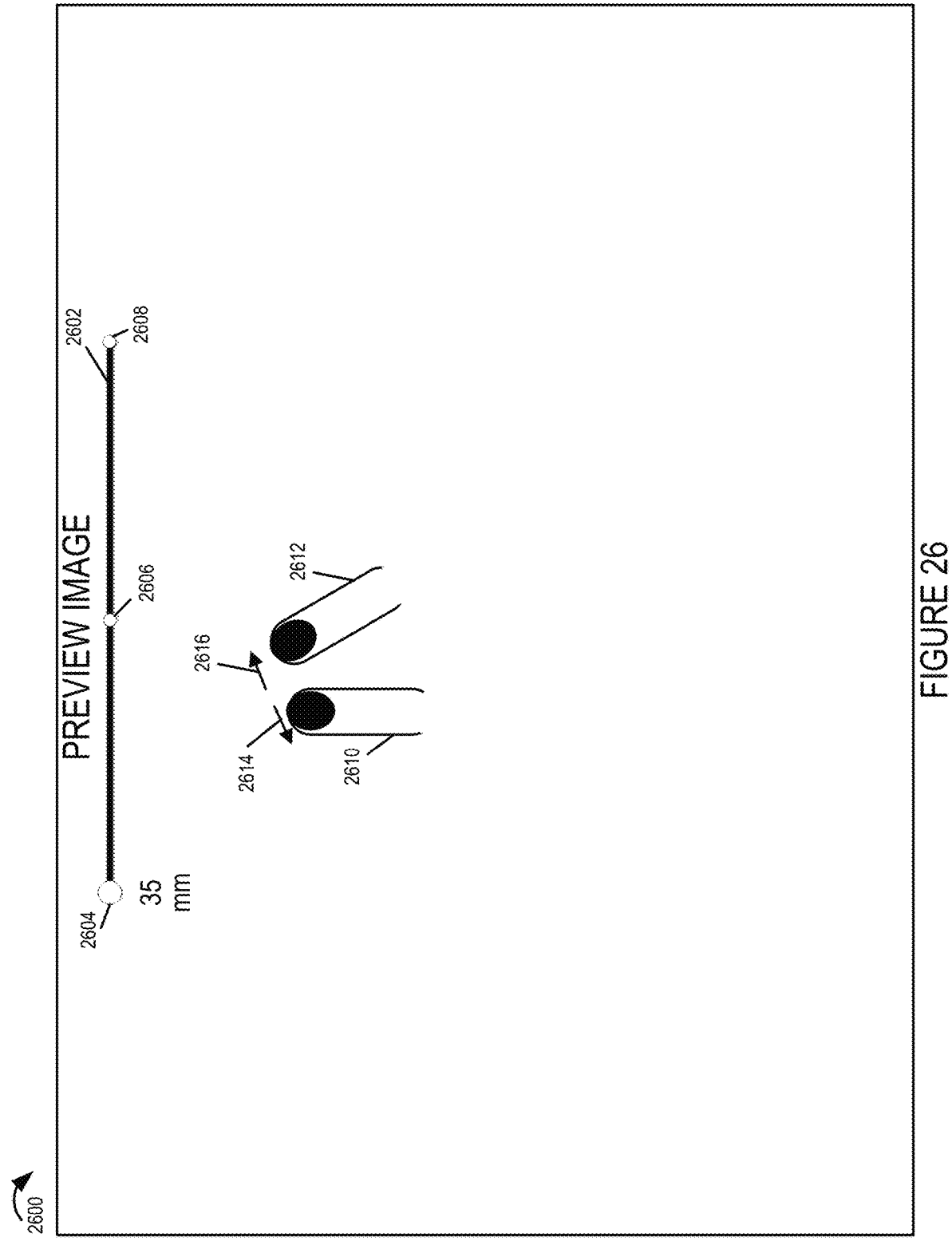
FIG. 26 illustrates a user interface screen displayed when a user employs a spread gesture to enlarge, e.g., zoom in, a preview image displayed in the background.

FIG. 26 illustrates a user interface screen 2600 displayed when a user employs a spread gesture to enlarge, e.g., zoom in, a preview image displayed in the background. As illustrated in the figure the user may use his/her fingers 2610, 2612 (where in this case the thumb is to be considered a type of finger) to implement a spreading motion on the display screen 2600. The arrows 2614, 2616 in the opposite direction indicate the respective directions in which the fingers are swiped/spread on the display screen in order to implement a zoom in operation. In some embodiments when one of a pinching, spreading or double tapping actions is detected on the display screen of the camera, a visual slide bar 2602 is presented to the user. The visual slide bar 2602 provides a visual notification to the user of the effective focal length associated with the current zoom setting indicated by the location of the pointer 2604. In some embodiments the display also provides an indication regarding which focal length camera modules are being used at a given point in time by displaying the focal length of the actual camera modules, e.g., 35 mm in the example. The visual slide bar 2602 includes camera module focal length indicators 2603, 2604 and 2608 (smaller circles) corresponding to focal lengths of physical camera modules and a pointer 2604 (larger circle). The position of the pointer at a given time indicates the current effective focal length being used for the current zoom setting. Higher focal length camera modules, e.g., 70 mm and 150 mm focal length camera modules, are often used when a user is performing a zoom in operation while 35 mm focal length camera modules may be used when no zooming is being used. The focal length indicators 2603, 2604 and 2608 remain fixed on the slider bar 2602 while the pointer 2604 slides over the bar 2602 as zoom in or zoom out is performed in response to a spread or pinch action respectively. In some embodiments as the user performs spreading using fingers to zoom in the pointer 2604 on the slide bar 2602 moves to the right, e.g., towards the higher focal length indicators. The first camera module focal length indicator 2603 corresponds to the 35 mm camera modules and coincides with the pointer 2604 in the example of FIG. 26 and thus the indicator 2603(smaller circle) is not visible in this illustration because of being superimposed by the pointer 2604 (larger circle). The second camera module focal length indicator 2606 corresponds to 70 mm camera modules and the third camera module focal length indicator 2608 corresponds to 150 mm camera modules. Depending on the position of the pointer 2604 an effective focal length setting value corresponding to the current zoom setting is displayed right below the corresponding focal length indicator. For example in the illustrated example of FIG. 26, the pointer 2604 is positioned at the extreme left, e.g., at the starting point, corresponding to 1× or no zoom on the slide bar 2602. This pointer position corresponding to no zoom corresponds to the effective focal length of 35 mm. Thus in this example the effective focal length value "35 mm" is displayed below the pointer 2604 which superimposes the camera module focal length indicator 2603.

As the zoom setting is changed, e.g., increased or decreased the pointer 2604 moves on the slide bar 2602. In some embodiments when the pointer 2604 moves away (e.g., in response to change in zoom in or zoom out level being changed by the user's spread or pinch actions) from a given camera module focal length indicator by more than a predetermined amount of distance on the slide bar 2602, the effective focal length setting value disappears from the display. For example when the pointer 2604 moves away from the position of the first indicator (not visible in FIG. 26 example but located right above the position where focal length value "35 mm" is shown) by more than a predetermined amount of distance on the slide bar 2602, the effective focal length setting value of "35 mm" disappears from the display. Similarly when the pointer 2602 moves closer to a given camera module focal length indicator within a predetermined amount of distance on the slide bar 2602, the effective focal length setting value corresponding to the given indicator becomes active and is displayed.

Figure 27:
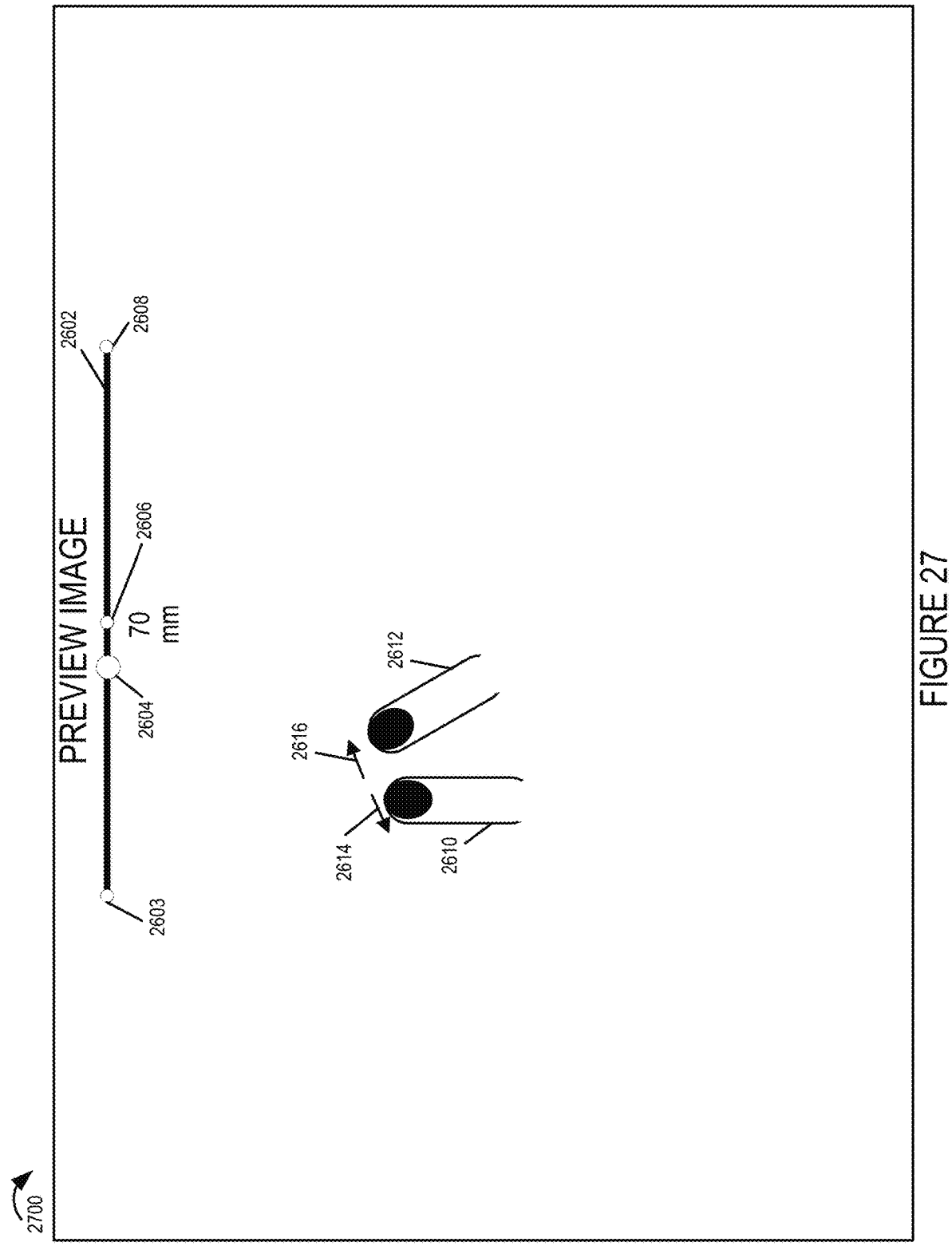
FIG. 27 illustrates a user interface screen displayed subsequent to the screen when the user continues to perform zoom in operation, e.g., by finger spread action.

FIG. 27 illustrates a user interface screen 2600 displayed subsequent to the screen 2500 when the user continues to perform zoom in operation, e.g., by finger spread action. As illustrated in the figure as the zoom in level is increased the pointer 2604 moves away from the first focal length indicator 2603 towards the higher focal length indicators to the right on the slide bar 2602 and as discussed above the effective focal length value "35 mm" which was previously displayed on the display screen 2600 disappears since the pointer 2604 moves away from the position of the first indicator 2603. Instead, as further illustrated in the figure, the effective focal length value of "700 mm" is displayed since the pointer 2604 comes within the predetermined distance of the second focal length indicator 2606 thereby indicating to the user the effective focal length of the currently active camera modules corresponding to the current zoom setting. While a finger spread method may be used to implement zoom, in some embodiments a user may simply touch and drag the pointer 2604 on the slide bar 2602 to increase or decrease zoom level. Furthermore the user is allowed to touch/tap any point on the slide bar 2602 to bring the pointer 2604 directly to that point and the zoom level changes accordingly to correspond to the selected point on the slide bar. The zoom effect can, and in some embodiment is, reflected in the preview image as the user performs zoom operation, e.g., by finger spread action, pinching action, double tapping, moving the pointer 2604 on the slider 2602 etc.

Figure 28:
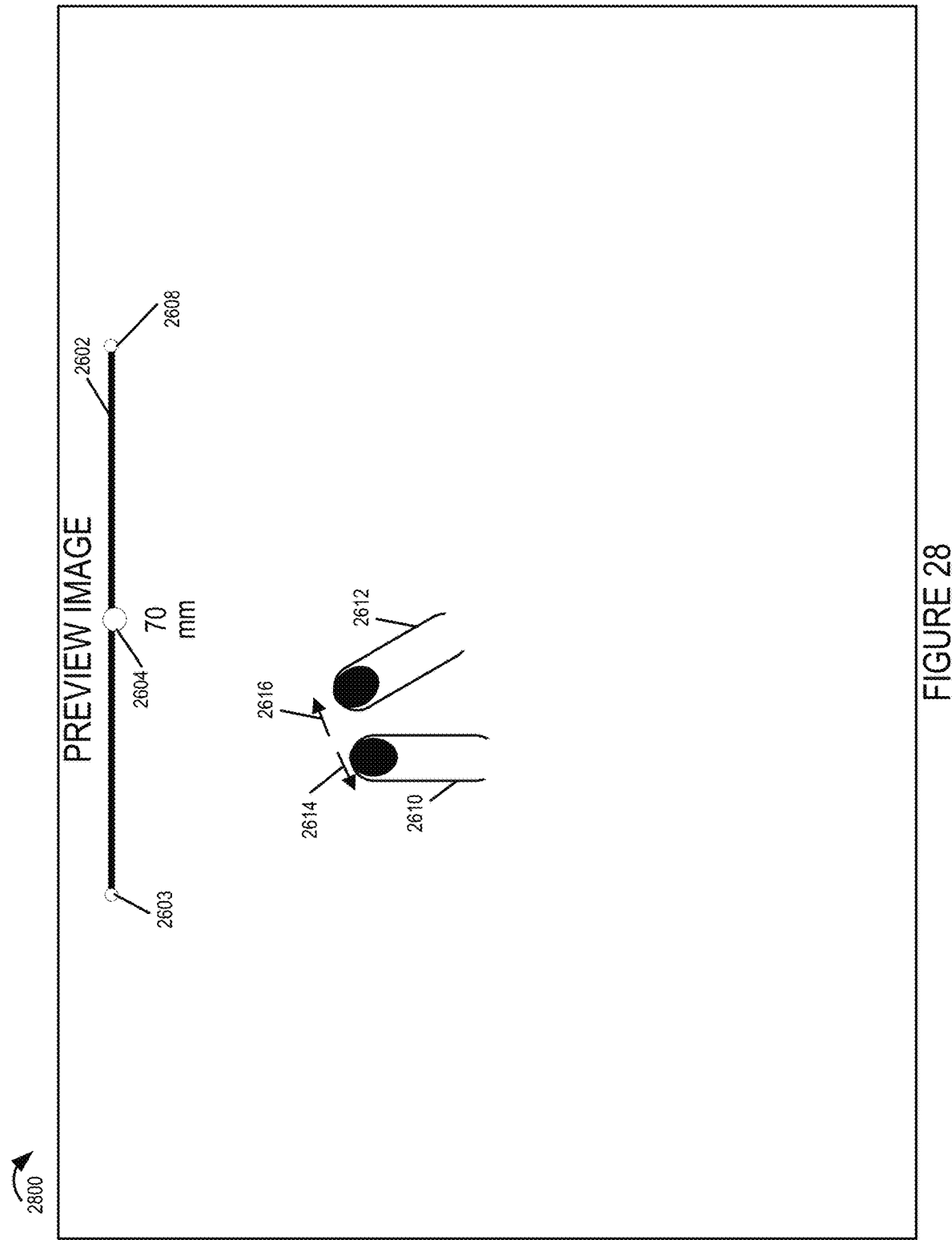
FIG. 28 illustrates a user interface screen displayed subsequent to the screen when the user continues to perform zoom in operation, e.g., continuing the finger spread action.

FIG. 28 illustrates a user interface screen 2700 displayed subsequent to the screen 2600 when the user continues to perform zoom in operation, e.g., continuing the finger spread action. As illustrated in the figure, as the zoom in level is increased the pointer 2604 moves further towards the higher focal length indicators to the right relative to the position of the pointer 2604 shown in FIG. 27. Based on the current zoom setting at the given time, the pointer 2604 moves at the "70 mm" focal length indicator mark thus superimposing the focal length indicator 2606 thereby making it not visible in the example of FIG. 28. In the FIG. 28 example the displayed preview image is what would be produced using a 70 mm focal length camera module.

Figure 29:
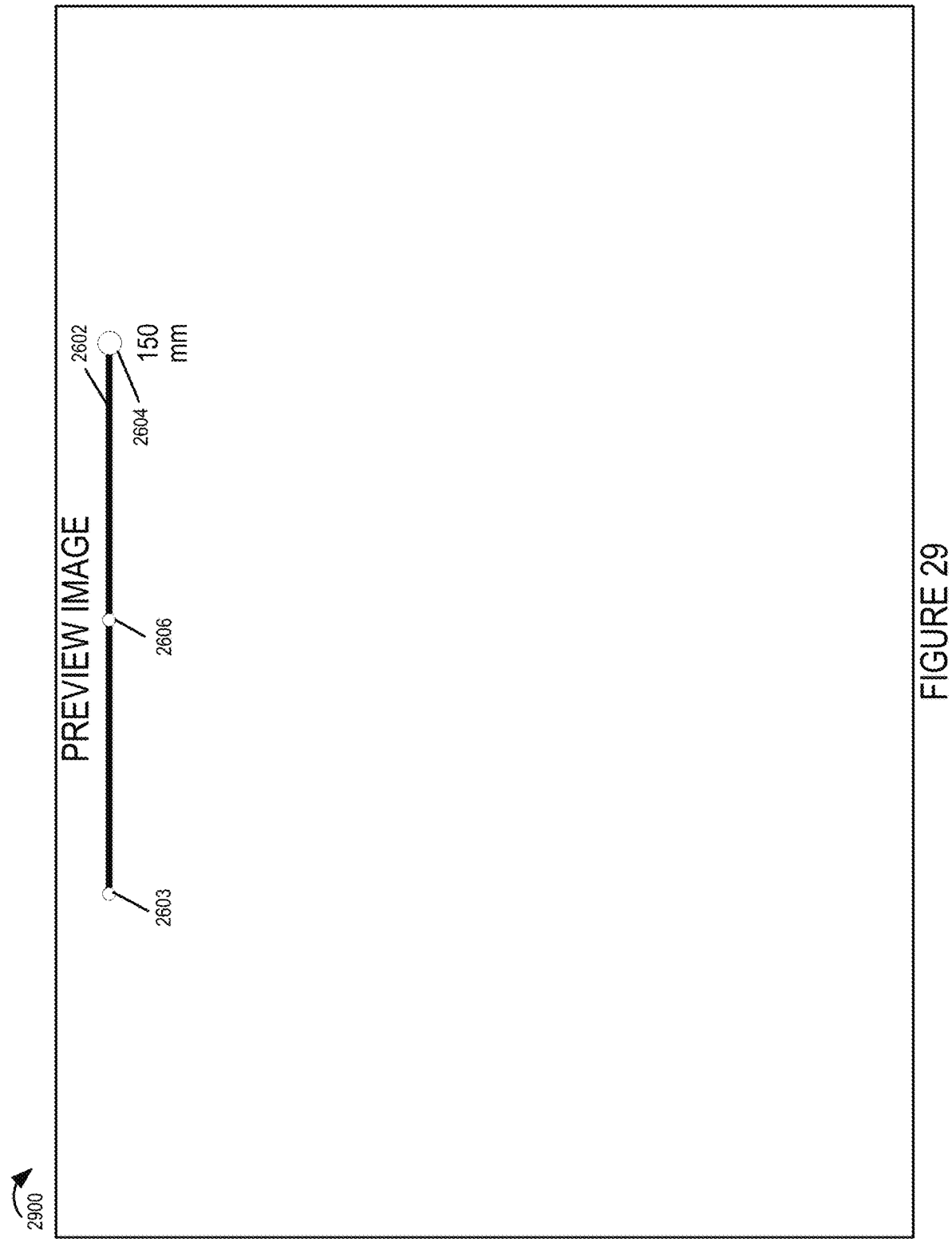
FIG. 29 illustrates a user interface screen 2900 displayed subsequent to the screen 2800 in the case where the user still continues to perform zoom in operation, e.g., continuing the finger spread action.

FIG. 29 illustrates a user interface screen 2900 displayed subsequent to the screen 2800 in the case where the user still continues to perform zoom in operation, e.g., continuing the finger spread action. As illustrated FIG. 29, as the zoom level is increased the pointer 2604 moves further towards the highest focal length indicator 2608 to the right most point on the slide bar 2602 relative to the position of the pointer 2604 shown earlier in FIG. 28. The pointer 2604 moves at the "150 mm" focal length indicator mark thus superimposing the focal length indicator 2608 thereby making it not visible in the example. At this point the zoom level is at the highest possible level and the effective focal length value of "150 mm" is displayed to allow more sophisticated or professional photographers to see the effective focal length corresponding to the current zoom level.

Figure 30A:
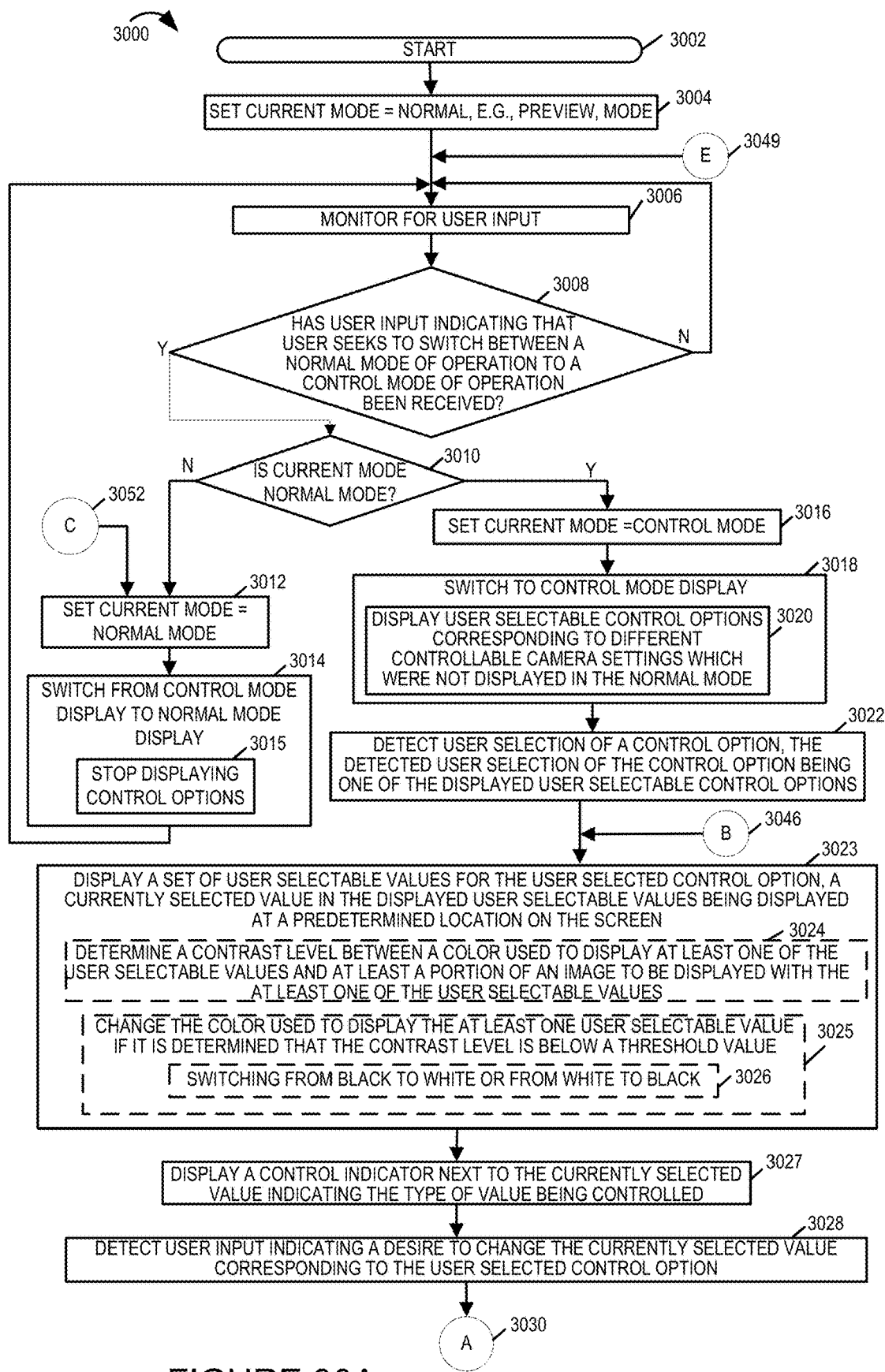
FIG. 30A is a first part of a flowchart illustrating the steps of an exemplary method of controlling a camera device, e.g., a camera device shown in any of the FIGS. 1-5, in accordance with an exemplary embodiment.

FIG. 30A is a first part of a flowchart 3000 illustrating the steps of an exemplary method of controlling a camera device, in accordance with an exemplary embodiment.

Figure 30B:
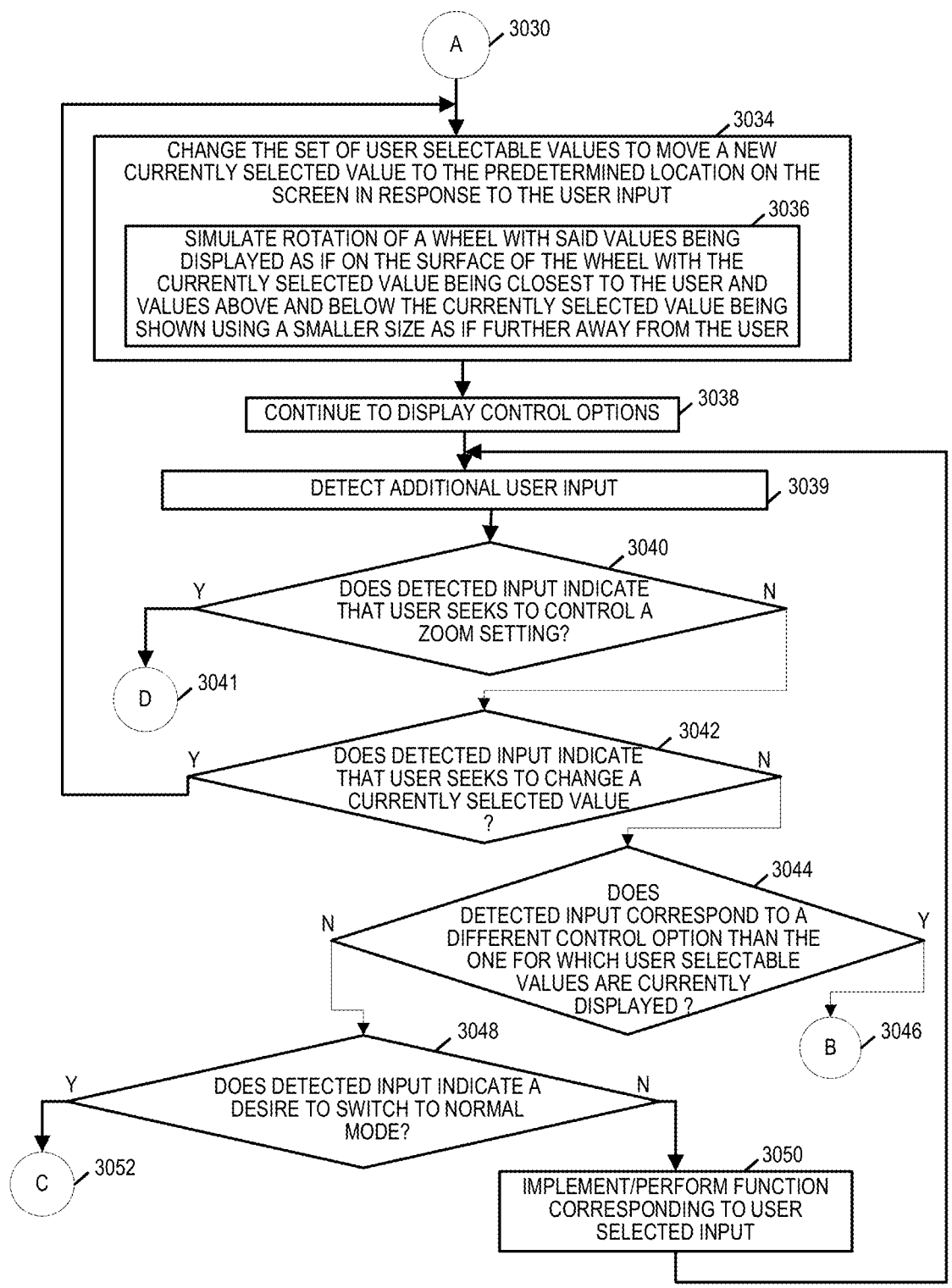
FIG. 30B is a second part of the flowchart illustrating the steps of the exemplary method of controlling the camera device in accordance with an exemplary embodiment.
Figures 30, 30C:
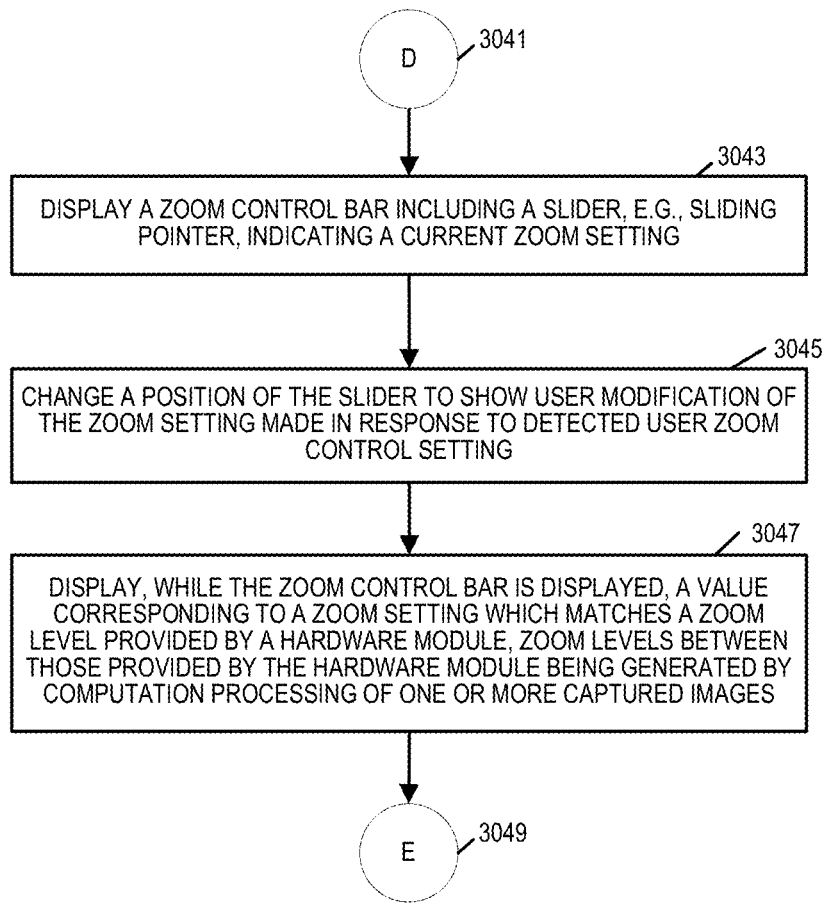
FIG. 30C is a third part of the flowchart illustrating the steps of the exemplary method of controlling the camera device performed along one specific path of the method.
FIG. 30 comprises the combination of FIGS. 30A, 30B and 30C.

FIG. 30B is a second part of the flowchart 3000 illustrating the steps of an exemplary method of controlling a camera device in accordance with an exemplary embodiment. FIG. 30, which comprises a combination of FIGS. 30A, and 30B, illustrates the steps of the exemplary method of controlling the camera device in accordance with one exemplary embodiment. The camera device 100/200 which includes a touch sensitive display 102/215 can be used to implement the methods of the present invention including the steps discussed with regard to flowchart 3000.

The method starts in step 3002, e.g., with the camera device being powered on and initialized. The method proceeds from start step 3002 to step 3004. In step 3004 which is part of the initialization operation the camera operation mode is initialized to be a normal mode of operation in which the camera display screen displays preview images of the environment/objects which comes under the field of view of the camera. Thus in some embodiments after the camera is turned on the display screen shows the preview images of one or objects generated by the camera as the camera points to the one or more objects. In various embodiments the camera display is a touch sensitive display capable of detecting and sensing user's touch and swipe. Operation proceeds from step 3004 to step 3006. In step 3006 the camera device monitors for user input, e.g., to detect an input via the touch sensitive display screen. In various embodiments the monitoring is performed on an ongoing basis.

Operation proceeds from step 3006 to step 3008. In some embodiments step 3008 is performed in response to the monitoring detecting receipt of a user input. In step 3008 it is determined if a user input indicating that the user seeks to switch from a current mode, e.g., normal/preview mode) of operation to another different mode (e.g., control mode) of operation, is received. If it is determined that that such a user input has been received the operation proceeds from step 3008 to step 3010 otherwise the operation proceeds back to step 3006 and the monitoring operation continues on an ongoing basis. In step 3010 the current mode of the camera is determined to check if the camera is currently operating in the normal mode. If in step 3010 it is determined that the camera is currently not in the normal mode of operation the operation proceeds from step 3010 to step 3012 otherwise the operation proceeds to step 3016.

In step 3012, following the determination in step 3010 that the camera is not in the normal mode, the current mode of the camera is changed and set to the normal mode based on the user input desiring a change from the current mode to the other mode. Operation proceeds from step 3012 to step 3014. In step 3014 the camera display is switched from displaying control mode display features to normal mode display features. For example in some embodiments in the normal mode the camera display shows preview image/background but with no additional control options (e.g., as shown in FIG. 6) while in the control mode of operation the control setting options are also displayed in addition to the background preview image, e.g., such as shown in FIGS. 13-20. Thus in step 3014 the normal mode display is presented. In some embodiments step 3014 further includes sub step 3015 where the camera stops displaying control options on the display screen as part of switching from the control mode to normal mode. Operation proceeds from step 3014 back to the monitoring step 3006.

If in step 3010 it is determined that the camera is currently in the normal mode of operation the operation proceeds from step 3010 to step 3016. In step 3016, following the determination in step 3010 that the camera is currently in the normal mode, the current mode of the camera is changed and set to the control mode based on the user input. Operation proceeds from step 3016 to step 3018. In step 3018 the camera display is switched from displaying normal mode display features to control mode display features. For example in some embodiments in the control mode the camera display shows preview image/background control settings. In some embodiments step 3018 further includes sub step 3020 where user selectable control options corresponding to different controllable camera settings which were not displayed in the normal mode are displayed. In some embodiments the user selectable control options include at least one of an ISO setting, a shutter speed setting, an exposure setting or a zoom setting. In some embodiments the user selectable control options include at least two of an ISO setting, a shutter speed setting, an exposure setting or a zoom setting. Operation proceeds from step 3018 to step 3022. In step 3022 user selection of a control option, e.g., one of the displayed user selectable control options, is detected. Operation proceeds from step 3022 to step 3023. In step 3023 a set of user selectable values, for the user selected control option, are displayed following the detection of user's selection of the control option. In some embodiments a currently selected value in the displayed user selectable values is displayed at a predetermined location on the screen. In some embodiments the currently selected value in the displayed user selectable values is displayed in the center in larger font size compared to other selectable values which are also displayed. Such a display of a set of user selectable values is illustrated in e.g., FIGS. 14, 16 and 20. In some embodiments optional steps 3024 and 3025 are performed as part of step 3023. In step 3024 contrast level between a color used to display at least one of the user selectable values and at least a portion of an image to be displayed, e.g., as the preview image, with the at least one of the user selectable values is determined. In some embodiments step 3025 is further performed as part of step 3023 where the color used to display one or more user selectable values is changed if it is determined that the contrast level is below a threshold value. In some embodiments step 3025 of changing the color used to display one or more user selectable values includes step 3026 of switching from a darker font color, e.g., black, to lighter font color, e.g., white, or from lighter font color to darker font color. In some embodiments the switch from black font color to white occurs when the image is a dark image. In some embodiments the switch from white to black occurs when white is being used to display the one or more user selectable values and the image is a light image. It should be appreciated that such a switching and changing of font color used to display user selectable values makes the displayed user selectable values more prominent and perceivable/legible to the user, e.g., when the contrast level between the displayed values and preview image is low. For example if portions of the preview image being displayed are light in the regions where the user selectable values are being displayed on top of the background preview image then it would be helpful to use a darker font for the user selectable values thereby making them easily legible.

Operation proceeds from step 3023 to step 3027 where a control indicator (e.g., such indicator 1402 of FIG. 14) is displayed next to the currently selected value indicating the type of value being controlled, e.g., corresponding to the type of control option selected by the user. Again this can be seen in the exemplary illustrations of FIGS. 14, 16 and 20 where the indicators such as "ISO" "Shutter" and "Exposure" are displayed alongside a pointer next to the currently selected value.

Operation proceeds from step 3027 to step 3028. In step 3028 a user input indicating a desire to change the currently selected value corresponding to the user selected control option is detected. In some embodiments the user input is a swipe of a screen indicating a user desired change in an increasing or decreasing value direction. Operation proceeds from step 3028 to step 3034 via connecting node A 3030. In step 3034 the set of user selectable values is changed to move a new currently selected value to the predetermined location on the screen in response to the user input. In some embodiments step 3036 is performed as part of step 3034 where rotation of a wheel is simulated for display with the control values being displayed as if on the surface of the wheel with the currently selected value being closest to the user (e.g., displayed in the center) and values above and below the currently selected value being shown using a smaller size as if further away from the user. The sequence of illustrations in FIGS. 22 through 25 allow for an easier understanding of this concept discussed above with regard to step 3034.

Operation proceeds from step 3034 to step 3038. In step 3028 the control options are continued to be displayed. In some embodiments while the control options are continued to be displayed for some additional time but when no user input is detected within the additional time the displayed control options are made to disappear from the screen display, e.g., with the assumption that the user no longer wants to change control values and/or other settings, and the preview image is continued to be displayed.

Operation proceeds from step 3038 to step 3039. In step 3039 additional user input is detected. Operation proceeds from step 3039 to step 3040. In step it is determined whether the detected input indicates that the user seeks to change/control a zoom setting, e.g., change a currently used zoom level. If it is determined that the detected input indicates that the user seeks to change a zoom level the operation proceeds from step 3040 to step 3043 via connecting node D 3041. In some such embodiments the detected user input is one of a pinch action, a screen touch and finger spread action or a touch/tap on a location on a zoom control bar. Referring to FIG. 30C which shows process steps along the path of node D 3041. In step 3043 a zoom control bar including a slider, e.g., sliding pointer that can slide of the zoom control bar, indicating a current zoom setting is displayed on the user interface display screen. Such an exemplary zoom control bar 2602 and pointer 2604 is shown in FIGS. 26-29 and discussed above. Operation proceeds from step 3043 to

3045. In step 3045 a position of the slider is changed, e.g., moved along the zoom control bar as shown in FIG. 27, to show user modification of the zoom setting made in response to detected user zoom control setting input. Operation proceeds from step 3045 to step 3047. In step 3047 a value corresponding to a zoom setting which matches a zoom level provided by a hardware module is displayed while the zoom control bar is displayed, zoom levels between those provided by the hardware module being generated by computation processing of one or more captured images. Display of such a value corresponding to a zoom setting is shown in FIGS. 26-29 where the focal length value (e.g., 35 mm, 70 mm, 150 mm) corresponding to the zoom level is shown. Operation proceeds from step 3047 back to step 3006 via connecting node E 3049.

Now returning to step 3040 of FIG. 30B. If in step 3040 it is determined that the detected input does not indicate that the user is seeking to change a zoom level, the operation proceeds to step 3042. In step 3042 it is determined whether the detected input indicates that the user seeks to change a currently selected control value, e.g., change a currently selected control value displayed on the screen. If it is determined that the detected input indicates that the user seeks to change a currently selected control value the operation proceeds from step 3042 to step 3034 and the operation proceeds in the manner discussed above. If it is determined that the detected input does not indicate that the user is seeking to change a currently selected control value, the operation proceeds to step 3044 where it is determined if the detected input corresponds to a different control option than the one for which user selectable values are currently displayed, e.g., other user selectable control option. If it is determined that the detected input corresponds to a different control option than the one for which user selectable values are currently displayed the operation proceeds from step 3044 back to step 3024 via connecting node B 3046 otherwise the operation proceeds to step 3048. In step 3048 it is determined if the detected user input indicates a desire to switch to normal mode of operation. If it is determined that the detected user input indicates a desire to switch to normal mode of operation the operation proceeds from step 3048 back to step 3015 via connecting node C 3052, otherwise the operation proceeds to step 3050. In step 3050 the camera performs function corresponding to the detected user input, e.g., turn on flash, turn off camera, view saved captured images etc. Operation proceeds from step 3050 back to step 3040 and one or more steps are performed based in additional detected user input.

FIGS. 31-40 are used to facilitate an understanding of the usefulness of the exemplary orientation indicator tool (also referred to as the level tool) feature provided in the camera device in some embodiments. The orientation indicator tool provides the user with feedback about the orientation of the device. The orientation implies the pitch, roll and yaw of an object, relative to the pull of gravity.

Figure 31:
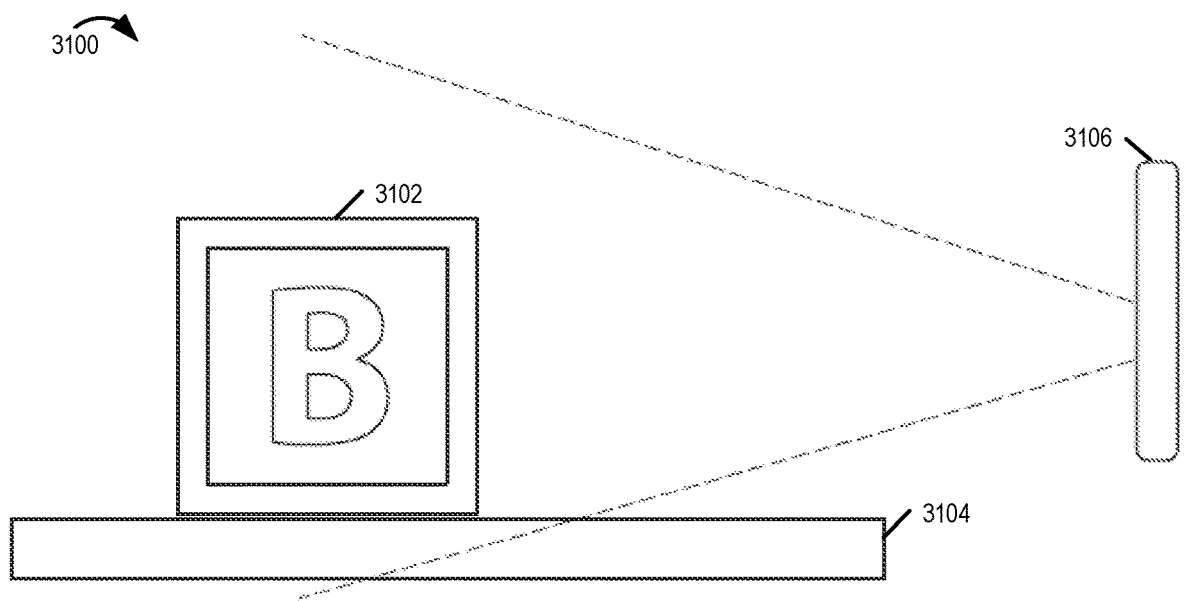
FIG. 31 illustrates a drawing showing an object, e.g., a cube with one letter on each side, placed on a table and an exemplary camera device which may be used to capture an image of the object.

FIG. 31 illustrates a drawing 3100 showing an object 3102, e.g., a cube with one letter on each side, placed on a table 3104 and an exemplary camera device 3106 which may be used to capture a image of the object 3102. The object 3102 has the letter "B" on the front facing side (looking at the drawing 3100), the letter "A" on the side facing and closet to the camera 3106 and the letter "C" on the top of the object cube 3102. The drawing 3100 shows the orientation of the camera 3106 relative to the object 3102 and table 3104, e.g., how the camera 3106 is held to capture an image of the object 3102.

Figure 32:
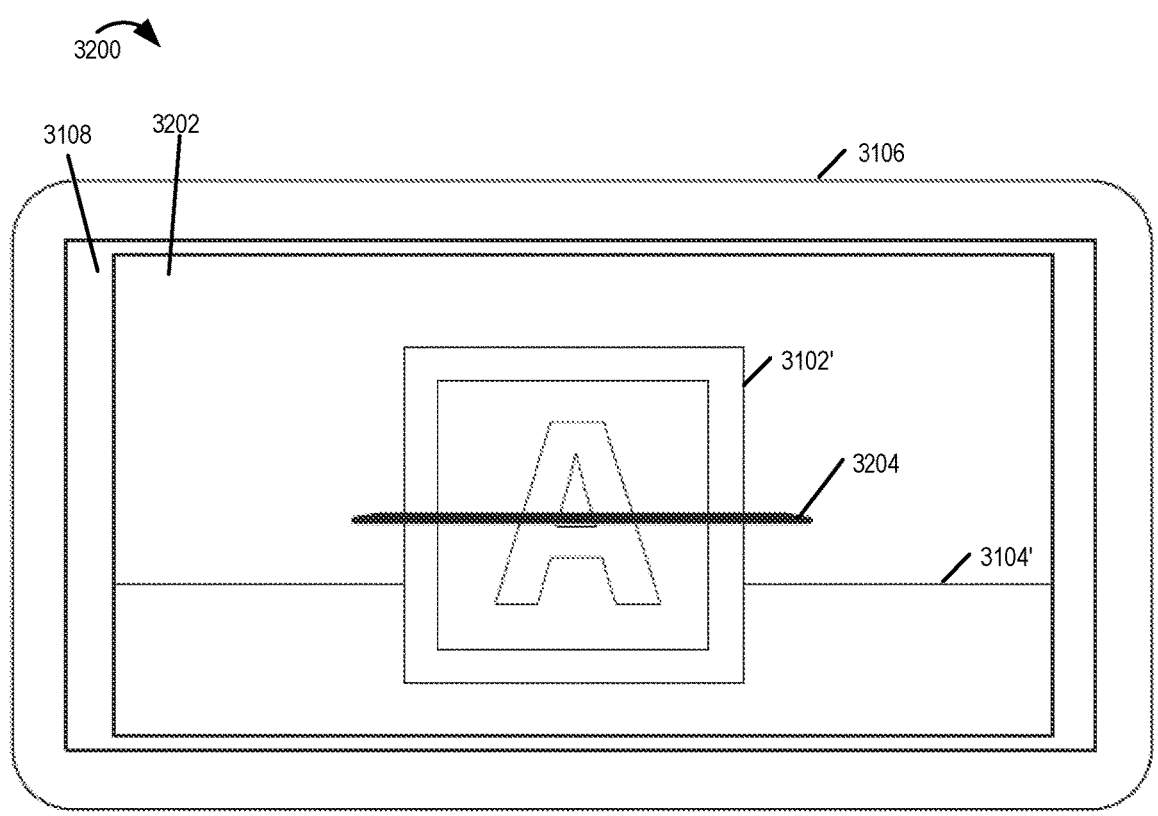
FIG. 32 illustrates a drawing showing the camera and a displayed preview image on the camera display screen at a time when the user has activated the exemplary orientation indicator tool, e.g., by selecting the OI option icon.

FIG. 32 illustrates a drawing 3200 showing the camera 3106 and a displayed preview image 3202 on the camera display screen 3108 at a time when the user has activated the exemplary orientation indicator tool, e.g., by selecting the OI option icon 1806. The displayed preview image 3202 includes a rendered images 3102' and 3104' of the object 3102 and the table 3104 respectively as it appears to the user viewing the object 3102 on the table 3104 through the camera 3106 in the scenario shown in FIG. 31 and an orientation indicator 3204 which represents an object, rendered in 3D space and animated, so as to appear to remain at a fixed orientation relative to the ground and this the horizontal table surface which is parallel to the ground. In the scenario illustrated in FIG. 31 since the camera 3106 is in a vertical position with the front portion of the camera 3106 extending in the horizontal direction parallel to the ground and horizontal surface of the table 3104 the orientation indicator 3204 in FIG. 32 appears as a generally flat line extending parallel to the table surface superimposed on the preview image 3102' of the object 3102.

The orientation sensor, e.g., gyroscope and/or accelerometer, output is used to determine camera orientation based on sensor reading and controls the position and shape of the orientation indicator 3204 to provide the user information with respect to camera orientation the real world.

In some embodiments the shape used as the orientation indicator object 3204 is a square plane segment, rendered as an outline, but any shape, object or rendering style is possible, e.g., shape in the form of a rectangle in some embodiments. As illustrated the shape is superimposed over the image which is being displayed to provide the user in indication of the horizontal, e.g., ground, position in the real world even though the object may be captured at an angle or other orientation. Output from accelerometers, gyroscopes and/or other sensors used to determine orientation of the camera as images are captured and displayed are used to control the orientation of the orientation indicator object on the display. Thus, camera tilt and rotation can be detected and reflected in displayed version of the orientation indicator.

The typical fixed orientations are horizontal (landscape/level) and vertical (portrait/plumb), but any preset or programmable orientations are possible. The level tool provides additional feedback when the device is close to one of the target orientations. For example, the typical indication is a change in color or line thickness of the widget. The widget may change in other ways, such as changing shape. The user can program one or more desired target orientations and thus the orientation indicator 3204 can be used by the user to determine when a desired target orientation is achieved. This facilitates the user's ability to reliably capture multiple shots using the same orientation at different times and/or at different locations even though it might be difficult for the user without the aid of the indicator 3204 to determine a true level condition because of being a hill or other inclined surface. The typical target orientations are horizontal (landscape/level) and vertical (portrait/plumb), but any preset or programmable orientations are possible. The level tool may, and in some embodiments does, provide other indications that the device has reached a target orientation, such as sounds or vibration. The level tool thus allows the user to accurately position the camera to capture scenes at a predefined orientation. This is particularly important for architecture and landscape photography. The level tool may be selected from by selecting the "more options" control icon, e.g., icon 1006 and/or 1208, and then selecting "orientation indicator" to enable the orientation indicator tool to be displayed.

Figure 33:
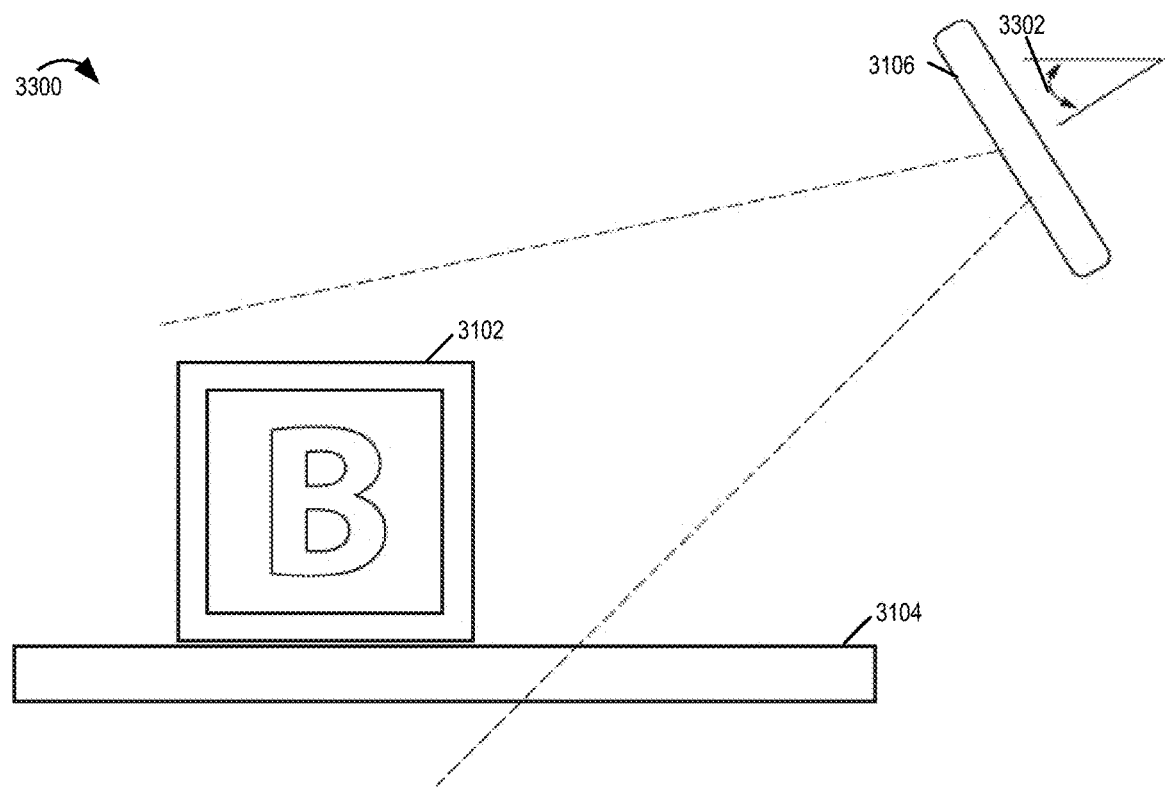
FIG. 33 illustrates a drawing showing the object on the table and the exemplary camera device held at an angle with respect to the horizontal surface of the table which is parallel to the ground.

FIG. 33 illustrates a drawing 3300 showing the object 3102 on the table 3104 and the exemplary camera device 3106 held at an angle (indicated by reference 3302) with respect to the horizontal surface of the table 3104 which is parallel to the ground. It can be seen that the camera orientation relative to the object 3102 and table 3104 shown in drawing 3300 is different than that shown in drawing 3100. It can be appreciated from FIG. 33 that with the camera 3106 being held in the manner shown in the drawing, i.e., with the front portion of the camera 3106 extending in a direction which is at an angle with respect to the ground and horizontal surface of the table 3104, more than one side of the object cube 3102 is visible to the user through the camera 3106.

Figure 34:
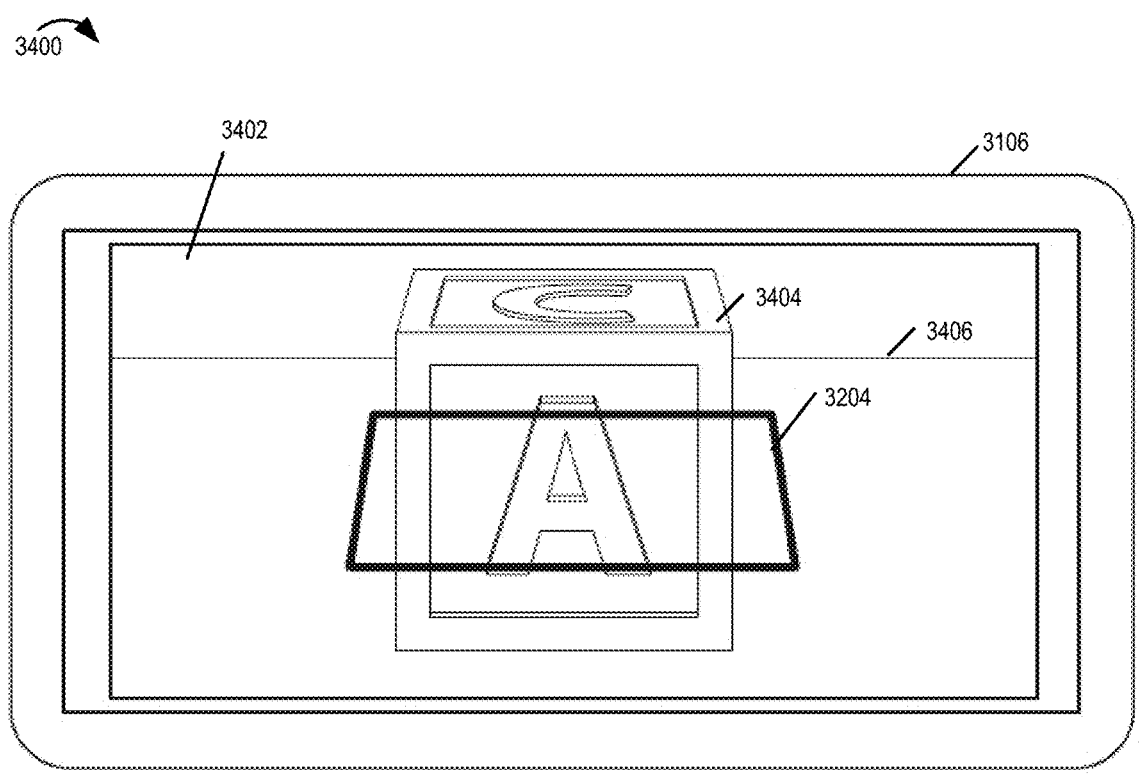
FIG. 34 illustrates a drawing showing the camera and a displayed preview image on the camera display screen corresponding to the capture scenario illustrated in FIG. 33 and with the orientation indicator tool being activated.

FIG. 34 illustrates a drawing 3400 showing the camera 3106 and a displayed preview image 3402 on the camera display screen corresponding to the capture scenario illustrated in FIG. 33 and with the orientation indicator tool being activated. The displayed preview image 3402 includes rendered images 3404 and 3406 of the object 3102 and the table 3104, respectively, as it appears to the user viewing the object 3102 on the table 3104 through the camera 3106 in the scenario shown in FIG. 33. Also displayed overlaid on the preview object image 3404 is the orientation indicator 3204. As can be seen in the figure, since the camera 3106 is no longer in a vertical position but rather oriented at an angle with respect to the horizontal, the orientation indicator 3204 in FIG. 34 appears as a tilted rectangular outline reflecting the camera tilt and rotation with respect to the ground.

Figure 35:
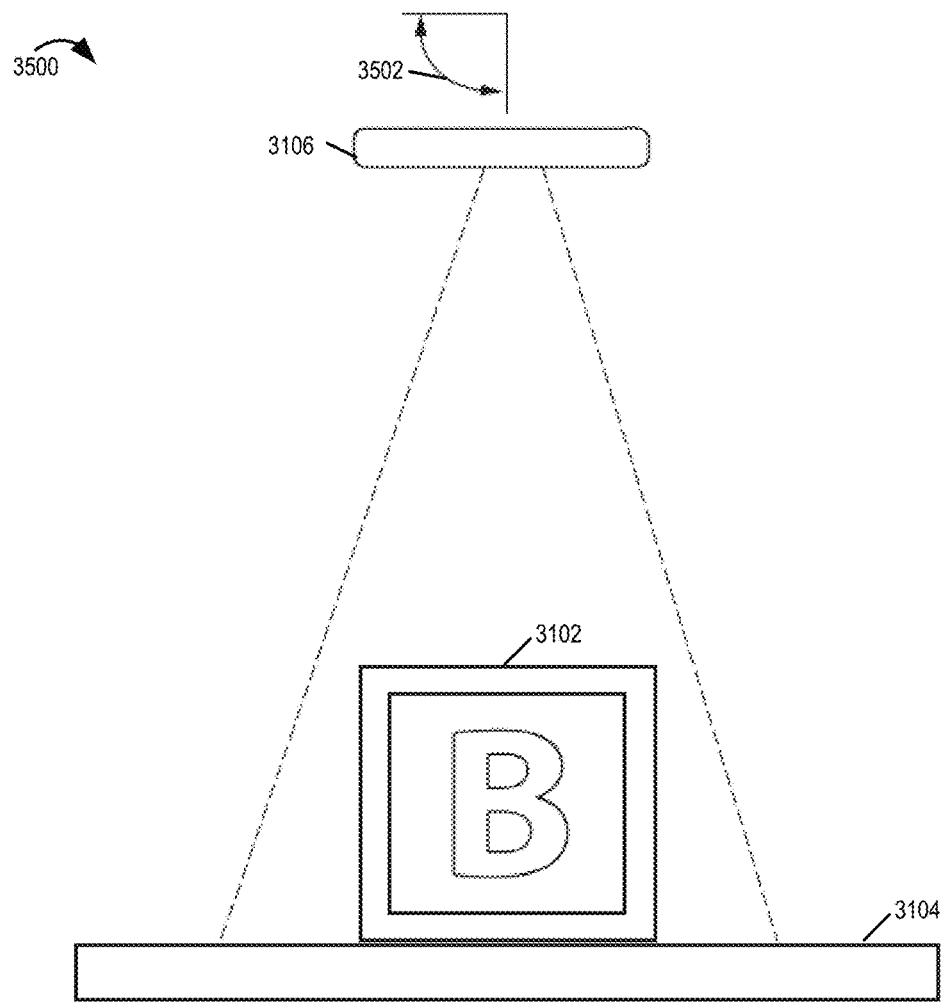
FIG. 35 illustrates a drawing showing the object on the table and the exemplary camera device held directly facing the top face of the object.

FIG. 35 illustrates a drawing 3500 showing the object 3102 on the table 3104 and the exemplary camera device 3106 held directly facing the top face of the object 3102. As can be seen the front portion of the camera 3106 extends in the vertical direction downwards and thus about 90 degrees (indicated by reference 3302) with respect to the ground and horizontal surface of the table 3104. It can be appreciated from FIG. 35 that with the camera 3106 being held in the manner shown in drawing 3500, the top face of the object cube 3102 is visible to the user through the camera 3106.

Figure 36:
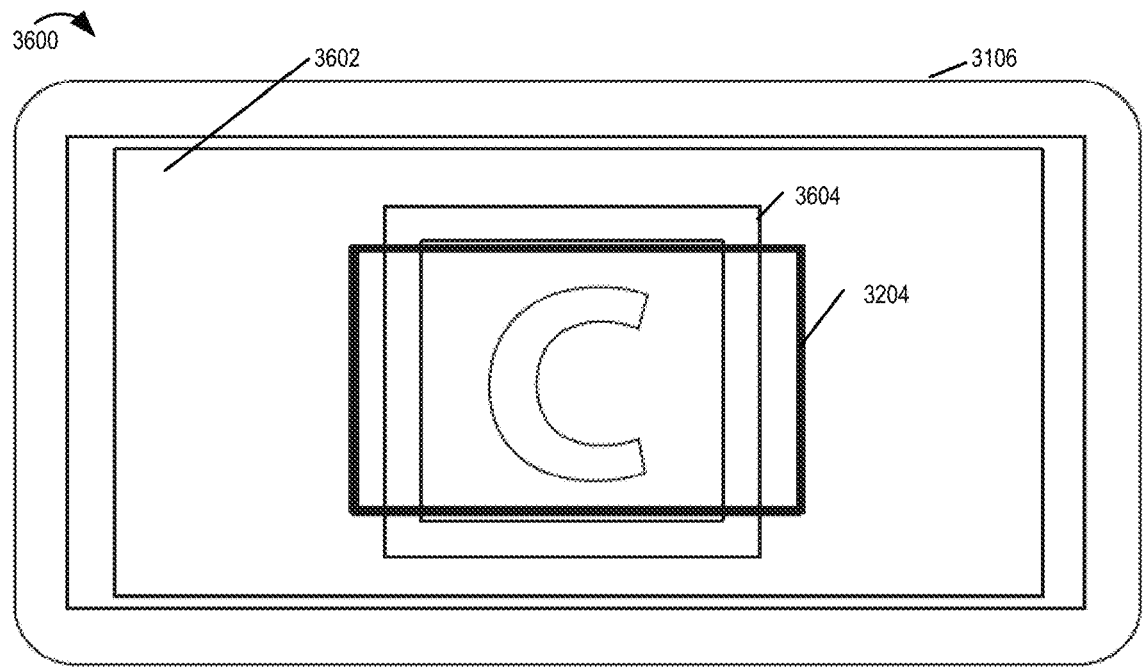
FIG. 36 illustrates a drawing showing the camera and a displayed preview image on the camera display screen corresponding to the capture scenario illustrated in FIG. 35 and with the orientation indicator tool being activated.

FIG. 36 illustrates a drawing 3600 showing the camera 3106 and a displayed preview image 3602 on the camera display screen corresponding to the capture scenario illustrated in FIG. 35 and with the orientation indicator tool being activated. The displayed preview image 3602 includes a rendered image 3604 of the top face of the object 3102 (face with letter "C") as it appears to the user viewing the object 3102 through the camera 3106 in the scenario shown in FIG. 35. The orientation indicator 3204 is also displayed overlaid on the preview object image 3604 and appears as a rectangular outline but with a different perspective compared to the shape and perspective of indicator 3204 shown in FIG. 34. In FIG. 36 the orientation indicator is shown as a upright rectangle reflecting the fact that the camera is orientated in a horizontal position facing downward with front of the camera being parallel to the ground.

Figure 37:
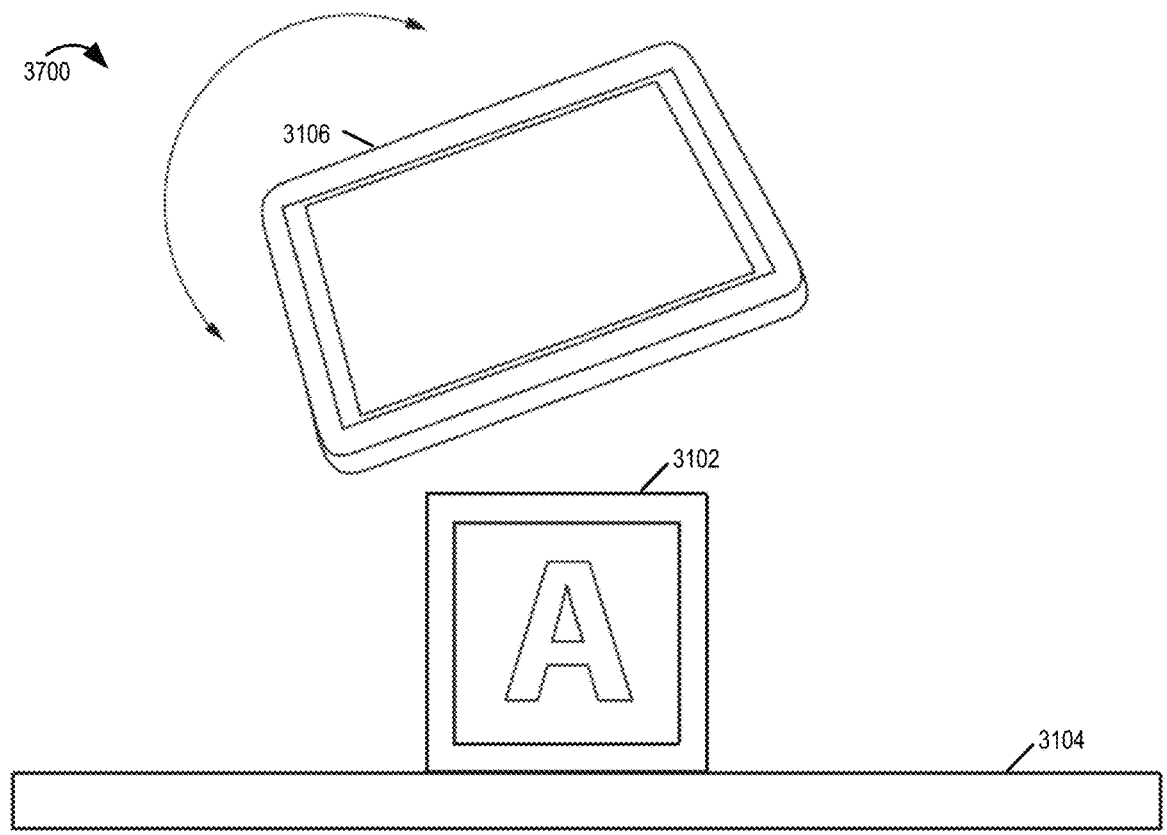
FIG. 37 illustrates a drawing showing the object on the table and the exemplary camera device held such that the camera is both tilted, e.g., with respect to the ground or table surface, and rotated, e.g., anticlockwise with respect to a vertical axis extending from the top face of the object to the bottom face of the object or the table.

FIG. 37 illustrates a drawing 3700 showing the object 3102 on the table 3104 and the exemplary camera device 3106 held such that the camera 3106 is both tilted, e.g., with respect to the ground or table 3104 surface, and rotated, e.g., anticlockwise with respect to a vertical axis extending from the top face of the object 3102 to the bottom face of the object 3102 or the table 3104. It can be appreciated from FIG. 37 that with the camera 3106 being held in the manner shown in drawing 3700, the object 3102 can be observed in a different perspective by the user through the camera 3106 compared to other drawings.

Figure 38:
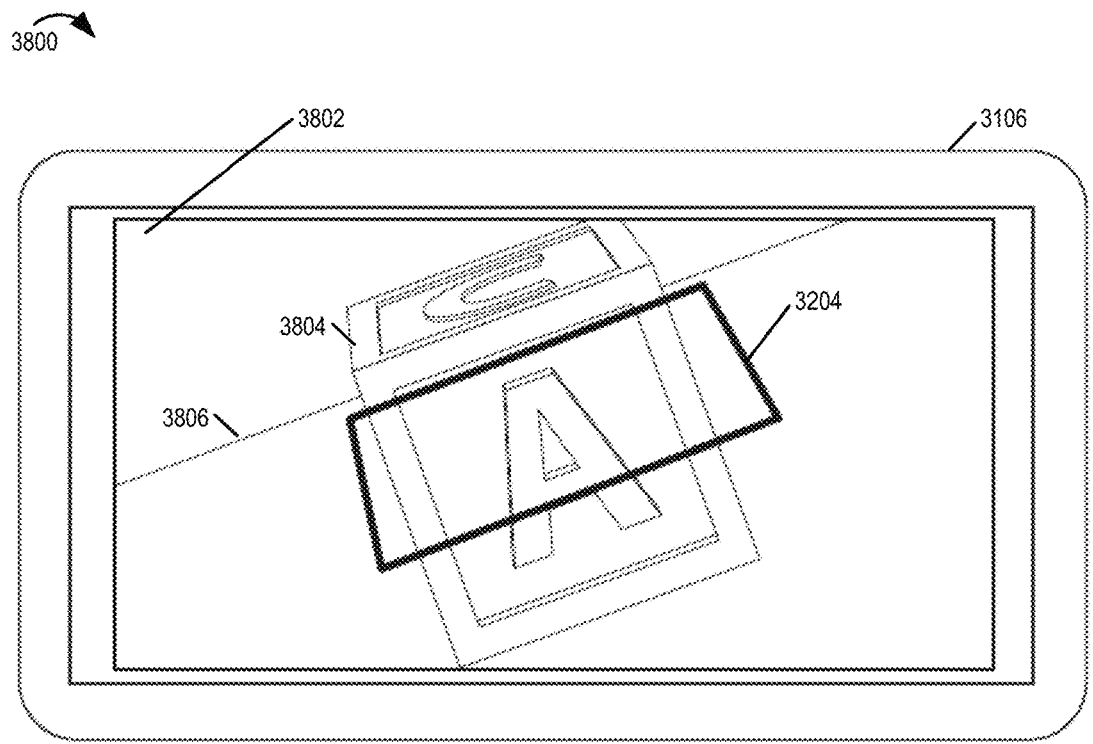
FIG. 38 illustrates a drawing showing the camera and a displayed preview image on the camera display screen corresponding to the capture scenario illustrated in FIG. 37 and with the orientation indicator tool being activated.

FIG. 38 illustrates a drawing 3800 showing the camera 3106 and a displayed preview image 3802 on the camera display screen corresponding to the capture scenario illustrated in FIG. 37 and with the orientation indicator tool being activated. The displayed preview image 3802 includes rendered images 3804 and 3806 of the object 3102 (with two sides of the object being visible) and portion of the table 3104 respectively as they appear to the user viewing through the camera 3106 in the scenario shown in FIG. 37. The orientation indicator 3204 is also displayed overlaid on the preview object image 3804 and appears as a rectangular outline oriented in a manner that reflects the camera tilt and rotation with respect to the ground.

Figure 39:
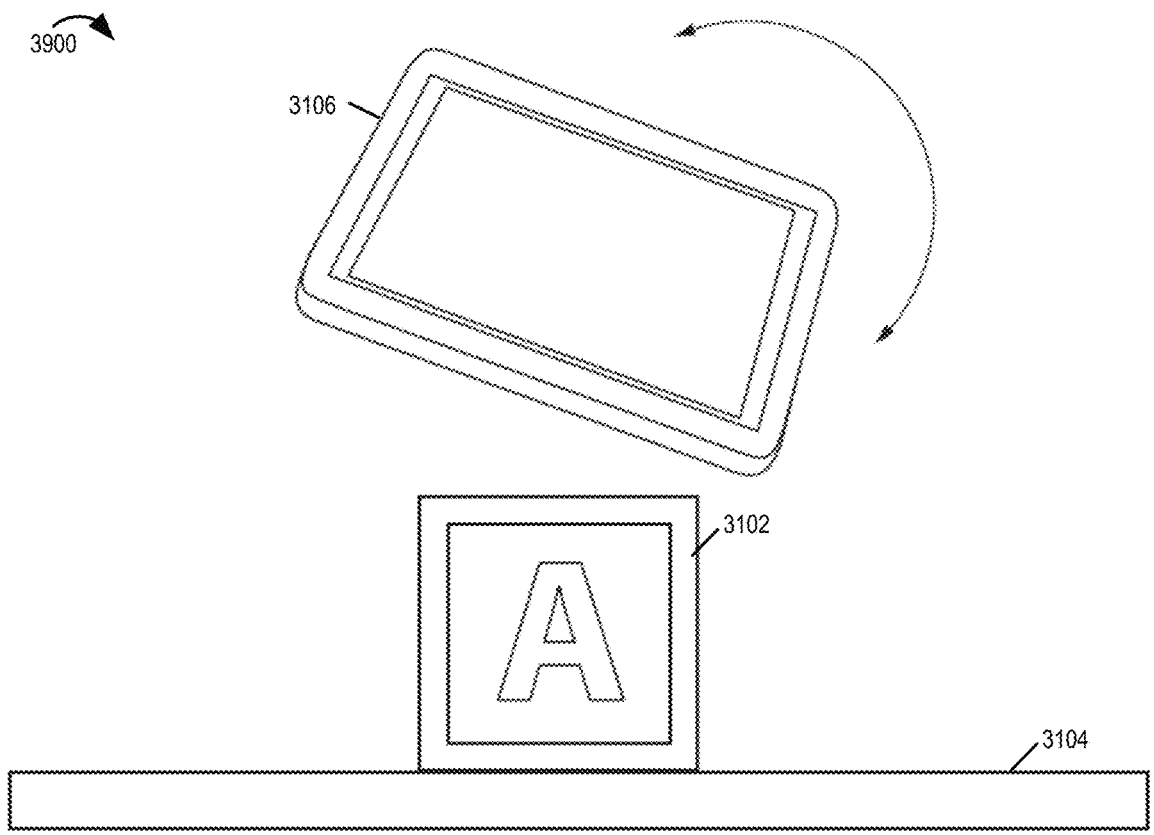
FIG. 39 illustrates a drawing showing the object on the table and the exemplary camera device held such that the camera is both tilted, e.g., with respect to the ground or table surface, and rotated, e.g., clockwise with respect to a vertical axis extending from the top face of the object to the bottom face of the object or the table.

FIG. 39 illustrates a drawing 3900 showing the object 3102 on the table 3104 and the exemplary camera device 3106 held such that the camera 3106 is both tilted, e.g., with respect to the ground or table 3104 surface, and rotated, e.g., clockwise with respect to a vertical axis extending from the top face of the object 3102 to the bottom face of the object 3102 or the table 3104. It can be appreciated from FIG. 39 that with the camera 3106 being held in the manner shown in drawing 3900, the object 3102 can be observed in a different perspective by the user through the camera 3106 compared to other drawings.

Figure 40:
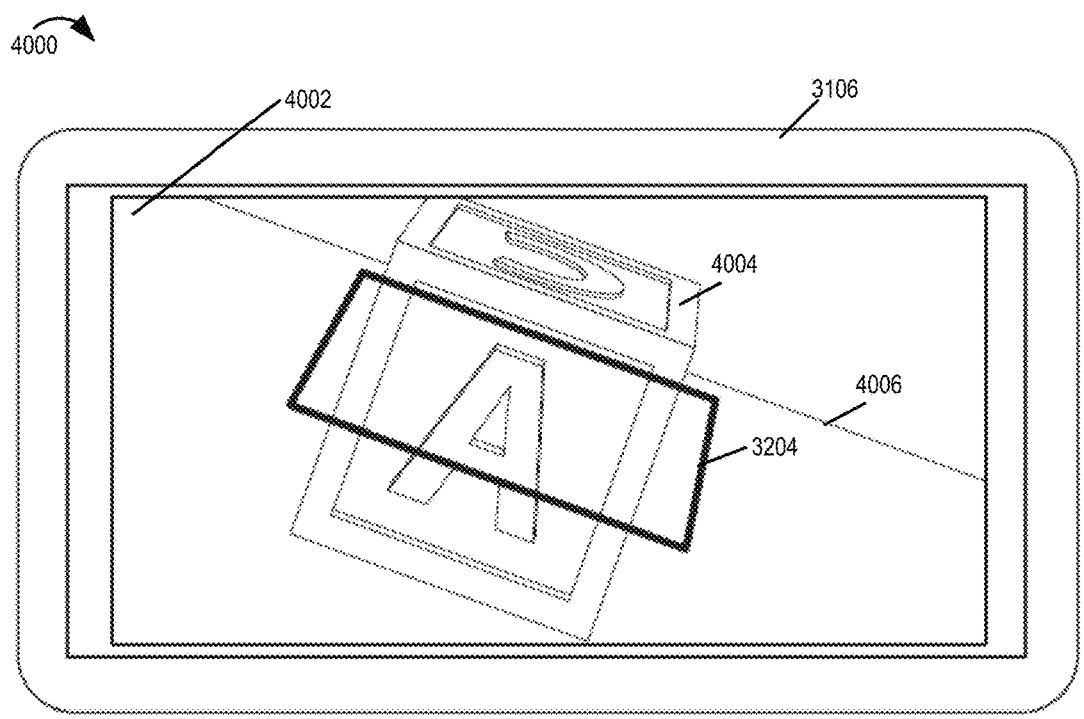
FIG. 40 illustrates a drawing showing the camera and a displayed preview image on the camera display screen corresponding to the capture scenario illustrated in FIG. 39 and with the orientation indicator tool being activated.

FIG. 40 illustrates a drawing 4000 showing the camera 3106 and a displayed preview image 4002 on the camera display screen corresponding to the capture scenario illustrated in FIG. 39 and with the orientation indicator tool being activated. The displayed preview image 4002 includes rendered images 4004 and 4006 of the object 3102 (with two sides of the object being visible) and portion of the table 3104 respectively as they appear to the user viewing through the camera 3106 in the scenario shown in FIG. 39. The orientation indicator 3204 is also displayed overlaid on the preview object image 4004 and appears as a rectangular outline oriented in a manner that reflects the camera tilt and rotation with respect to the ground in such a scenario.

An exemplary method of controlling a camera device, e.g., camera device 100/200, in accordance with one exemplary embodiment comprises: detecting user selection of a camera control option; and displaying (e.g., on a touch sensitive display 102 of camera 100) a set of user selectable values for the user selected control option, a currently selected value in the displayed user selectable values being displayed at a predetermined location on the screen. In some embodiments the predetermined location on the screen is a center screen location.

In some embodiments the method further comprises: displaying, prior to detecting user selection of the camera control option, user selectable control options corresponding to different controllable camera settings, said detected user selection of the camera control option being one of the displayed user selectable control options. In some embodiments the user selectable control options include at least one of an ISO setting, a shutter speed setting, an exposure setting or a zoom setting. In some embodiments the user selectable control options include at least two of an ISO setting, a shutter speed setting, an exposure setting or a zoom setting.

In some embodiments the method further comprises: detecting user input indicating a desire to change the currently selected value corresponding for the user selected control option; and changing said the set of user selectable values to move a new currently selected value to the predetermined location on the screen in response to the user input. In some embodiments the user input is a swipe of a screen indicating a user desired change in an increasing or decreasing value direction. In some embodiments changing the set of user selectable values includes simulating rotation of a wheel with said user selectable values being displayed as if on the surface of the wheel with the currently selected value being closest to the user and user selectable values above and below said currently selected value being shown using a smaller size as if further away from the user.

In some embodiments the method further comprises: displaying a control indicator next to the currently selected value indicating the type of value being controlled (e.g., exposure, film speed, etc). In some embodiments the method further comprises: detecting user input indicating that the user seeks to switch between a current mode of operation to another mode of operation, the current mode of operation being one of a normal mode of operation and a control mode of operation, said another mode of operation being different from the current mode of operation; and switching between modes of operation in response to detecting user input indicating that the user seeks to switch between one of a normal mode of operation and a control mode of operation, said switching including displaying one or more control options to a user that were not being displayed if the switch is from a normal mode of operation to a control mode of operation and closing the display of the one or more control options being displayed if the switch is from the control mode of operation to the normal mode of operation.

In some embodiments the method further comprises: determining a contrast level between a color used to display at least one of the user selectable values and at least a portion of an image to be displayed with the at least one of the user selectable values, and if it is determined that the contrast level is below a threshold value, changing the color used to display the at least one user selectable value. In some embodiments changing the color used to display the at least one user selectable value includes switching from black to white or from white to black. In some embodiments switching from black to white occurs when said image is a dark image. In some embodiments the switch from white to black occurs when white is being used to display the at least one user selectable value and the image is a light image. In some embodiments the method further comprises: detecting user input (pinch or spread) used to control a zoom setting, displaying a zoom control bar including a slider indicating a current zoom setting, and changing the position of the slider to show user modification of the zoom setting made in response to detected user zoom control setting input. In some embodiments the user input is one of a pinch operation, a screen touch and finger spread operation or touching a location on the slider control bar. In some embodiments the method further comprises: displaying, while said zoom control bar is displayed, a value corresponding to a zoom setting which matches a zoom level provided by a hardware module, zoom levels between those provided by a hardware module being generated by computation processing of one or more captured images.

An exemplary camera device, e.g., such as camera 100 or 200, implemented in accordance with the invention, comprises: a touch sensitive display screen, e.g., display screen 102/215; and a processor (e.g., processor 110/211) configured to detect user selection of a camera control option displayed on the touch sensitive display screen and control the touch sensitive display screen to display a set of user selectable values for the user selected control option, a currently selected value in the displayed user selectable values being displayed at a predetermined location on the screen. In some embodiments the predetermined location on the screen is a center screen location.

In some embodiments the processor 110/211 is further configured to control the touch sensitive display screen to display, prior to the processor 110/211 detecting user selection of the camera control option, user selectable control options corresponding to different controllable camera settings, the detected user selection of the camera control option being one of the displayed user selectable control options. In some embodiments the user selectable control options include at least one of an ISO setting, a shutter speed setting, an exposure setting or a zoom setting.

In some embodiments the processor 110/211 is further configured to: detect user input indicating a desire to change the currently selected value corresponding for the user selected control option; and change the set of user selectable values to move a new currently selected value to the predetermined location on the screen in response to the user input. In some embodiments the user input is a swipe of a screen indicating a user desired change in an increasing or decreasing value direction.

In some embodiments the processor 110/211 is configured, as part of being configured to change the set of user selectable values, to simulate rotation of a wheel with the values on displayed as if on the surface of the wheel with the currently selected value being closest to the user and values above and below the currently selected value being shown using a smaller size as if further away from the user. In some embodiments the processor 110/211 is further configured to control the touch sensitive display screen to display a control indicator next to the currently selected value indicating the type of value being controlled (e.g., exposure, film speed, etc).

In some embodiments the processor 110/211 is further configured to: detect user input indicating that the user seeks to switch between a current mode of operation to another mode of operation, the current mode of operation being one of a normal mode of operation and a control mode of operation, the another mode of operation being different from the current mode of operation; and control the camera device to switch between modes of operation in response to detecting user input indicating that the user seeks to switch between one of a normal mode of operation and a control mode of operation, as part of controlling the camera device to switch between modes the processor 110/211 is further configured to control the touch sensitive display screen to i) display one or more control options to a user that were not being displayed if the switch is from a normal mode of operation to a control mode of operation, and ii) close the display of the one or more control options being displayed if the switch is from the control mode of operation to the normal mode of operation.

In some embodiments the processor 110/211 is configured to: determine a contrast level between a color used to display at least one of the user selectable values and at least a portion of an image to be displayed with the at least one of the user selectable values; and change the color used to display the at least one of the user selectable values if it is determined that the contrast level is below a threshold value.

In some embodiments the processor 110/211 is configured the processor is further configured to switch from black color to white color or from white color to black color as part of being configured to change the color used to display the at least one of the user selectable values.

In some embodiments the processor 110/211 is configured to: detect user input (pinch or spread) used to control a zoom setting. In some embodiments the user input is one of a pinch operation, a screen touch and finger spread operation or touching a location on the slider control bar. In some embodiments the processor 110/211 is configured to control the touch sensitive display to display a zoom control bar including a slider indicating a current zoom setting, and control, e.g., change, the position of the slider to show user modification of the zoom setting made in response to detected user zoom control setting input. In some embodiments the processor 110/211 is configured to control the touch sensitive display to display, while the zoom control bar is displayed, a value corresponding to a zoom setting which matches a zoom level provided by a hardware module, zoom levels between those provided by a hardware module being generated by computation processing of one or more captured images.

An exemplary camera device, e.g., camera 100/200, in some embodiments includes a non-transitory computer readable medium, e.g., memory 108/213, including computer executable instructions which when executed by a processor (e.g., processor 110/211) control the camera device to: detect user selection of a camera control option displayed on a touch sensitive display screen (e.g., display 102) of the camera device; and display, on the touch sensitive display screen, a set of user selectable values for the user selected control option, a currently selected value in the displayed user selectable values being displayed at a predetermined location on the screen.

In some embodiments the camera device 100/200 includes module for implementing the functions corresponding to each of the steps of flowchart 3000 discussed above. In some embodiments such modules are implemented as software modules, e.g., in the memory 108/213. In other embodiments the modules are implemented in hardware, e.g., as individual circuits with each module being implemented as a circuit for performing the function to which the module corresponds. In still other embodiments the modules are implemented using a combination of software and hardware.

The modules can, and in some embodiments are, implemented fully in hardware within the processor 110/211, e.g., as individual circuits. The modules can, and in some embodiments are, implemented fully in hardware, e.g., as individual circuits corresponding to the different modules. In other embodiments some of the modules are implemented, e.g., as circuits, within the processor 110/211 with other modules being implemented, e.g., as circuits, external to and coupled to the processor 110/211. As should be appreciated the level of integration of modules on the processor and/or with some modules being external to the processor may be one of design choice. Alternatively, rather than being implemented as circuits, all or some of the modules may be implemented in software and stored in the memory 108/213 of the camera device, with the modules controlling operation of the camera device 100/200 to implement the functions corresponding to the modules when the modules are executed by a processor, e.g., processor 110/211. In still other embodiments, various modules are implemented as a combination of hardware and software, e.g., with another circuit external to the processor providing input to the processor 110/211 which then under software control operates to perform a portion of a module's function.

While shown in the FIG. 1 and FIG. 4 embodiments as a single processor, e.g., computer, it should be appreciated that the processor 110/211 may be implemented as one or more processors, e.g., computers. When implemented in software the modules include code, which when executed by the processor 110/211, configure the processor 110/211 to implement the function corresponding to the module. In embodiments where such modules are stored in the memory 108/213, the memory 108/213 is a computer program product comprising a computer readable medium comprising code, e.g., individual code for each module, for causing at least one computer, e.g., processor 110/211, to implement the functions to which the modules correspond.

As should be appreciated, the processor 110/211 is configured to control the camera device 100/200 or one or more other elements therein, e.g., such as the touch sensitive display, to perform the functions of corresponding steps illustrated and/or described with regard to the flowchart 3000, which are performed as part of the exemplary method of operating the camera device.

While the methods have been shown for controlling camera settings such as ISO film speed, shutter speed, exposure control and zoom level, various other features and/or settings may be controlled by a user in the same or similar manner. Accordingly, numerous variations on the described and illustrated camera control methods are possible and within the scope of the invention. Numerous additional variations and combinations are possible while remaining within the scope of the invention.

Figure 41A:
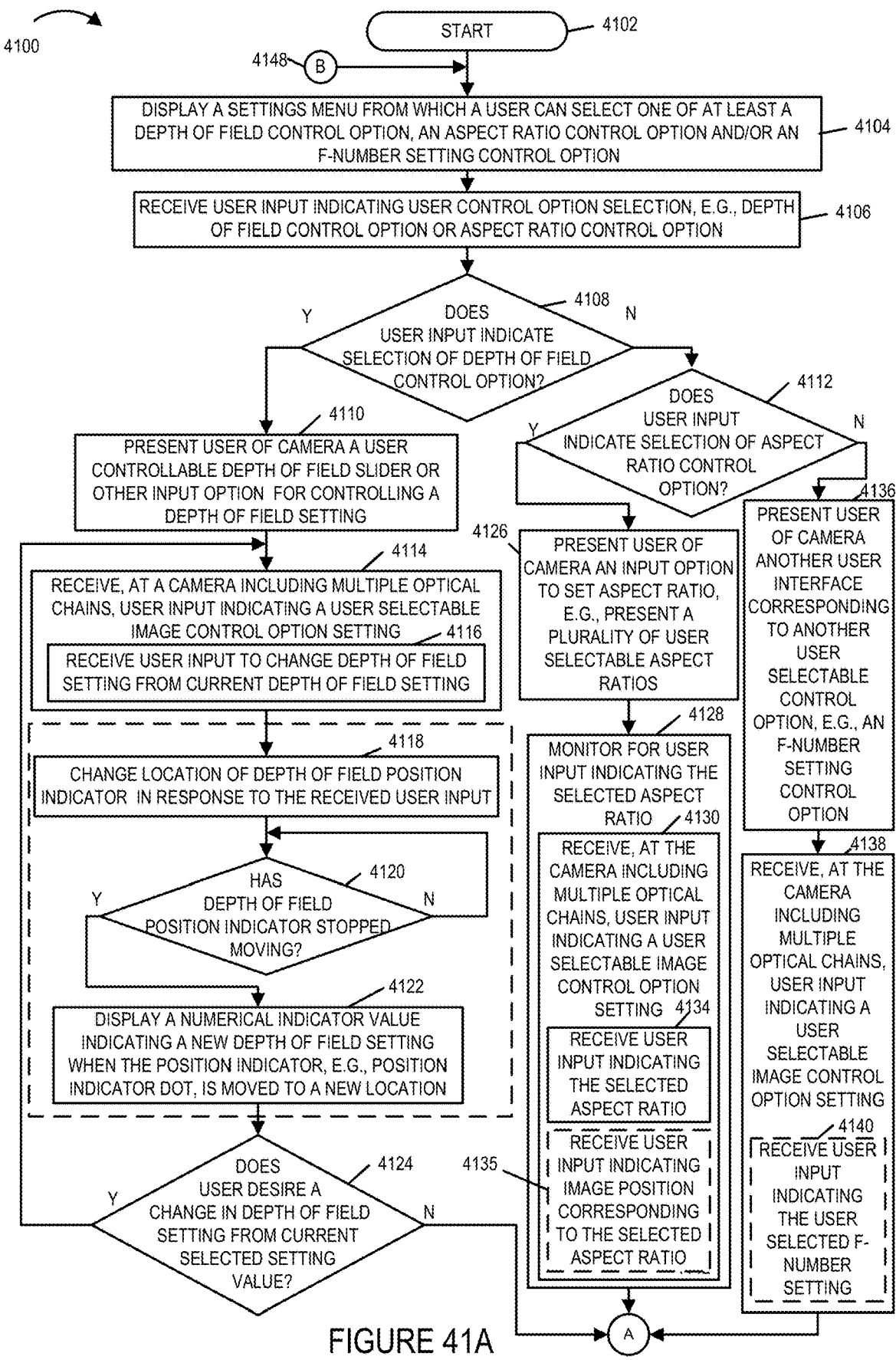
FIG. 41A is a first part of a flowchart of an exemplary method in accordance with an exemplary embodiment.
Figure 41B:
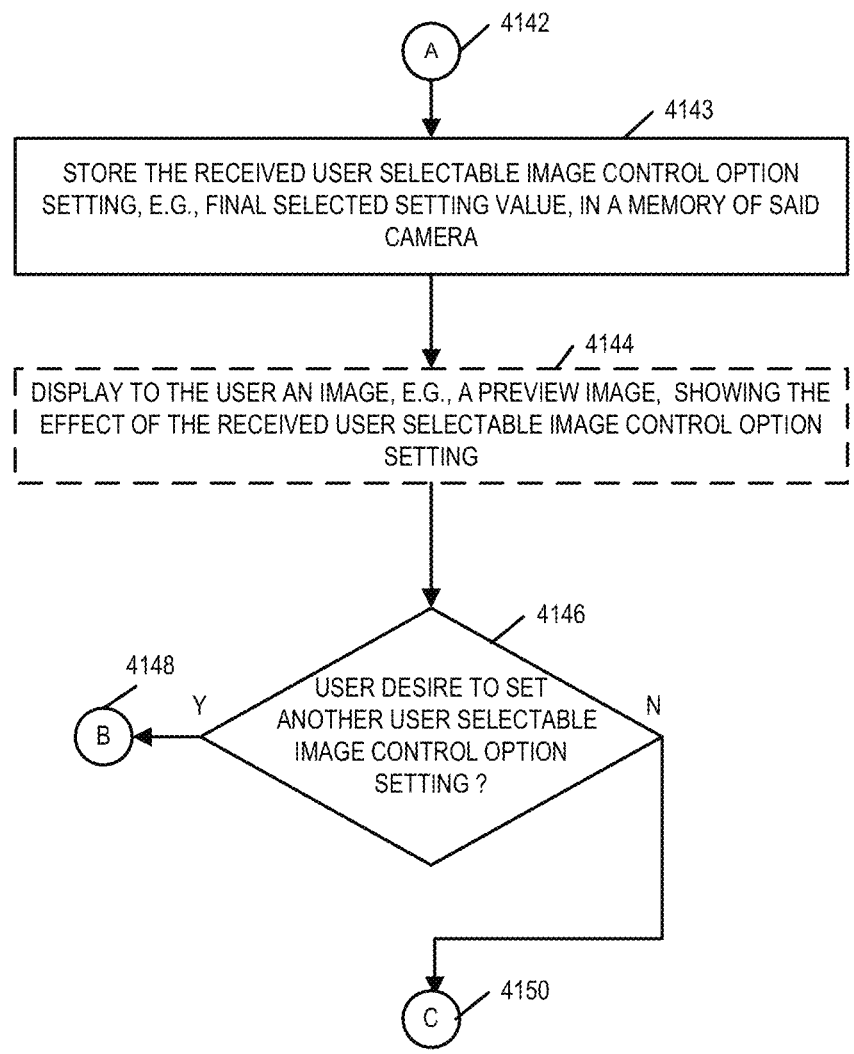
FIG. 41B is a second part of a flowchart of an exemplary method in accordance with an exemplary embodiment.

FIG. 41, comprising the combination of FIG. 41A, FIG. 41B and FIG. 41C, is a flowchart 4100 of an exemplary method in accordance with an exemplary embodiment. In some embodiments, the exemplary method of flowchart 4100 is performed by a camera device, e.g., a camera apparatus, including multiple optical chains, e.g., a camera device shown in any of the FIGS. 1-5. In various embodiments, some of the steps of the exemplary method of flowchart 4100 are performed by a camera device including multiple optical chains, e.g., camera device 100 of FIG. 1 and FIG. 50, and some of the steps of the exemplary method of flowchart 4100 are performed by a post capture image processing system, e.g., a computer system, e.g., image processing device 5001 of FIG. 50.

Figure 42:
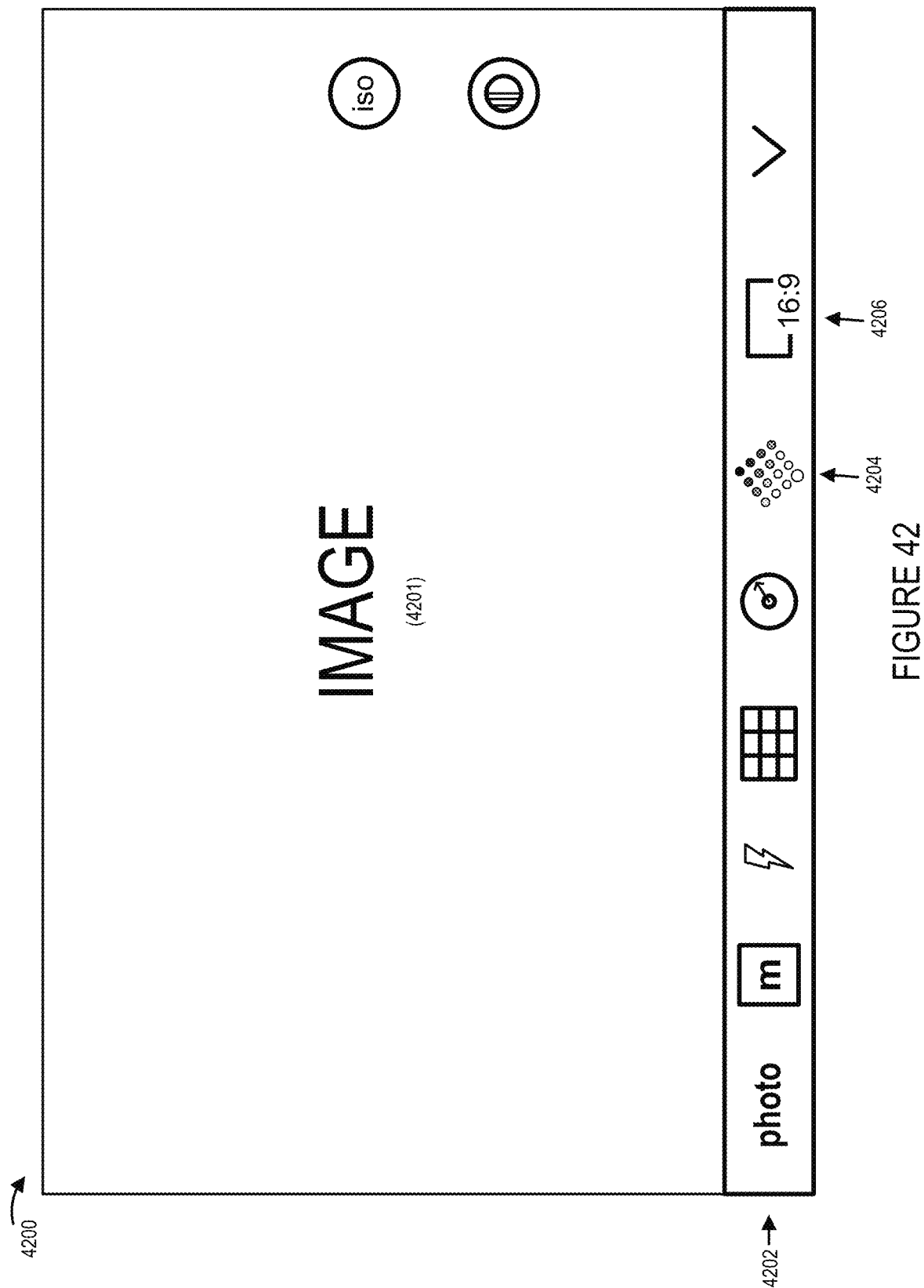
FIG. 42 is a drawing of an exemplary touch screen display view of a camera device, including multiple optical chains, which may be, and sometimes is, displayed to a user of the camera device, e.g., to present the user with user control options, in accordance with an exemplary embodiment.

Operation starts in step 4102 in which a camera device including multiple optical chains is powered on and initialized. Operation proceeds from step 4102 to step 4104, in which the camera device displays a setting2 menu from which a user can select one of at least a depth of field control option, an aspect ratio control option and/or an F setting control option. For example, in one exemplary embodiment, the setting menu, e.g., settings menu 4202 of FIG. 42, is displayed on the bottom portion of a touch screen of the camera device and the setting menu includes an icon corresponding to each of a plurality of different control options. Operation proceeds from step 4104 to step 4106 in which the camera device receives user input indicating a user control option selection, e.g., depth of field control option selection or aspect ratio control option selection. For example, the user selects the depth of field control option by touching the depth of field icon, e.g., depth of field icon 4204 of FIG. 42, on the setting menu, e.g., setting menu, and a sensor in the camera device detects that the touch screen was touched at the location of the depth of field icon indicating that the depth of field option has been selected. Alternatively, the user selects the aspect ratio control option by touching the aspect ratio icon, e.g., aspect ratio icon 4206 of FIG. 42, on the setting menu, and a sensor in the camera device detects that the aspect ratio icon was touched at the location of the aspect ratio icon indicating that the aspect ratio option has been selected.

Operation proceeds from step 4106 to step 4108. In step 4108 the camera device determines if the received user input indicates selection of the depth of field control option. If the determination is the that received user input indicates selection of the depth of field option, then operation proceeds from step 4108 to step 4110; otherwise, operation proceeds from step 4108 to step 4112.

Figure 43:
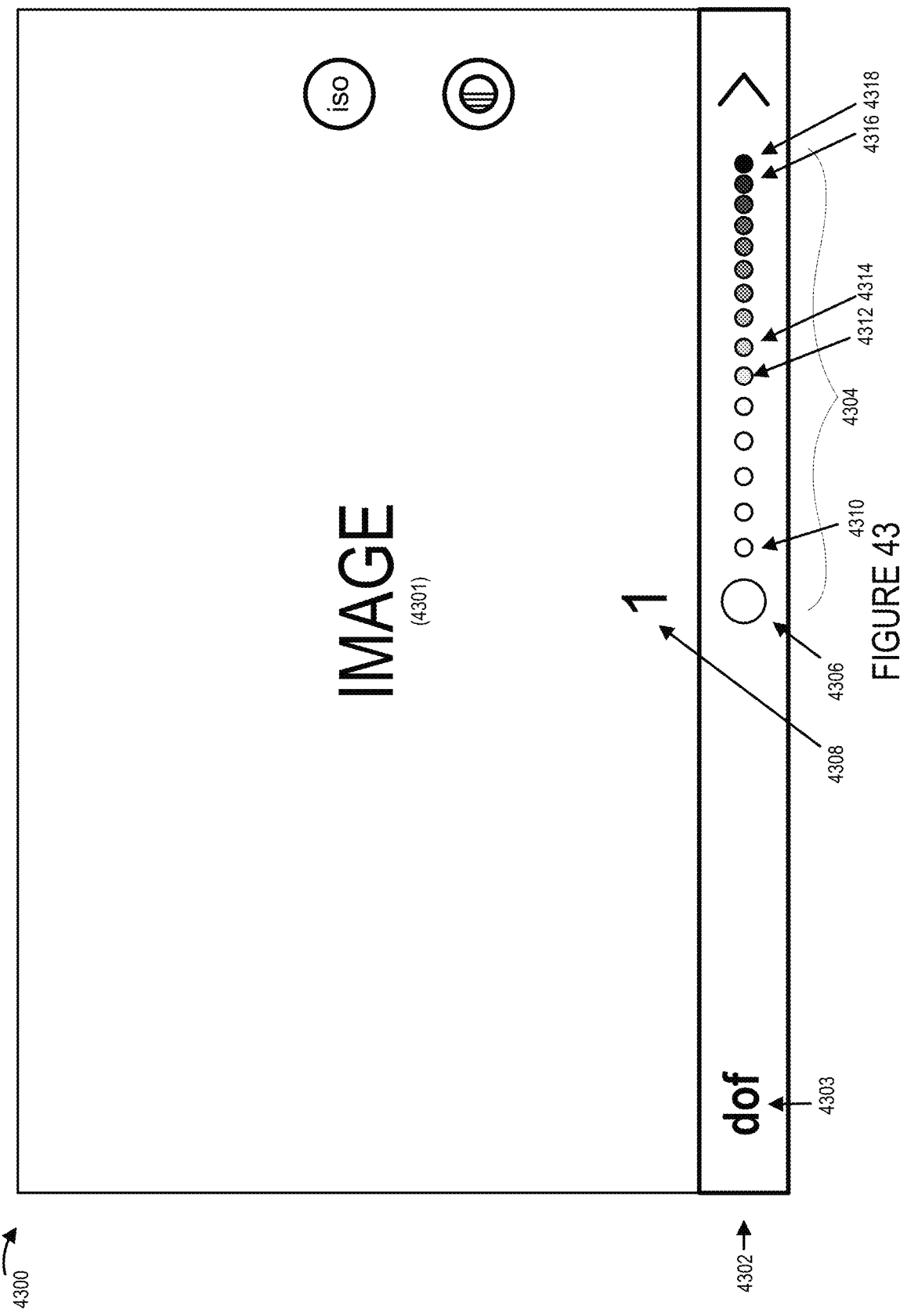
FIG. 43 is a drawing an exemplary touch screen display view of a camera device, including multiple optical chains, which may be, and sometimes is, presented to a user of the camera device, e.g., to allow a user input a depth of field setting, in accordance with an exemplary embodiment.

Returning to step 4110, in step 4110 the camera device presents the user of the camera device with a user controller depth of field slider, e.g., depth of field slider 4304 shown in FIG. 43, or other input option for controlling a depth of field setting.

In various embodiments, the depth of field slider includes a position indicator indicating a current depth of field setting position and a plurality of small dots indicating a path over which the position indicator dot can be moved to a new depth of field setting. For example, FIG. 43, depth of field slider 4304 includes position indicator dot 4306, e.g., a large bright dot, and a plurality of small dots, including small dots 4310, . . . , 4312, 4314, . . . , 4316, 4318, indicating a path over which the position indicator dot 4306 can be moved to a new depth of field setting. Note that the large position indicator dot 4306 is as bright as or brighter than small dot 4310; small dot 4312 is not as bright as small dot 4310; small dot 4314 is not as bright as small dot 4312; small dot 4316 is not as bright as small dot 4314; and small dot 4318 is not as bright as small dot 4316. In addition small dot 4318 is closer to small dot 4316 in comparison to the distance between small dot 4314 and 4312. Thus small dot brightest and small dot spacing can be are used to identify a path for changing the depth of field setting in this example. In the example of FIG. 43, the depth of field starts out with a setting of 1, which is the lowest setting on the slider, and the path indicator that the position indicator dot can be moved to higher setting values.

In various embodiments, the position indicator is a large dot which is at least as bright as the brightest small dot indicating the path of which the position indicator dot can move. For example, in FIG. 43, position indicator dot 4306 is a large dot and is at least as bright as small dot 4310 indicating the path in which the position indicator dot can move. As another example, in FIG. 44, position indicator dot 4406 is a large dot and is at least as bright as small dot 4410 indicating the path in which the position indicator dot can move. As yet another example, in FIG. 45, position indicator dot 4506 is a large dot and is at least as bright as small dot 4413 indicating a first path in which the position indicator dot can move, and is at least as bright as small dot 4415 indicating a second path in which the position indicator dot can move.

Figure 44:
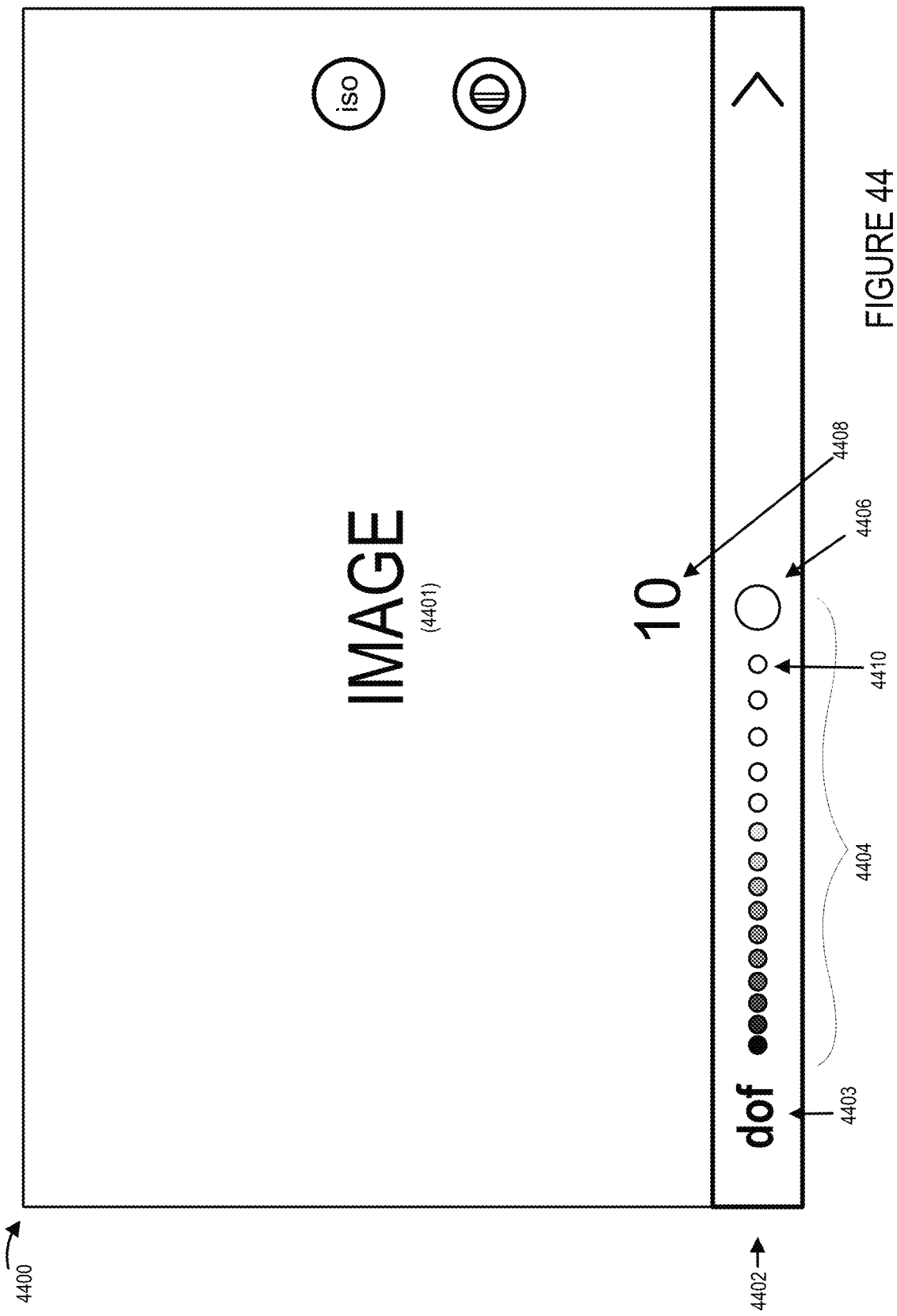
FIG. 44 is a drawing an exemplary touch screen display view of a camera device, including multiple optical chains, which may be, and sometimes is, presented to a user of the camera device, e.g., to allow a user to input a depth of field setting, in accordance with an exemplary embodiment.

In some embodiments, the small dots on the path over which the position indicator dot can be moved are brighter on the side of the slider path away from which the slider was most recently moved. For example, in FIG. 45, dots on side 4510 are brighter, e.g., an average dot brightness value is higher, than dots on side 4512. Thus, FIG. 45 indicates, based on a small dot brightness comparison between the two sides of the position indicator dot, that previously the position indicator was set at a value higher than 8.5, e.g., a value of 10, as shown in FIG. 44. Operation proceeds from step 4110 to step 4114.

In step 4114 the camera device, including multiple optical chains, receives user input indicating a user selectable image control option setting. In various embodiments, the received user selectable image control option setting is not used to control said multiple optical chains; the received information is stored prior to image capture but is not used use to control image capture and is use to control post capture image processing. Step 4114 includes step 4116 in which the camera device receives user input to change a depth of field setting from the current depth of field setting. For example, the user swipes along the depth of field slider from left to right to increase the depth of field setting. In some embodiments, e.g., embodiments, including the exemplary depth of field slider, operation proceeds from step 4114 to step 4118. In other embodiments, operation proceeds from step 4114 to step 4124.

In step 4118 the camera device changes the location of the depth of field position indicator in response to the received user input. Operation proceeds from step 4118 to step 4120. In step 4120, the camera checks to determine if the depth of field position indicator has stopped moving. In the example of FIG. 43, the position indicator is represented by large dot 4306. If the depth of field position indicator has stopped moving, then operation proceeds from step 4120 to step 4122.

Figure 45:
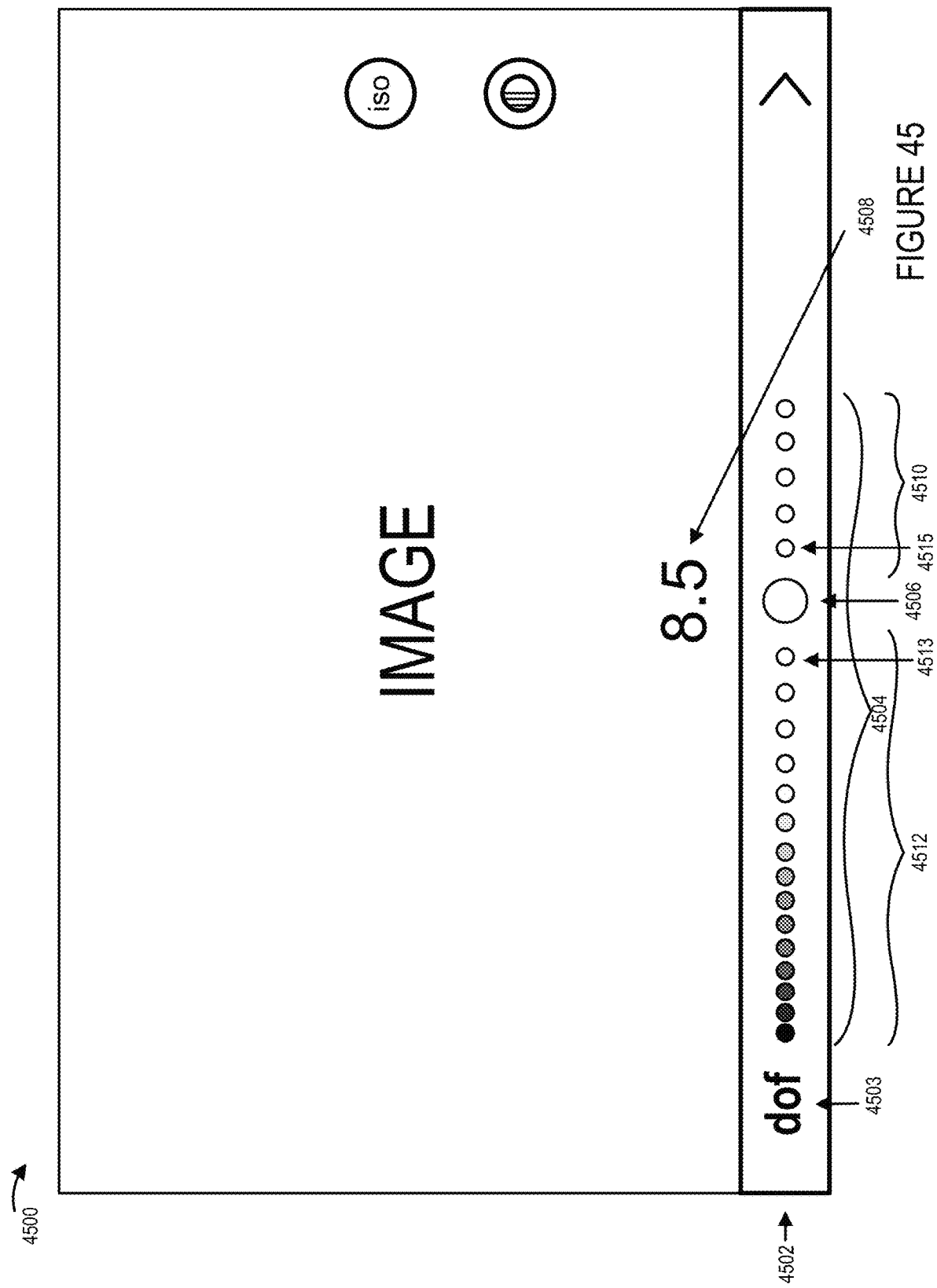
FIG. 45 is a drawing an exemplary touch screen display view of a camera device, including multiple optical chains, which may be, and sometimes is, presented to a user of the camera device, e.g., to allow a user to input a depth of field setting, in accordance with an exemplary embodiment.

In step 4122 the camera device displays a numerical indicator indicating a new depth of field setting when the position indicator dot is moved to a new location. In various embodiments, the numerical indicator value is not displayed over the new location while the depth of field position indicator is moving. In the example of FIG. 44, the numerical indicator 4408 displays value 10 above position indicator dot 4406; in the example of FIG. 43, the numerical indicator 4308 displays value 1 above position indicator dot 4306. Note that from FIG. 43 to FIG. 44, the indicator dot has moved from the left of the sliding indicator to the right of the sliding indicator. Operation proceeds from step 4122 to step 4124, in which the camera device determines whether or not the user desires a change in the depth of field setting from the current selected depth of filed setting value. If the camera device decides that the user wants a change then operation proceeds from step 4124 to step 4114, where the camera device receives additional user input. For example, consider that the current selected depth of field setting value is 10, as shown in FIG. 44, and that the user wants a lower value. The user swipes the depth of field slider, e.g., slider 4404 from right to left, causing the depth of field position indicator, e.g., 4406 as shown in FIG. 44, to move to a new position, e.g., the position of 4506 as shown in FIG. 45, e.g., performing another iteration of step 4118. Numerical indicator value 4508 indicates 8.5 above position indicator 4506, when the position indicator stops moving as shown in FIG. 45. Further consider that the user is satisfied with the user selection of 8.5 for depth of field. Since the user does not desire a change in depth of field from the current setting of 8.5, operation proceeds from step 4124, via connecting node A 4142 to step 4143.

Returning to step 4112, in step 4112 the camera device determines if the user input received in step 4106 indicates selection of the aspect ratio control option. If the received user input indicates selection of the aspect ratio control option, then operation proceeds from step 4112 to step 4126; otherwise, operation proceeds from step 4112 to step 4136.

In step 4126 the camera device presents the user of the camera an input option to set an aspect ratio. For example, the camera device presents the user of the camera a plurality of user selectable aspect ratios. In some embodiment, the plurality of user selectable aspect ratios include a 16:9 aspect ratio, a 4:3 aspect ratio and a 1:1 aspect ratio. In some such embodiments, the 4:3 aspect ratio corresponds to a maximum image capture area, e.g., based on the image sensors being used, and the 16:9 and 1:1 aspect ratios corresponds to cropping. In some embodiments, the plurality of user selectable aspect ratios include a 16:9 aspect ratio, a 4:3 aspect ratio, a 1:1 aspect ratio, and a custom aspect ratio. In some such embodiments, the custom aspect ratio can be set up the user, e.g., via user input to adjust a displayed box corresponding to the aspect ratio which is overlaid over the image, e.g., a cropping box. In various embodiments, the custom aspect ratio can be set to a user desired aspect ratio, e.g., a non-standard aspect ratio, e.g., 2:1, 16:8, etc.

In some embodiments, a user selected aspect ratio, which corresponds to a cropped image, corresponds to a predefined location, e.g., a centered location, of the cropped image with respect to the uncropped image, e.g., with respect to the maximum capture area image based on image sensor.

In various embodiments, in addition to selecting an aspect ratio, the user can select a positioning of the cropping box corresponding to a selected aspect ratio. For example, the user can move the cropping box corresponding to a selected aspect to a desired location and information is stored specifying the location of the cropping box. For example, the cropping box may be initially placed at a centered position and may be moved as desired within the boundaries of the overall uncropped image.

Operation proceeds from step 4126 to step 4128. In step 4128 the camera device monitors for user input indicating the selected aspect ratio. Step 4128 includes step 4130 in which the camera device including multiple optical chains receives user input indicating a user selectable image control option setting. In various embodiments, the received user selectable image control option setting is not used to control said multiple optical chains; the received information is stored prior to image capture but is not used use to control image capture and is use to control post capture image processing. Step 4130 includes step 4134, and in some embodiments, step 4135. In step 4134 the camera device receives user input indicating the selected aspect ratio. In step 4135 the camera device further receives user input indicating selected image position corresponding to the selected aspect ratio. Operation proceeds from step 4128, via connecting node A 4142, to step 4143.

Returning to step 4136, in step 4136 the camera device present the user of the camera another user interface corresponding to another user selectable control option, e.g., a n F-NUMBER setting control option. Other examples, of exemplary user selectable control options which may be, and sometimes are, presented to a user include, e.g., ISO setting, flash status, and exposure duration. Operation proceeds from step 4136 to step 4138. In step 4138 the camera device receives at the camera including multiple optical chains, user input indicating a user selectable control option setting. In various embodiments, the received user selectable image control option setting is not used to control said multiple optical chains; the received information is stored prior to image capture but is not used use to control image capture and is use to control post capture image processing. In some embodiments, step 4138 includes step 4140 in which the camera device including multiple optical chains receives user input indicating the user selected F-number setting. Operation proceeds from step 4138, via connecting node A 4142, to step 4143 in which the camera device stores the received user selectable image control option setting, e.g., final selected setting value, in a memory of the camera device. Operation proceeds from step 4143 to step 4144 or to step 4146. Step 4144, is an optional step which is performed in some embodiments, for some image control options. For example, in one embodiment, step 4144 is omitted if the user selectable image control option is a depth of field control option; however, step 4144 is performed if the user selectable image control option is an aspect ratio control option.

In step 4144 the camera device displays to the user an image, e.g., a preview image with the user selected aspect ratio to which the effect of the user selected setting is applied, showing the effect of the received user selectable image control option setting prior to capturing the images, e.g., in step 4152, used to generate a composite image, e.g., of step 4162. For example, consider that the control option is a aspect ratio control option, and the user selection is the 16:9 aspect ratio setting; the camera device display to the user a cropped image corresponding to the user selected 16:9 aspect ratio, e.g., which has been cropped from a larger previously display image which represents the largest area which may be captured which corresponds to the 4:3 aspect ratio. Operation proceeds from step 4144 to step 4146. In step 4146 the camera device determines if the user desires to set another user selectable image control option. If the camera device decides that the user desires to set another user selectable image control option, then operation proceeds from step 4146, via connecting node B 4148 to step 4104. However, in step 4146, if the camera device decides that the user does not desire to set another user selectable image control option, then operation proceeds from step 4146, via connecting node C 4150, to step 4152.

In step 4152 the camera device operates multiple optical chains to capture images after receipt of said user selectable image control option setting(s). For example, the camera device captures a set of image during an image capture time interval, each image in the set of images corresponding to a different one of said multiple optical chains. Operation proceeds from step 4152 to step 4154.

In step 4154 the camera device stores in memory one or more captured images, e.g., corresponding to the image capture time interval, in a file with metadata including the received user selectable image control option setting(s) and camera settings. For example, the data, e.g., pixel values for each set of images captured for a frame time are stored in a file along with metadata indicating the user selectable control option setting(s), e.g., aspect ratio, depth of field (DOF), F-setting, etc., which are provided at or before image capture, e.g., while the user is previewing an image of the scene area to be captured. In addition, in some embodiments, camera settings are also stored, e.g., flash status, ISO setting, exposure time, etc. Some of the stored camera settings may be, and sometimes are, based on received user input of a selected option by a user prior to image capture. Some of the stored camera settings may be, and sometimes are, camera settings derived automatically by the camera, e.g., based on a detected sensor input or a detected condition, e.g., low light detection activating a flash, and the setting may, and sometimes does vary from one frame to another without user intervention, e.g., when the camera is in an automatic mode with regard to the particular setting parameter. Some of the stored camera setting may be derived from other camera settings. In various embodiments, some of the stored camera settings affect image capture. Operation proceeds from step 4154 to step 4156.

In step 4156 the camera devices determines if the user wants to continue capturing images. If the camera device determines that the user wants to continue capturing images, then operation proceeds from step 4156 to step 4158. In step 4158 the camera device determines if any changes are to be made to user selectable image control option setting for subsequent image capture. If the camera device determines that changes are to be made to the user selectable image control option settings, then operation proceeds from step 4158, via connecting node B to step 4104. However, if the camera device determines that the user does not desire to make any changes to the user selectable image control option settings at this time, then operation proceeds from step 4158 to step 4152, in which the camera device operates multiple optical chains to capture images, e.g. capture a set of images corresponding to another image capture time interval.

Returning to step 4156, in step 4156 if the camera device decides that the user does not desire to continue capturing images, then operation proceeds from step 4156 to step 4160 or step 4162, depending upon the particular embodiment. Step 4160 is an optional step which is performed in some embodiments, in which post capture image processing can be, and sometimes is, performed by a post capture image processing system, e.g., a computer system external to the camera device which captures the images being processed. Subsequent steps 4162, 4164, and 4166 are performed by the camera device or by a post capture image processing system. Steps 4162, 4164 and 4166 will be described for an exemplary embodiment, in which the camera device performs the steps; however, it should be appreciated that in some embodiments, a post image capture processing system which is external to the camera device performs steps 4162, 4164 and 4166.

In step 4162, the camera device generates from the images captured by the multiple optical chains, e.g., during an image capture time interval being currently processed, a composite image in accordance with the stored user selectable image control option setting(s). Operation proceeds from step 4162 to step 4164. In step 4164 the camera device outputs the generated composite image to a display or transmits the generated composite image to another device. Operation proceeds from step 4164 to step 4166. In step 4166, the camera device determines if additional captured image(s) are to be processed corresponding to another image capture time interval. If additional captured image(s) are to be processed corresponding to another image capture time interval, then operation proceeds from step 4166 to step 4162; otherwise operation proceeds from step 4166 to stop step 4168.

FIG. 42 is a drawing of an exemplary touch screen display view 4200 of a camera device, including multiple optical chains, which may be, and sometimes is, displayed to a user of the camera device, e.g., to present the user with user control options, in accordance with an exemplary embodiment. Display view 4200 includes an image 4201 and a setting menu 4202. Settings menu 4202 includes a plurality of different icons including at least some icons corresponding to user control options. Menu 4202 includes a depth of field control option icon 4204 and an aspect ratio control option icon 4206. In some embodiments, there are additional icons corresponding to additions user control option functions, e.g., an F-number setting control option. In some embodiments, a user of the camera device taps or touches the touch screen in the location of depth of field control icon 4204 to indicate that the user has selected the depth of field control option. In some embodiments, a user of the camera device taps or touches the touch screen in the aspect ratio control icon 4206 to indicate that the user has selected the aspect control option. In some embodiments, a text type menu, e.g., a pull down text type setting menu is available for a user to select user control options, e.g., including a depth of field control option, and an aspect ration control option.

FIG. 43 is a drawing an exemplary touch screen display view 4300 of a camera device, including multiple optical chains, which may be, and sometimes is, presented to a user of the camera device, e.g., to allow a user input a depth of field setting, in accordance with an exemplary embodiment. Display view 4300 includes an image 4301 and a depth of field (dof) portion 4302. The depth of field portion 4302 includes a depth of field identifier 4303, which is "dof", for identifying that the presented controllable slider is for depth of field user input, a controllable depth of field slider 4304 for controlling a depth of field setting, a depth of field position indicator 4306 for indicating the depth of field setting. A user slides a finger along the depth of field slider 4304 to change the depth of field setting. Depth of field numerical indicator value 4308, located above the current depth of field indicator 4306, indicates the current setting of the depth of field when the depth of field indicator 4306 is not moving. In various embodiments, the depth of field numerical indicator value is not presented while the depth of field position indicator 4306 is in motion. In one exemplary embodiment, the depth of field numerical value is greater than or equal to 1 and less than or equal to 10, with a value of 1 requesting the lowest setting for depth of field and a value of 10 representing the highest setting for depth of field. In the example of FIG. 43, the depth of field setting is 1. In various embodiments, a setting of 1 is the default setting initially presented to a user.

In this example, if the user slides a finger from left to right along depth of field slider 4304, the depth of field setting can be increased.

FIG. 44 is a drawing an exemplary touch screen display view 4400 of a camera device, including multiple optical chains, which may be, and sometimes is, presented to a user of the camera device, e.g., to allow a user to input a depth of field setting, in accordance with an exemplary embodiment. Display view 4400 includes an image 4401 and a depth of field (dof) portion 4402. The depth of field portion 4402 includes a depth of field identifier 4403, which is "dof", for identifying that the presented controllable slider is for depth of field user input, a controllable depth of field slider 4404 for controlling a depth of field setting, a depth of field position indicator 4406 for indicating the depth of field setting. A user slides a finger along the depth of field slider 4404 to change the depth of field setting. Depth of field numerical indicator value 4408, located above the current depth of field indicator 4406, indicates the current setting of the depth of field when the depth of field indicator 4406 is not moving. In various embodiments, the depth of field numerical indicator value is not presented while the depth of field position indicator 4406 is in motion. In one exemplary embodiment, the depth of field numerical value is greater than or equal to 1 and less than or equal to 10, with a value of 1 requesting the lowest setting for depth of field and a value of 10 representing the highest setting for depth of field. In the example of FIG. 44, the depth of field setting is 10. FIG. 44 may be a representation of the result of user input from the starting point of the example of FIG. 43, in which case the user has changed depth of field setting from 1 to 10.

With the display as shown in FIG. 44, if the user slides a finger from right to left along depth of field slider 4404, the depth of field setting can be decreased.

FIG. 45 is a drawing an exemplary touch screen display view 4500 of a camera device, including multiple optical chains, which may be, and sometimes is, presented to a user of the camera device, e.g., to allow a user to input a depth of field setting, in accordance with an exemplary embodiment. Display view 4500 includes an image 4501 and a depth of field (dof) portion 4502. The depth of field portion 4502 includes a depth of field identifier 4503, which is "dof", for identifying that the presented controllable slider is for depth of field user input, a controllable depth of field slider 4504 for controlling a depth of field setting, a depth of field position indicator 4506 for indicating the depth of field setting. A user slides a finger along the depth of field slider 4504 to change the depth of field setting. Depth of field numerical indicator value 4508, located above the current depth of field indicator 4506, indicates the current setting of the depth of field when the depth of field indicator 4506 is not moving. In various embodiments, the depth of field numerical indicator value is not presented while the depth of field position indicator 4406 is in motion. In one exemplary embodiment, the depth of field numerical value is greater than or equal to 1 and less than or equal to 10, with a value of 1 requesting the lowest setting for depth of field and a value of 10 representing the highest setting for depth of field. In the example of FIG. 45, the depth of field setting is 8.5, which represents an intermediate point in the selectable range. FIG. 45 may be a representation of the result of user input from the starting point of the example of FIG. 45, in which case the user has changed depth of field setting from 10 to 8.5.

With the display as shown in FIG. 45, if the user slides a finger from right to left along depth of field slider 4504, the depth of field setting can be decreased; and if the user slides a finger from left to right along depth of field slider 4504, the depth of field setting can be increased. It may be observed that the small dots on the path over which the depth of field position indicator doe 4506 can be moved are brighter on the side 4510 of the slider path matching the direction in which the slider was most recently moved than on the other side 4512 of the slider path away from which the slider was most recently moved. Thus the small dot brightness difference between sides 4510 and 4512 of slider 4504 is used to indicate that previous depth of field setting was a higher value than 8.5, e.g., was 10.

In some embodiments, the presented image (4301, 4401, 4501) of FIGS. 43, 44, and 45 is indicative of the current depth of field setting and a presented image changes in response to user input changes in depth of field setting. In other embodiments, a presented image is not changed to reflect a user input change in depth of field setting.

Figure 46:
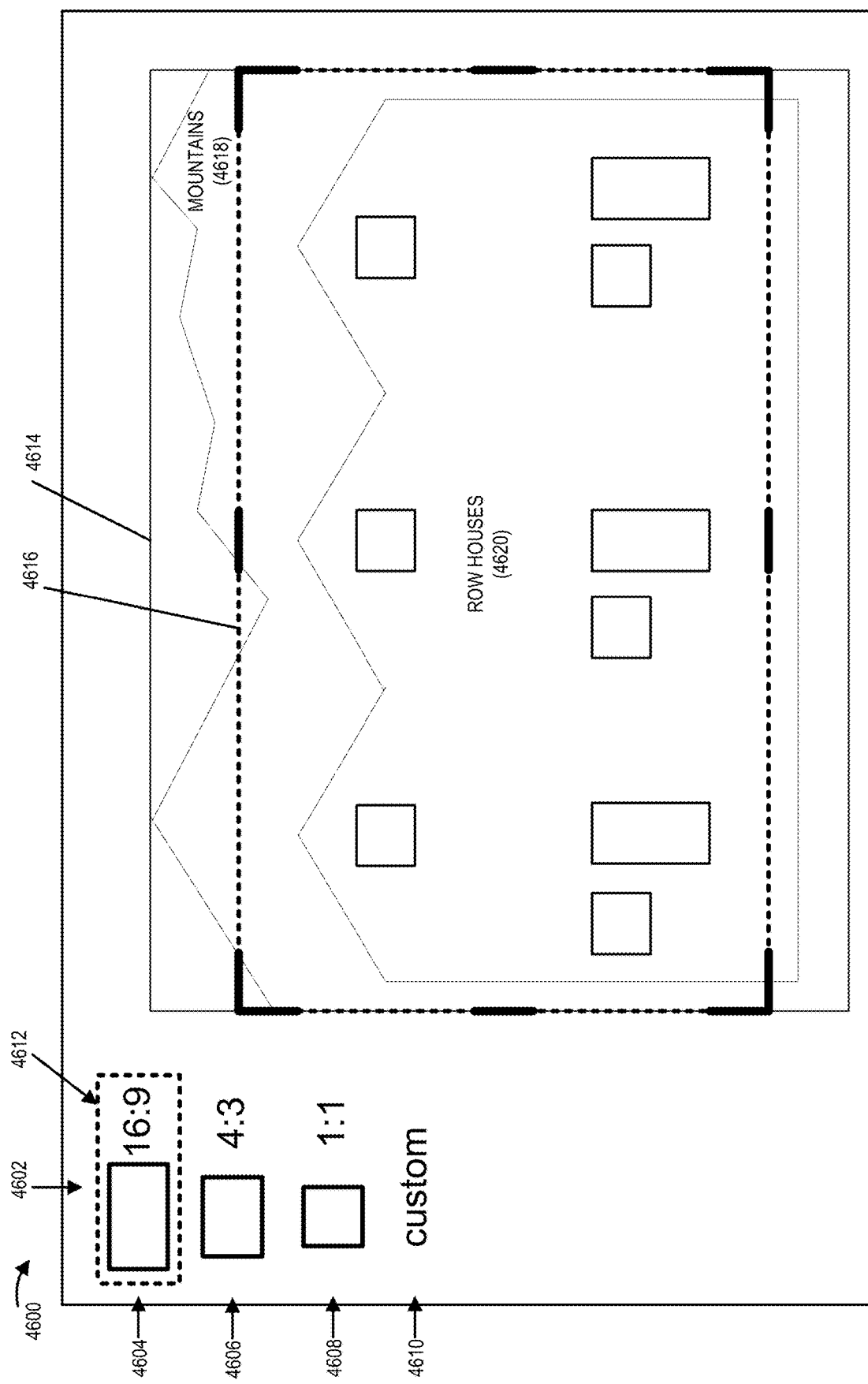
FIG. 46 is a drawing an exemplary touch screen display view of a camera device, including multiple optical chains, which may be, and sometimes is, presented to a user of the camera device, e.g., to allow a user to select an aspect ratio setting, in accordance with an exemplary embodiment.

FIG. 46 is a drawing an exemplary touch screen display view 4600 of a camera device, including multiple optical chains, which may be, and sometimes is, presented to a user of the camera device, e.g., to allow a user to select an aspect ratio setting, in accordance with an exemplary embodiment. Exemplary display view 4600 includes a captured image 4614, e.g., corresponding to a maximum image capture area, e.g., based on the aspect ratio corresponding to the image sensor. Captured image 4614 is an uncropped image. In this example consider that the image sensor corresponds to a 4:3 aspect ratio, and thus captured image 4614 has a 4:4 aspect ratio. Captured image 4614 includes mountains 4618 and row houses 4620. Display view 4606 further includes an aspect ratio user selection portion 4602 for identifying the possible user selectable aspect ratios and for receiving user input. In this example, a user can select between a 16:9 aspect ratio 4604, as indicated by rectangular box with aspect ratio 16:9 and the text "16:9", a 4:3 aspect ratio 4606, as indicated by rectangular box with aspect ratio 4:3 and the text "4:3" a 1:1 aspect ratio 4608, as indicated by a square box and the text "1:1" and a custom aspect ratio 4610, as indicated by the text "custom". By touching or tapping on one of the aspect ratio indicators 4604, 4606, 4608 or 4610, the user selects an aspect ratio. If a user selects the custom aspect ratio, the user can set a non-standard aspect ratio, e.g., 15:9, 4.5: 3, etc. In some embodiments, the user numerically enters the desired custom aspect ratio. In some embodiments, the user moves a cropping box to set the custom aspect ratio.

After a user has selected an aspect ratio, the selected aspect ratio is highlighted on the screen to indicate that it has been selected. Dashed box 4612 indicates that the user has selected an aspect ratio of 16:9. In response to the user selection of the 16:9 aspect ratio option, cropping box 4616 is placed over the image 4616 to indicate the image that will be visible in the 16:9 aspect ratio. In some embodiments, after user selection of aspect ratio, the area outside the cropping box 4616 is darkened or shaded to reduce visibility.

In some embodiments, a cropping box is automatically placed at a central location within the overall image, e.g., with the same amount being cropped above and below and/or the same amount being cropped left and right.

In some embodiments, in addition to selecting an aspect ratio, a user can select a location of the cropping box over the overall uncropped image. For example, the user may move the cropping box to a desired area and information indicating the user selected location of the cropping box is stored in addition to the selected aspect ratio. For example, in FIG. 46 the user may select to move the cropping box to crop off less area at the bottom of the image and to crop off more area at the top of the image, e.g., in order to capture an image including complete row houses 4620, e.g., including the basement potion which would otherwise be missed if a centralized 16:9 aspect ratio cropping was used.

Figure 47:
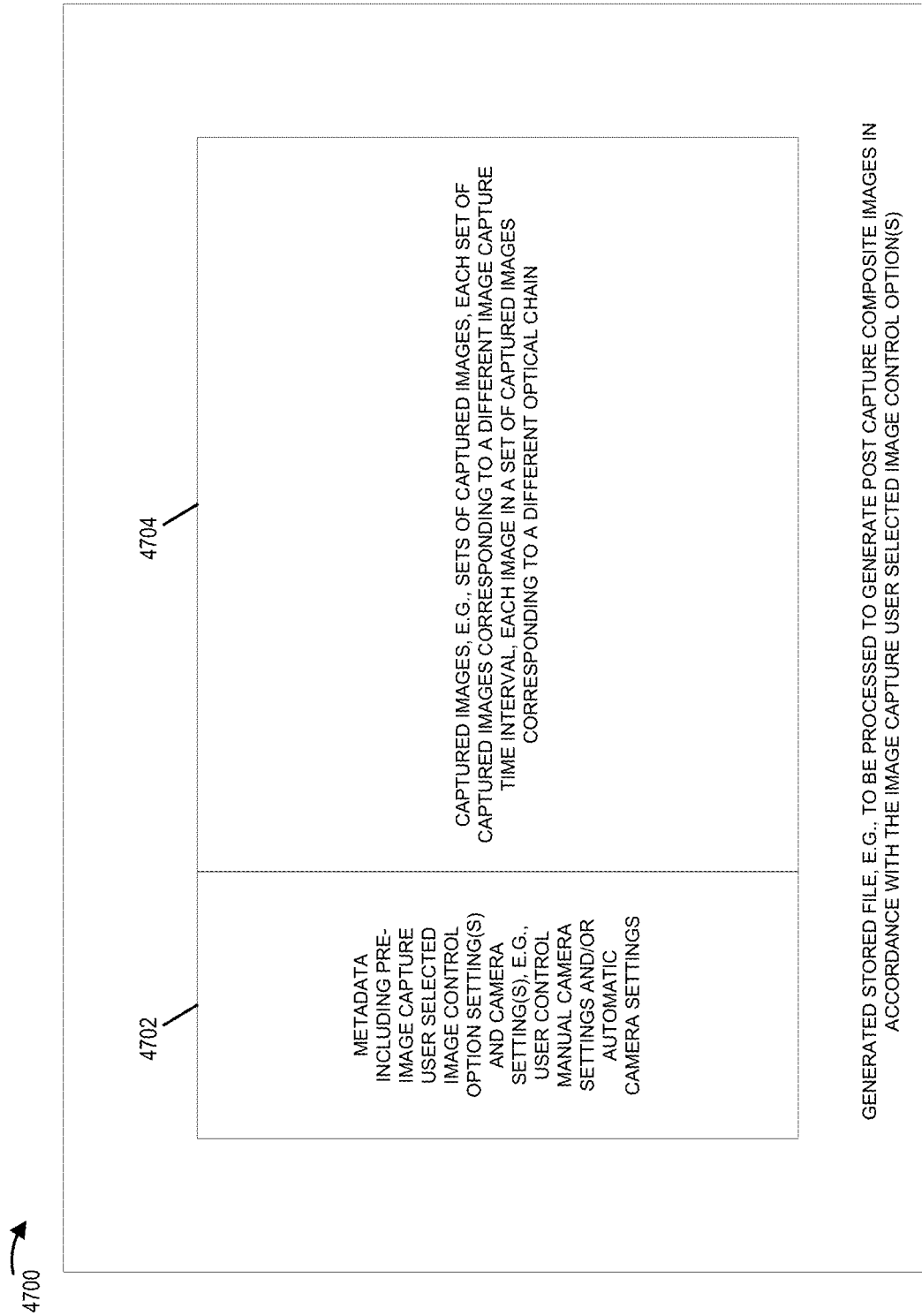
FIG. 47 is a drawing of an exemplary generated stored file in accordance with an exemplary embodiment.

FIG. 47 is a drawing of an exemplary generated stored file 4700 in accordance with an exemplary embodiment. File 4700 includes a metadata portion 4702 and a captured images portion 4704. The Metadata 4702 includes pre-image capture user selected image control option setting(s) and camera setting(s), e.g., user control manual camera settings and/or automatic camera settings. In various embodiments, at least some of the user selected image control option settings have no impact on image capture, e.g., with the setting values being used for post capture image processing, e.g., in generating composite images. A user control manual camera setting is set by the user prior to image capture. An automatic camera setting can be, and sometimes is, changed by the camera without user intervention, e.g., in response to a detected condition, e.g., a flash may be automatically turned on in response to a detected low light condition. Captured images 4704 includes, e.g., sets of captured images, each set of captured images corresponding to a different image capture time interval, each image in a set of captured images corresponding to a different optical chain in the camera device.

In some embodiments, generated stored file 4700 is processed by the camera device which captured the images, e.g., generating composite images. In some embodiments, generated stored file 4700 is processed by a post capture image processing system external to the camera device which captured the images.

FIG. 48 is a drawing 4800 of an exemplary generated stored file 4700' including user selected information, e.g., user selected image control options settings and camera settings, and captured images in accordance with an exemplary embodiment. Metadata portion 4702' includes frame number information, represented by column 4802, depth of field setting (DOF) setting information, represented by column 4804, aspect ratio setting information, represented by column 4806, f-setting information, represented by column 4808, ISO setting information, represented by column 4810, flash status information, represented by column 4812, exposure duration information, represented by column 4813, date tag information, represented by column 4814, and time tag information, represented by column 4816. Captured images portion 4704' includes sets of captured images, each set of captured images corresponding to a different frame number, each image in a set of captured being captured by a different optical chain. A captured image includes a set of pixel values representing the image. Column 4818 includes images captured by optical chain 1. Column 4820 includes images captured by optical chain 2. Column 4822 includes images captured by optical chain 3. Column 4824 includes images captured by optical chain 4. Column 4826 includes images captured by optical chain 5. Column 4828 includes images captured by optical chain 6. Column 4830 includes images captured by optical chain 7.

In the example, of FIG. 48, the camera device receives user input: indicating a setting for depth of field=7, indicating a setting for aspect ratio=16:9, indicating a setting for F setting=F/5.6, indicating a setting for ISO=400, and indicating a flash setting=OFF, and stores the received user preference information in memory prior to capturing the images of frame 1. Some of the received user input settings, e.g., DOF setting and aspect ratio setting, do not affect image capture, but are used in post capture image processing, e.g., in generating combined images in accordance with the user preferences. Some of the received user input camera settings are used to affect image capture. Some of the received user input setting are used as part of image capture and are also used as part of post image capture processing. In this example, exposure duration is calculated by the camera device based on the received user input of other parameters.

In the example of FIG. 48, three frames are captured before the user decides to make a change to a user selected camera setting. During an image capture time interval, corresponding to a frame, seven images are captured corresponding to the seven optical chains of the camera device. The captured images of the frame are stored in the file 4700' along with corresponding metadata, as represented by a row. For example, the first row corresponds to frame number 1 information; the second row corresponds to frame number 2 information; and the third row corresponds to frame number 3 information.

In the example, of FIG. 48, after frame 3 image capture, the user decides to change the user selectable image control option setting for depth of field and the camera device receives input indicating that the new depth of field setting is 3, and stored the received input in memory of the camera device, the new value of depth of field to be included in metadata in subsequent frames. In this example, a set of images are captured for frame 4, and the captured set of images for frame 4 and metadata for frame 4 are stored in file 4700'; a set of images are captured for frame 5, and the captured set of images for frame 5 and metadata for frame 5 are stored in file 4700'.

In the example, of FIG. 48, after frame 5 image capture, the user decides to change the user selectable image control option setting for depth of field, and the camera device receives input indicating that the new depth of field setting is 6 and stores the received input in memory of the camera device, the new value of depth of field to be included in metadata in subsequent frames. The user also decides to change the user selectable image control option setting for aspect ratio, and the camera device receives input indicating that the new aspect ratio setting is 1:1 and stores the received input in memory of the camera device, the new value of the aspect ratio setting is to be included in metadata in subsequent frames. In this example, a set of images are captured for frame 6 and the captured set of images for frame 6 and metadata for frame 6 are stored in file 4700'.

Continuing with the example of FIG. 48, after frame 6 image capture, the user decides to change the user selectable image control option setting for f-setting, and the camera device receives input indicating that the new f-setting setting is f/8 and stores the received input in memory of the camera device, the new value of the f-setting to be included in metadata in subsequent frames. The user also decides to change the user selectable ISO setting, and the camera device receives input indicating that the new ISO setting is 800 and stores the received input in memory of the camera device, the new value of the ISO setting is to be included in metadata in subsequent frames. The user also decides to change the flash status setting, and the camera device receives input indicating that the new flash setting is ON and stores the received input in memory of the camera device, the new value of the flash setting is to be included in metadata in subsequent frames. Received user input setting changes cause the computed value for exposure duration to change from a setting of 5 to a setting of 2, e.g., indicating a shorter exposure duration. In this example, a set of images are captured for frame 7 and the captured set of images for frame 7 and metadata for frame 7 are stored in file 4700'.

Continuing with the example of FIG. 48, after frame 7 image capture, the user decides to change the user selectable control option setting for flash, and the camera device receives input indicating that the new flash status setting OFF and stores the received input in memory of the camera device, the new value of the flash status setting to be included in metadata in subsequent frames. Received user input setting changes cause the computed value for exposure duration to change from a setting of 2 to a setting of 6, e.g., indicating a longer exposure duration. In this example, a set of images are captured for frame 8 and the captured set of images for frame 8 and metadata for frame 8 are stored in file 4700'.

Figure 49A:
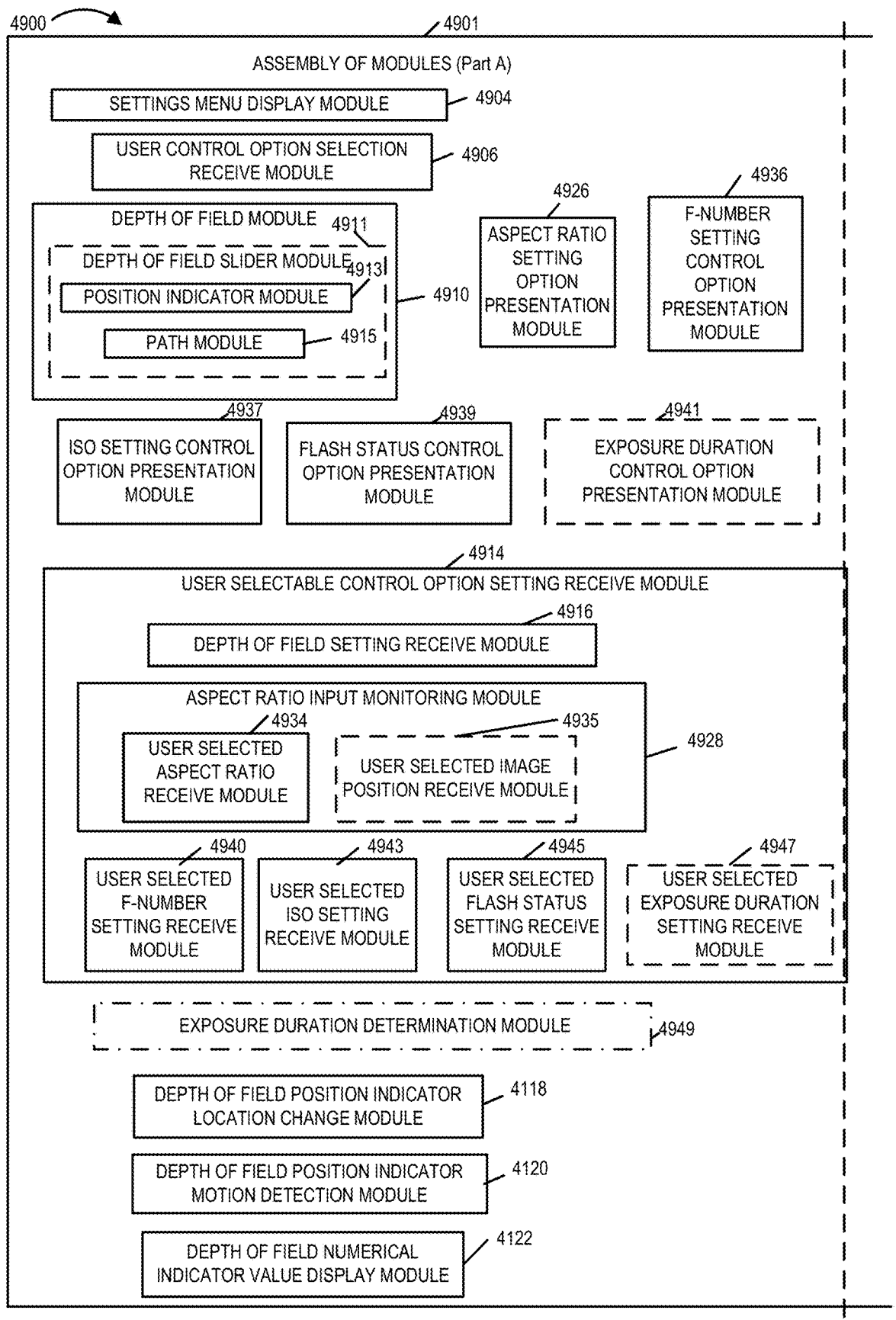
FIG. 49A is a drawing of a first part of an assembly of modules which may be included in a camera device including multiple optical chains in accordance with an exemplary embodiment.
Figures 49, 49B:
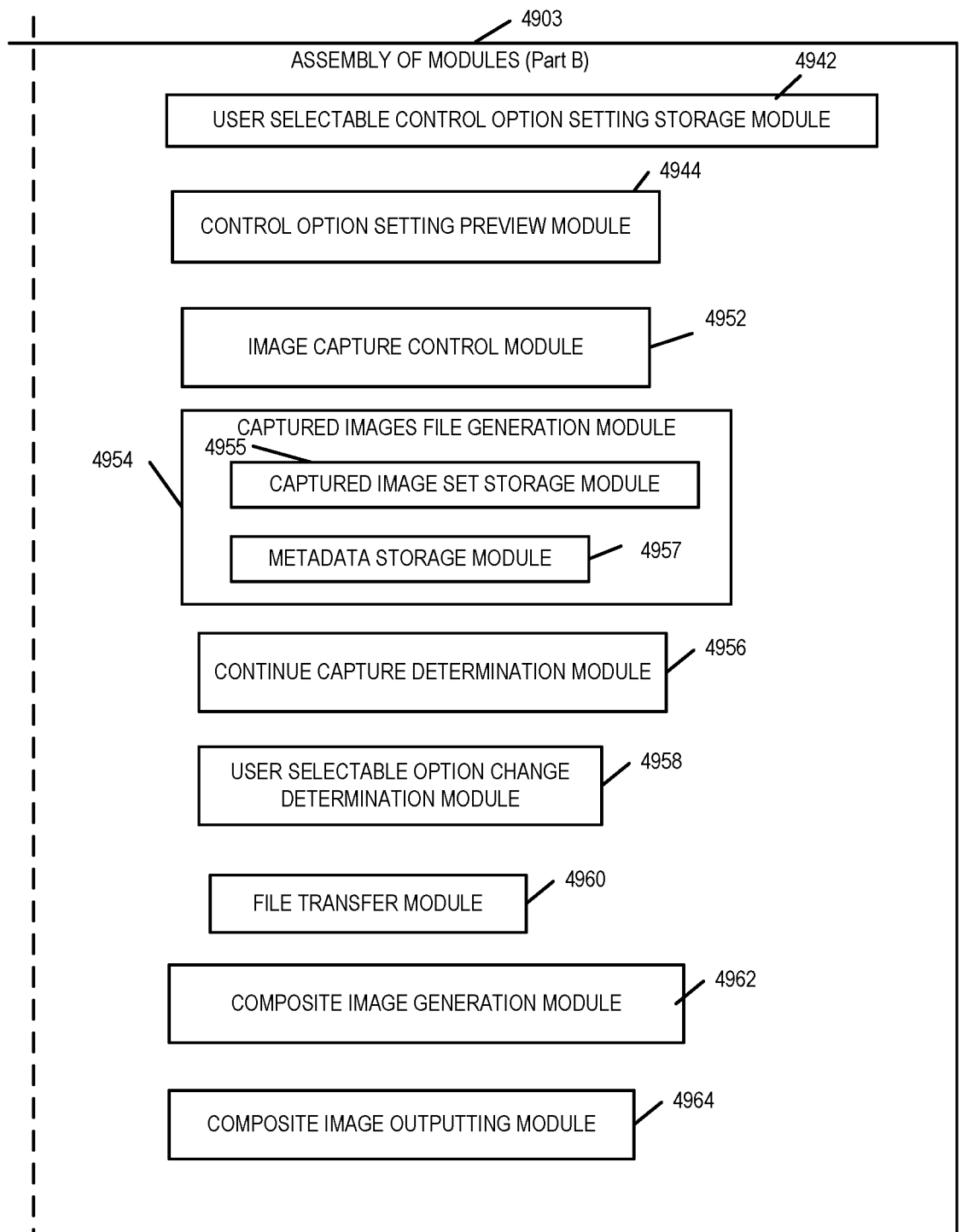
FIG. 49B is a drawing of a second part of an assembly of modules which may be included in a camera device including multiple optical chains in accordance with an exemplary embodiment.
FIG. 49 comprises the combination of FIG. 49A and FIG. 49B.

FIG. 49, comprising the combination of FIG. 49A and FIG. 49B, is an assembly of module 4900, including Part A 4901 and Part B 4903, which may be included in a camera device including multiple optical chains in accordance with an exemplary embodiment. In some embodiments, some or all of the modules in assembly of modules 4900 are included in a camera device and some of the modules, e.g., modules 4962 and 4964, of assembly of modules 4900 are included in a post capture image processing system, e.g., a computer system external to the camera device which captures the images being processed. Assembly of modules 4900 implements the steps of flowchart 4100 of FIG. 1 and/or steps and/or features describes with respect to any of the FIGS. 42-48.

Assembly of modules 4900, which may be included in a camera device implemented in accordance with the present invention, e.g., camera 100 of FIG. 1. Assembly of modules 4900 may implement steps of a method, e.g., steps of the method of flowchart 4100 of FIG. 41. In some embodiments, assembly of modules 4900 is an assembly of circuits, which may be coupled together. In one exemplary embodiment, assembly of modules 4900 is assembly of hardware modules 180 of camera 100 of FIG. 1. In some embodiments, the assembly of module 4900 is an assembly of software modules. In one exemplary embodiment, assembly of modules 4900 is assembly of modules 118 of memory 108 of camera 100 of FIG. 1.

Assembly of modules 4900 which can, and in some embodiments is, used in the camera device 100 illustrated in FIG. 1 or another camera device including a plurality of camera module, e.g., optical chains, e.g., another camera device including a plurality of camera modules shown or described with respect to any of FIG. 1-50. The modules in the assembly of modules 4900 can, and in some embodiments are, implemented fully in hardware within the processor 110, e.g., as individual circuits. The modules in the assembly of modules 4900 can, and in some embodiments are, implemented fully in hardware within the assembly of modules 180, e.g., as individual circuits corresponding to the different modules. In other embodiments some of the modules are implemented, e.g., as circuits, within the processor 110 with other modules being implemented, e.g., as circuits within assembly of modules 180, external to and coupled to the processor. As should be appreciated the level of integration of modules on the processor and/or with some modules being external to the processor may be one of design choice.

Alternatively, rather than being implemented as circuits, all or some of the modules in assembly of modules 4900 may be implemented in software and stored in the memory 108 of the camera device 100, with the modules controlling operation of camera 100 to implement the functions corresponding to the modules when the modules are executed by a processor, e.g., processor 110. In some such embodiments, the assembly of modules 4900 is included in the memory 108 as assembly of modules 118. In still other embodiments, various modules in assembly of modules 4900 are implemented as a combination of hardware and software, e.g., with another circuit external to the processor providing input to the processor 110 which then under software control operates to perform a portion of a module's function. While shown in the FIG. 1 embodiment as a single processor, e.g., computer, it should be appreciated that the processor 110 may be implemented as one or more processors, e.g., computers.

When implemented in software the modules include code, which when executed by the processor 110, configure the processor 110 to implement the function corresponding to the module. In embodiments where the assembly of modules 4900 is stored in the memory 118, the memory 118 is a computer program product comprising a computer readable medium comprising code, e.g., individual code for each module, for causing at least one computer, e.g., processor 110, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 49 control and/or configure the camera device 100 or elements therein such as the processor 110, to perform functions of the corresponding steps illustrated in the method flowchart 4100 of FIG. 41. Thus the assembly of modules 4900 includes various modules that perform functions of the corresponding steps of the flowchart 4100.

Assembly of modules 4900 includes a settings menu display module 4904, a user control option selection receive module 4906, and a depth of field module 4910. Settings menu display module 4904 is configured to display, e.g., on a touch screen display included in the camera device, a setting menu from which a user can select a user control option, e.g., the user can select one of at least a depth of field control option, an aspect ratio control option, and/or an F-number setting control option. Depth of field module 4910 is configured to present the user of the camera device a user controllable depth of field slider or other input option for controlling a depth of field setting. Depth of field module 4910, in some embodiments, includes a depth of field slider module 4911. Depth of field slider module 4910 is configured to generate and present the user of the camera device with a depth of field slider, the depth of field slider presenting the user with a display indicating a current depth of field setting and providing an input interface for changing the depth of field setting, e.g. by sliding a finger across the slider. In various embodiments, the depth of field slider further displays information indicating the direction of change from a previous depth of field setting to the currently displayed depth of field setting and information indicating the direction or directions in which the slider can be moved from its current setting. Depth of field slider module 4911 includes a position indicator module 4913 and a path module 4915. Position indicator module 4913 is configured to generate and display a depth of field position indicator, e.g., a large bright white dot, on the depth of field slider to indicate the current setting of the depth of field. Path module 4915 is configured to generate and display information indicates possible path(s) of the depth of field position indicator, e.g., via small dots on one or both sides of the depth of field indicator. In one embodiment, if there are some small dots on a side of the depth of field position indicator then the position indicator may be moved in that direction; and if there are no small dots on a side of the depth of field position indicator, the depth of field position indicator is at an extreme setting, e.g., 1 or 10, and can not be moved any farther in that direction Path module 4915 is configured to generate and display information indicating a previous path direction of the depth of field position indicator, e.g., based on the relative brightness of dots on each side of the depth of field position indicator. For example, in one embodiment, small bright dots are on the side from which the depth of field position indicator was previously moved from, and a set of decreasing brightness small dots with decreasing dot spacing are on the other side. Thus if the user wants to continue to change the depth of field setting in the same direction as the last change, the user slides a finger in the direction toward the decreasing brightness small dots.

Assembly of modules 4900 further includes an aspect ratio setting option presentation module 4928, an F-number setting control option presentation module 4936, an ISO setting control option presentation module 4937, a flash status control option presentation module 4939, and in some embodiments, an exposure duration control option presentation module 4941. Aspect ratio setting option presentation module 4937 is configured to generate and present the user of the camera device with an input option to set aspect ratio. In one embodiment, the user is displayed with a plurality of user selectable aspect ratios, e.g., using dimensionally proportionally symbols and/or text corresponding to the aspect ratio options which may be selected, e.g., by touching the symbol or text. F-number setting control option presentation module 4936 is configured to generate and present the user of the camera device an F-number setting control input option, e.g. a menu for selecting one of a plurality of F-settings. ISO setting control option presentation module 4937 is configured to generate and present the user of the camera device an ISO setting control input option, e.g. a menu for selecting one of a plurality of ISO settings. Flash status control option presentation module 4939 is configured to generate and present the user of the camera device an input option for allowing the user to manually set the flash to an ON state or to an OFF state. Exposure duration control option presentation module 4941 is configured to generate and present the user of the camera device an exposure control input option, e.g. a menu for allowing a user to select one of a plurality of predetermined exposure durations.

Assembly of modules 4900 further includes a user selectable control option setting receive module 4914. User selectable control option setting receive module is configured to receive, at the camera device, user input indicating a user selected control option setting, e.g., a user selected image control option setting and/or a user selected camera control option setting. In some embodiments, some received user selected control option setting are used to control post image capture processing but not to control camera image capture operations. In some embodiments, some received user selected control option settings are used to control camera image capture operations. In some embodiments, some received user selected control option setting as used for both image capture control and post-capture processing operations.

User selectable control option setting receive module 4914 includes a depth of field setting receive module 4916, an aspect ratio input monitoring module 4928, a user selected F-number setting receive module 4940, a user selected ISO setting receive module 4943, a user selected flash status setting receive module 4945, and, in some embodiments, a user selected exposure duration setting receive module 4947. Aspect ratio input monitoring module 4928 includes a user selected aspect ratio receive module 4934 and, in some embodiments, a user selected image position receive module 4935.

Depth of field setting receive module 4916 is configured to receive user input to change the depth of field setting from the current depth of field setting. Aspect ratio input monitoring module 4928 is configured to monitor for user input indicating a selected aspect ratio. User selected aspect ratio receive module 4934 is configured to receive at the camera device user input indicating the selected aspect ratio, e.g., one or a 16:9 aspect ratio, a 4:3 aspect ratio, a 1:1 aspect ratio, or a custom aspect ratio. Optional user selected image position receive module 4935, included in some embodiments, is configured to receive user input indicating a user desired image position of a cropped image corresponding to the selected aspect ratio. User selected F-number setting receive module 4940 is configured to receive user input indicating the user selected F-number setting, e.g., one of: f/5.6, f/8, f/11, f/16, f/22, f/32, f/64. User selected ISO setting receive module 4943 is configured to receive user input indicating the user selected ISO setting, e.g., one of: ISO 100, ISO 200, ISO 400, ISO 800, ISO 1600, ISO 3200. User selected flash status setting receive module 4945 is configured to receive user input indicating whether the user desires to have the flash on for image captures or to have the flash off during image captures. User selected exposure duration setting module 4947, included in some embodiments, is configured to receive user input indicating a user selected exposure duration setting.

In some embodiments, assembly of modules 4900 includes an exposure determination module 4949 configured to determine an exposure determination based on one or more received user selected control settings, e.g., including an user selected ISO setting.

Assembly of modules 4900 further includes a depth of field position indicator location change module 4118, a depth of field position indicator motion detection module 4120, and a depth of field numerical indicator value display module 4122. Depth of field position indicator location change module 4118 is configured to change the location of the depth of field indicator, e.g., large bright white dot on the depth of field slider, in response to received user input, e.g., in response to a detected swipe motion along the slider. Depth of field position indicator location change module 4118 is configured to determine if the depth of field position indicator has stopped moving and to control operation as a function of the determination, e.g., activate the depth of field numerical indicator value display module 4122. Depth of field numerical indicator value display module 4122 is configured to display a numerical value indicating a new depth of field setting when the depth of field position indicator, e.g. large bright dot, is moved to a new location on the depth of field slider, said numerical depth of field value being displayed over the depth of field indicator. In various embodiments, the depth of field numerical value is not displayed while the depth of field indicator is in motion.

Assembly of modules 4900 further includes a user selectable control option setting storage module 4942, a control option setting preview module 4944, an image capture control module 4952, and a captured images file generation module 4954. Captured images file generation module 4954 includes a captured image set storage module 4955 and a metadata storage module 4957. User selectable control option setting storage module 4942 is configured to store a received user selected control option setting, e.g., a received user selected image control option setting and/or a received user selected camera option setting, in memory of the camera device. Control option setting preview module 4944 is configured to display to the user an image, e.g., a preview image showing the effect of the received user selected image control option setting. For example, a preview image with the user selected aspect ratio is displayed to the user prior to the camera capturing a set of image which are subsequently used to generate a composite image. Image capture control module 4952 is configured to control the camera device, e.g. control the optical chains of the camera device, to capture images after receipt of one or more user selectable control option setting(s). The user selectable control option settings include image control option settings and/or camera device control option settings. Image capture control module 4952 is configured to control the camera device to capture a set of images during an image capture time interval, each image in the set of images corresponding to a different one of the optical chains in the camera device. Captured images file generation module 4954 is configured to stored in memory one or more captured image, e.g., corresponding to an image capture time interval, in a file with metadata including received user selectable control option settings(s) and camera setting values. FIG. 48 illustrates an exemplary captured images file 4700' which may be generated, e.g., row corresponding to one storage iteration corresponding to an image capture time interval. Captured image set storage module 4955 is configured to store in the file a set of captured images corresponding to an image capture time interval, e.g. one captured image per optical chain. Metadata storage module 4959 is configured to store a set of metadata, including previously received user selected control option setting(s), the set of metadata corresponding to the set of captured images, corresponding to the image capture time interval.

Assembly of modules further includes a continue capture determination module 4956, a user selectable option change determination module 4958, and a file transfer module 4960. Continue capture determination module 4956 is configured to determine if the user of the camera device desires to continue capturing images or exit image capture and proceed to file transfer and/or file processing, and to control operation as a function of the determination. User selectable option change determination module 4958 is configured to determine if the user of the camera device desires to make any changes to the user selectable control option settings, e.g. image control option settings and/or camera control option settings for subsequent image capture and controls operation as a function of the determination, e.g., presents a menu to allow a user selectable control option to be changed when module 4958 detects that the user desires to make a setting change. File transfer module 4960 is configured to transfer the stored file including metadata and captured images, e.g., file including one or more captured images, user selected image control option(s) and user selected camera device settings, to a post capture image processing system, e.g., a computer system external to the camera device. The file transfer is by wired and/or wireless communications, e.g., via a wireless transmitter included in the camera device to a base station, e.g., a WiFi base station coupled, e.g. via the Internet, to an image processing computer system. When file transfer module 4960 is included in the camera device, the file transfer module 4960 is configured to control a transmitter in the camera device to transmit the stored file including metadata and captured images, e.g., file including one or more captured images, user selected image control option(s) and user selected camera device settings to a post capture image processing system, e.g., a computer system external to the camera device, or to a device which is coupled to a post capture image processing system. When file transfer module 4960 is included in an image processing computer system, the file transfer module 4960 is configured to control a receiver in the image processing computer system to receive the stored file including metadata and captured images, e.g., file including one or more captured images, user selected image control option(s) and user selected camera device settings, from a camera device which captured the images in the file or from another device coupled to the camera device.

Assembly of modules 4900 further includes a composite image generation module 4962 and a composite image outputting module 4964. Composite image generation module 4962 is configured to generate from the images captured by multiple optical chains, e.g., during an image capture time interval, a composite image in accordance with the stored user selectable image control option setting(s). A different composite image is generated for each image capture time interval. Composite image outputting module 4964 is configured to output a generated composite image to a display, e.g., a display included in the camera device or image processing system which generated the composite image, or to transmit said generated composite image to another device, e.g., via a wired or wireless transmitter included in the device which generated the composite image.

Figure 50:
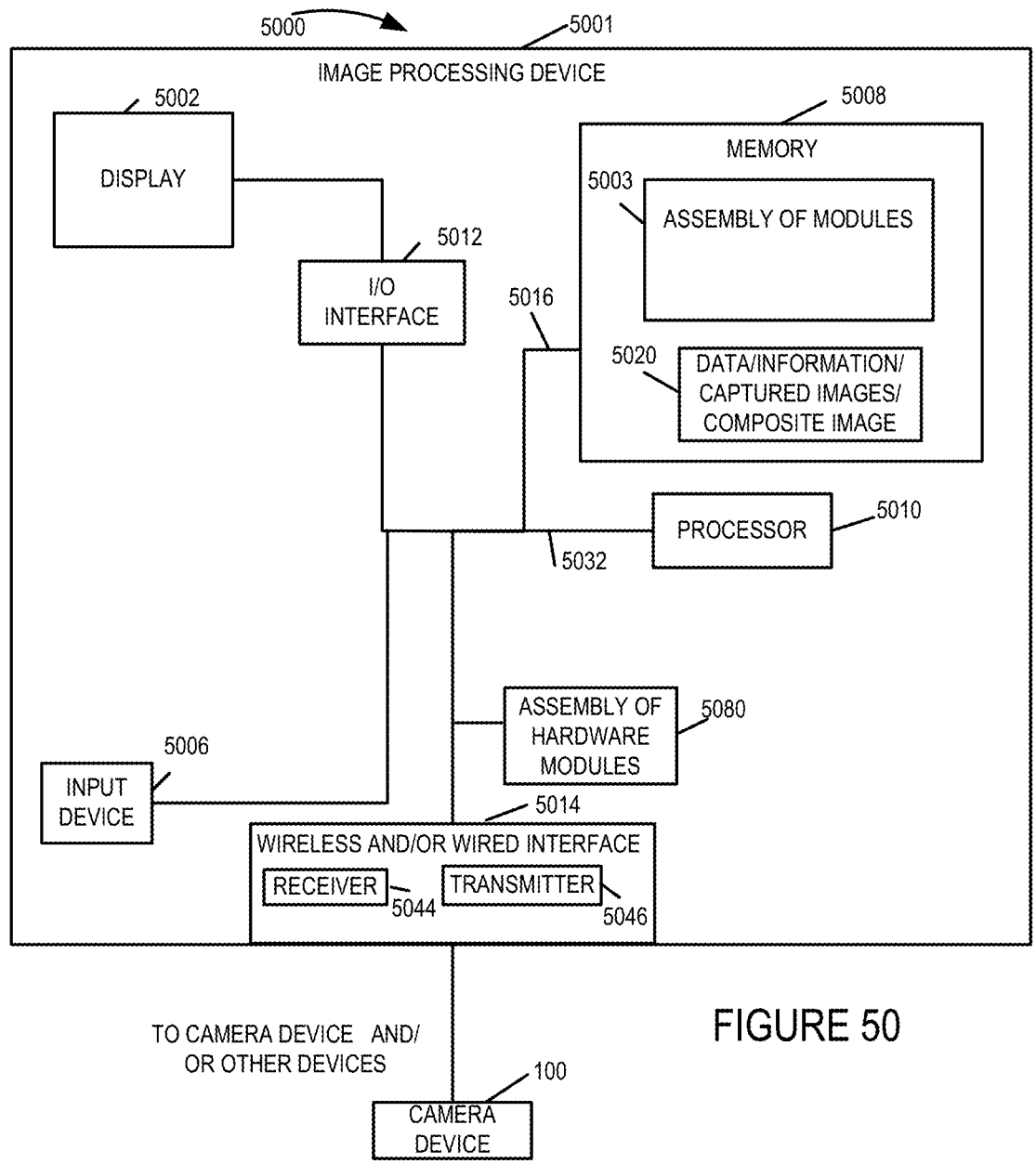
FIG. 50 illustrates an exemplary system including a camera device and an image processing system in accordance with an exemplary embodiment.

FIG. 50 illustrates an exemplary system 5000 including a camera device 100 and an image processing system 5001. Camera device 100 may be the same or similar to the camera device of FIG. 1 which can be used to receive user input indicating user control setting(s), capture images using a set of camera modules, e.g., optical chains, generate files including sets of captured images and corresponding metadata including user selected control setting(s), transfer generated files to other devices, and, in some embodiments, generate composite images, in accordance with the invention. Image processing system 5001 which can receive generated files including sets of captured images and corresponding metadata included user control option setting(s) and process the received set of images to generate composite images in accordance with user control option setting(s), e.g., a pre-capture user selected depth of field setting and a pre-capture user selected aspect ratio setting. The image processing device 5001 can be a computer system which is coupled via a wire or wirelessly to the camera device 100. The image processing system 5001 includes a display 5002 on which one or more images, e.g., generated composite images or received captured images, can be, and sometimes are, displayed. The display 5002 is coupled via an I/O interface 5012 and bus 5016 to memory 5008, processor 5010, assembly of hardware modules 5080, input device 5006 and wireless and/or wired interface 5014 through which data and information can be received and/or transmitted. To support receipt of files including captured sets of images and corresponding metadata and/or other information the interface 5014 includes a receiver 5044 To support the outputting of data and information, e.g. the outputting of a generated composite image to another device, the interface 5014 includes a transmitter 5046.

The memory 5008 includes an assembly of modules 5003 and data and/or information 5020 which can include a received file including sets of captured images and corresponding metadata, captured images, metadata, and/or one or more composite images which may be generated in accordance with the invention.

The assembly of modules 5003 may include some of the modules of 4900 shown in FIG. 49, e.g., modules 4960, 4962 and 4964, with the modules being used, when executed by processor 5010 to control the operation of the image processing device 5001. When implemented in hardware the assembly of hardware module 5080 may include some of the modules of assembly of modules 4900, e.g., modules 4960, 4962 and 4964, but with the modules being implemented fully in hardware in some embodiments. Depending on the embodiment some modules may be implemented in hardware and other modules in software.

In some embodiment the camera 100 includes multiple camera modules, e.g., camera modules of a first focal length, a second focal length and a third focal length with each of the camera modules of the different focal lengths capturing different size scene areas. In some embodiments the receiving of user selected control setting(s), image capture, file generation, composite image generation and composite image outputting method is implemented fully in the camera 100, e.g., a handheld camera in which case image processing device 5001 need not be used.

In other embodiments the methods are implemented using the system 5000 which includes the combination of the image processing device 5001 and camera device 100.

The techniques of the present invention may be implemented using software, hardware and/or a combination of software and hardware. The present invention is directed to apparatus, e.g., dedicated camera devices, cell phones, and/or other devices which include one or more cameras or camera modules. It is also directed to methods, e.g., method of controlling and/or operating cameras, devices including a camera, camera modules, etc. in accordance with the present invention. The present invention is also directed to machine readable medium, e.g., ROM, RAM, CDs, hard discs, etc., which include machine readable instructions for controlling a machine to implement one or more steps in accordance with the present invention.

In various embodiments devices described herein are implemented using one or more modules to perform the steps corresponding to one or more methods of the present invention, for example, control of image capture and/or combining of images. Thus, in some embodiments various features of the present invention are implemented using modules. Such modules may be implemented using software, hardware or a combination of software and hardware.

In the case of hardware implementations embodiments implemented in hardware may use circuits as part of or all of a module. Alternatively, modules may be implemented in hardware as a combination of one or more circuits and optical elements such as lenses and/or other hardware elements. Thus in at least some embodiments one or more modules, and sometimes all modules, are implemented completely in hardware. Many of the above described methods or method steps can be implemented using machine executable instructions, such as software, included in a machine readable medium such as a memory device, e.g., RAM, floppy disk, etc. to control a machine, e.g., a camera device or general purpose computer with or without additional hardware, to implement all or portions of the above described methods, e.g., in one or more nodes. Accordingly, among other things, the present invention is directed to a machine-readable medium including machine executable instructions for causing or controlling a machine, e.g., processor and associated hardware, to perform e.g., one or more, or all of the steps of the above-described method(s).

While described in the context of cameras, at least some of the methods and apparatus of the present invention, are applicable to a wide range of image captures systems including tablet and cell phone devices which support or provide image capture functionality.

Images captured by the camera devices described herein may be real world images useful for documenting conditions on a construction site, at an accident and/or for preserving personal information whether be information about the condition of a house or vehicle.

Captured images and/or composite images may be and sometimes are displayed on the camera device or sent to a printer for printing as a photo or permanent document which can be maintained in a file as part of a personal or business record.

Numerous additional variations on the methods and apparatus of the present invention described above will be apparent to those skilled in the art in view of the above description of the invention. Such variations are to be considered within the scope of the invention. In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional variations and combinations are possible while remaining within the scope of the invention. Cameras implemented in some embodiments have optical chains which do not extend out beyond the front of the camera during use and which are implemented as portable handheld cameras or devices including cameras. Such devices may and in some embodiments do have a relatively flat front with the outermost lens or clear, e.g., (flat glass or plastic) optical chain covering used to cover the aperture at the front of an optical chain being fixed. However, in other embodiments lenses and/or other elements of an optical chain may, and sometimes do, extend beyond the face of the camera device.

In various embodiments the camera devices are implemented as digital cameras, video cameras, notebook computers, personal data assistants (PDAs), or other portable devices including receiver/transmitter circuits and logic and/or routines, for implementing the methods of the present invention and/or for transiting captured images or generated composite images to other devices for storage or display.

Numerous additional embodiments are possible while staying within the scope of the above discussed features.

What is claimed is:

1. A method comprising:
   displaying a settings menu from which a user can select one of at least a depth of field (DOF) control option and an aspect ratio control option;
   receiving, at a camera including multiple optical chains, user input indicating a user selectable image control option setting for use in controlling post image capture composite image generation, said user selectable image control option setting being a setting that is not used to control said multiple optical chains, said user selectable image control option setting being one of said depth of field (DOF) control option or said aspect ratio control option;
   storing the user selectable image control option setting in a memory of said camera; and
   presenting to a user of the camera, when the user input indicates selection of the depth of field control option, a user controllable depth of field slider for controlling a depth of field setting;
      wherein said depth of field slider includes a position indicator dot indicating a current depth of field setting position and a plurality of small dots indicating a path over which the position indicator dot can be moved to a new depth of field setting; and
      wherein the position indicator dot is a large dot which is at least as bright as the brightest small dot indicating the path over which the position indicator dot can move; and
   operating multiple optical chains to capture images; and
   controlling post image capture generation of a composite image from the images captured by the multiple optical chains based on the stored user selectable image control option setting.

2. The method of claim 1, further comprising:
   displaying a numerical indicator value indicating a new depth of field setting when the position indicator dot is moved to a new location on said depth of field slider, said numerical indicator value not being displayed over said new location while said depth of field position indicator dot is moved.

3. A method comprising:
   displaying a settings menu from which a user can select one of at least a depth of field (DOF) control option and an aspect ratio control option;
   receiving, at a camera including multiple optical chains, user input indicating a user selectable image control option setting for use in controlling post image capture composite image generation, said user selectable image control option setting being a setting that is not used to control said multiple optical chains, said user selectable image control option setting being one of said depth of field (DOF) control option or said aspect ratio control option;
   storing the user selectable image control option setting in a memory of said camera;
   presenting to a user of the camera, when the user input indicates selection of the depth of field control option, a user controllable depth of field slider for controlling a depth of field setting, wherein said depth of field slider includes a position indicator dot indicating a current depth of field setting position and a plurality of small dots indicating a path over which the position indicator dot can be moved to a new depth of field setting;

displaying a numerical indicator value indicating a new depth of field setting when the position indicator dot is moved to a new location on said depth of field slider, said numerical indicator value not being displayed over said new location while said depth of field position indicator dot is moved; and wherein small dots on the path over which the position indicator dot can be moved are brighter on the side of the slider path matching the direction in which the slider was most recently moved than on the side of the slider path away from which the slider was most recently moved; and operating multiple optical chains to capture images; and controlling post image capture generation of a composite image from the images captured by the multiple optical chains based on the stored user selectable image control option setting.

4. The method of claim 3 further comprising:

when the user input indicates selection of the aspect ratio control option, presenting to the user of the camera a plurality of user selectable aspect ratios; and monitoring for user input indicating selection of one of the user selectable aspect ratios.

\* \* \* \* \*